Figure 1:
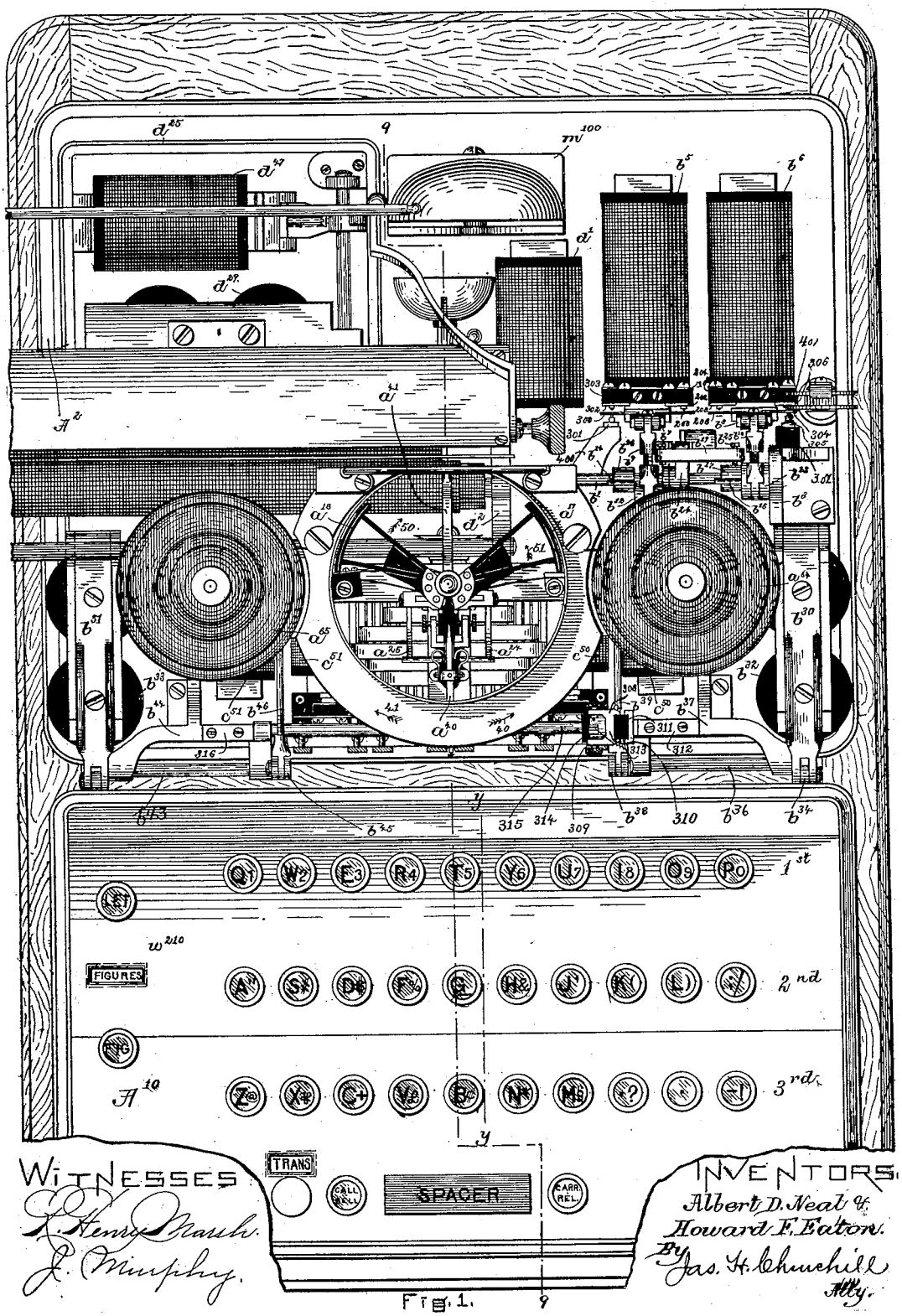

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 1.

WITNESSES
Henry Shash
J. Murphy

INVENTORS
Albert D. Neal &
Howard F. Eaton.
By Jas. H. Churchill
Atty.

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 2.
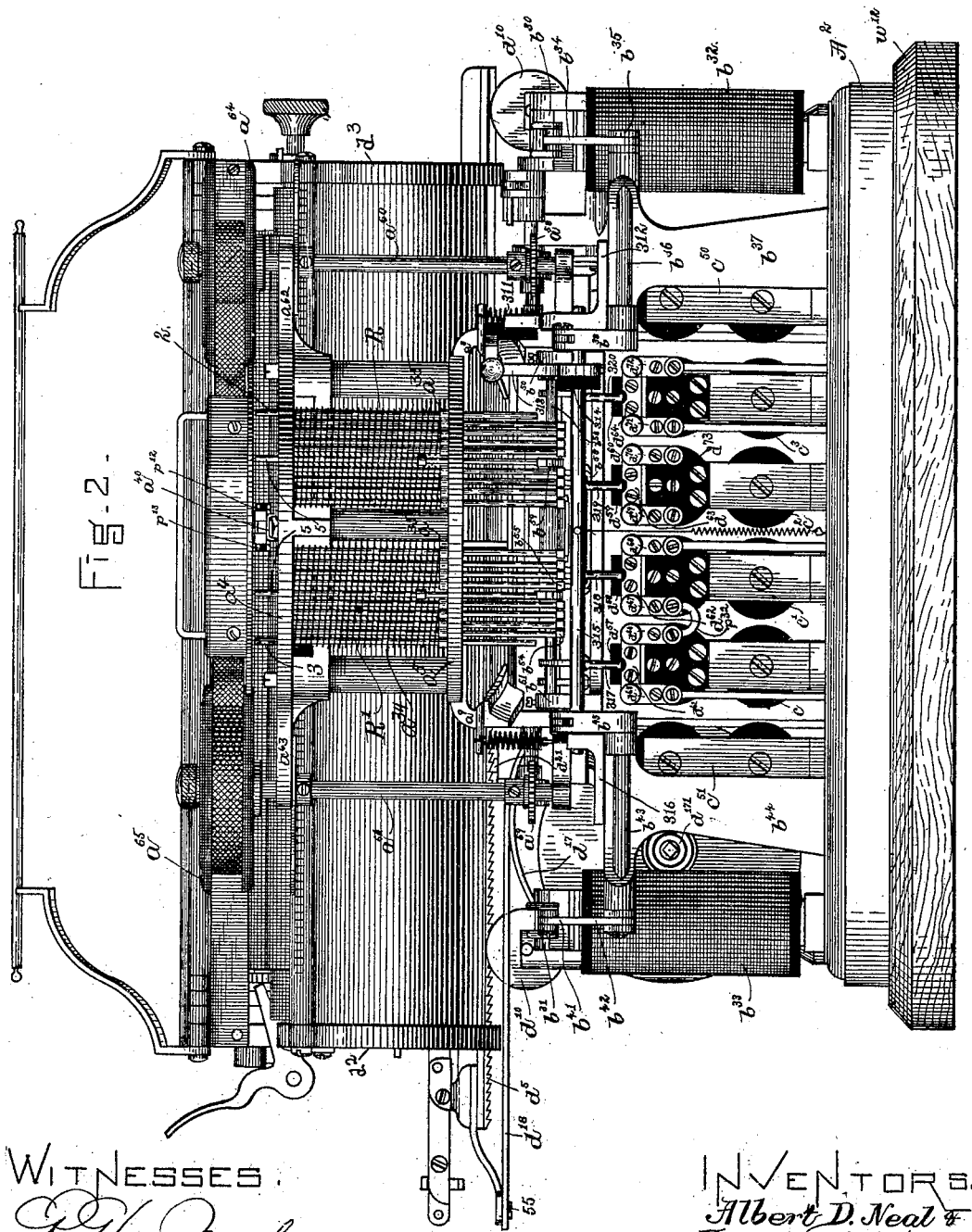

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 3.
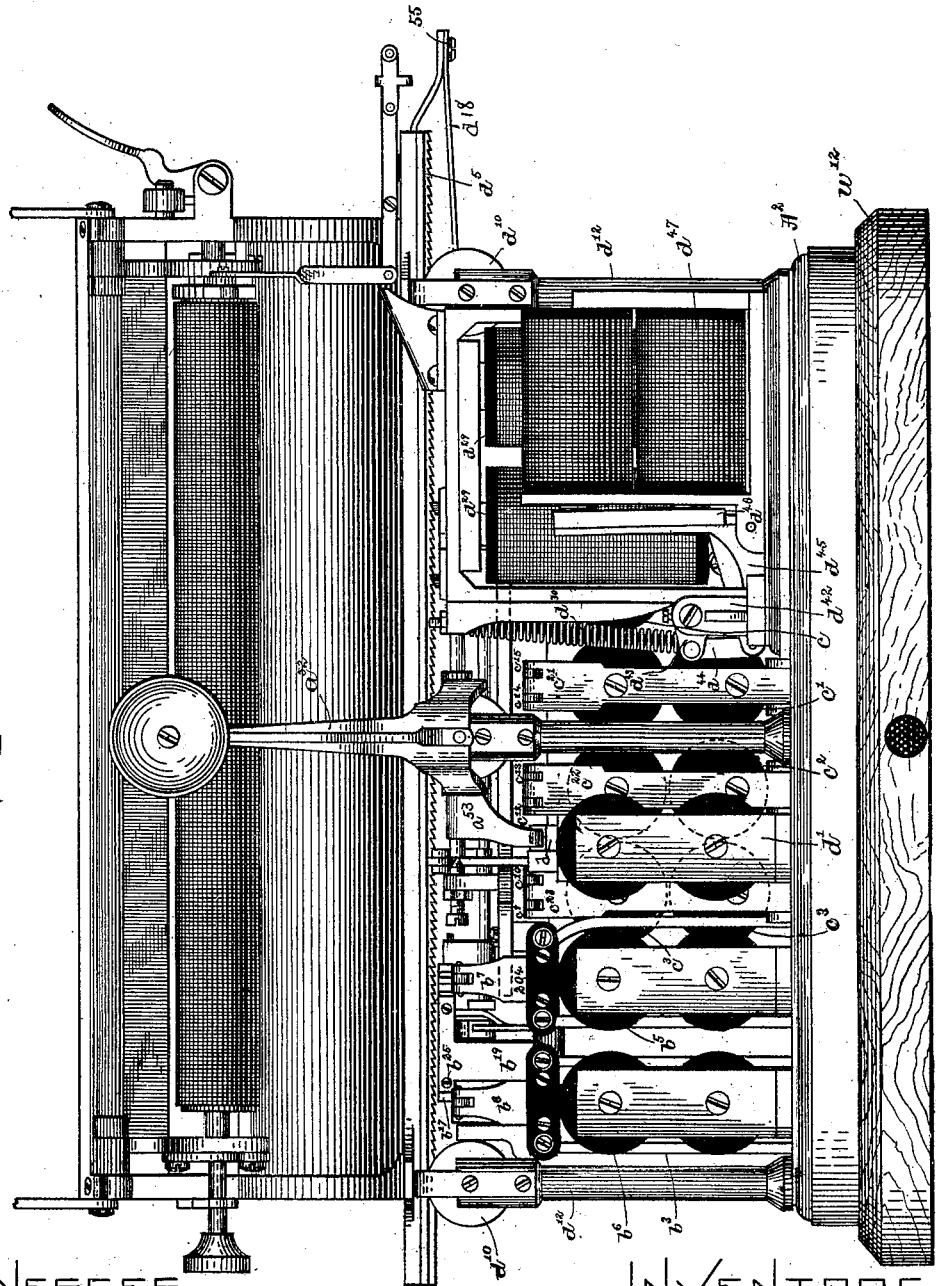

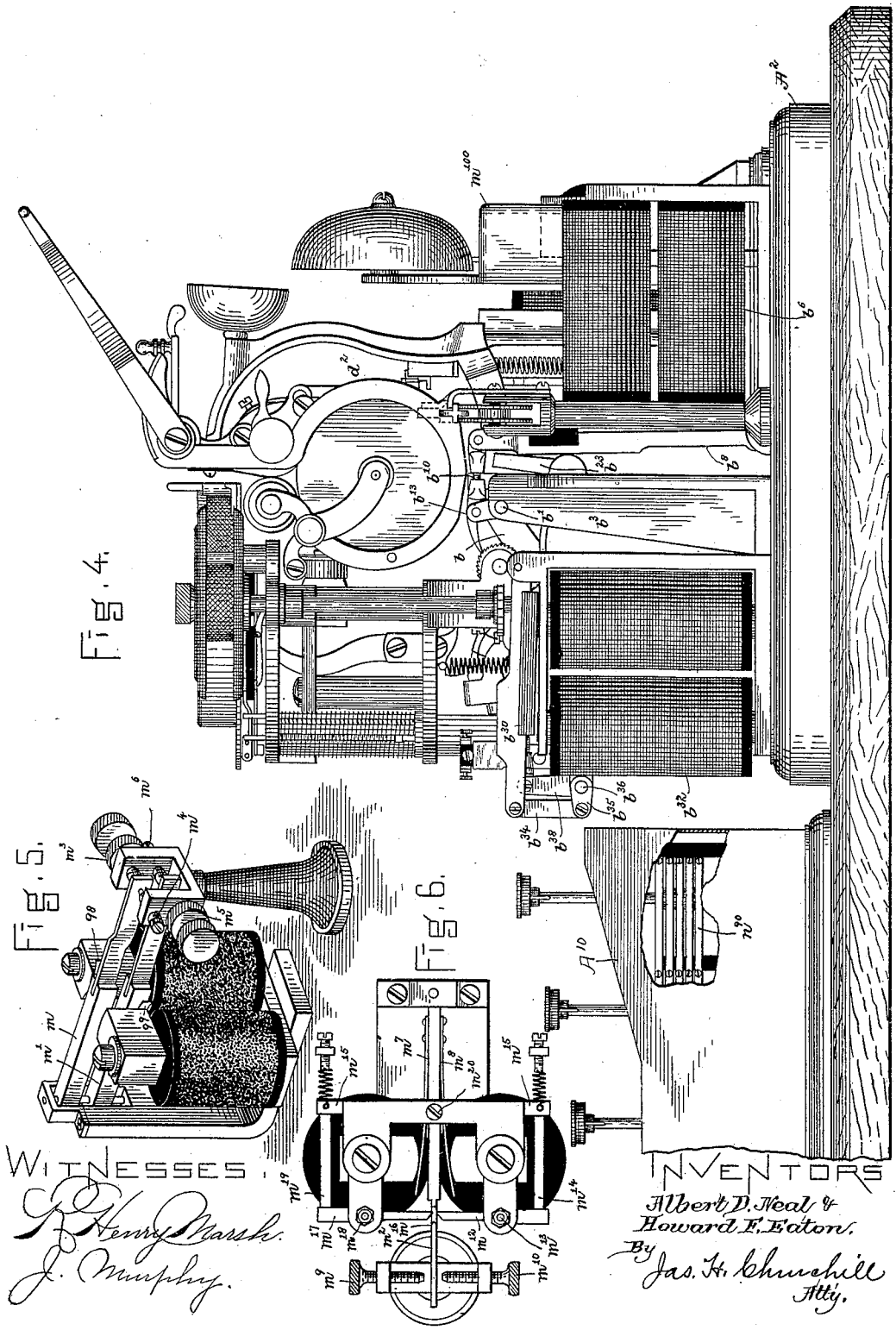

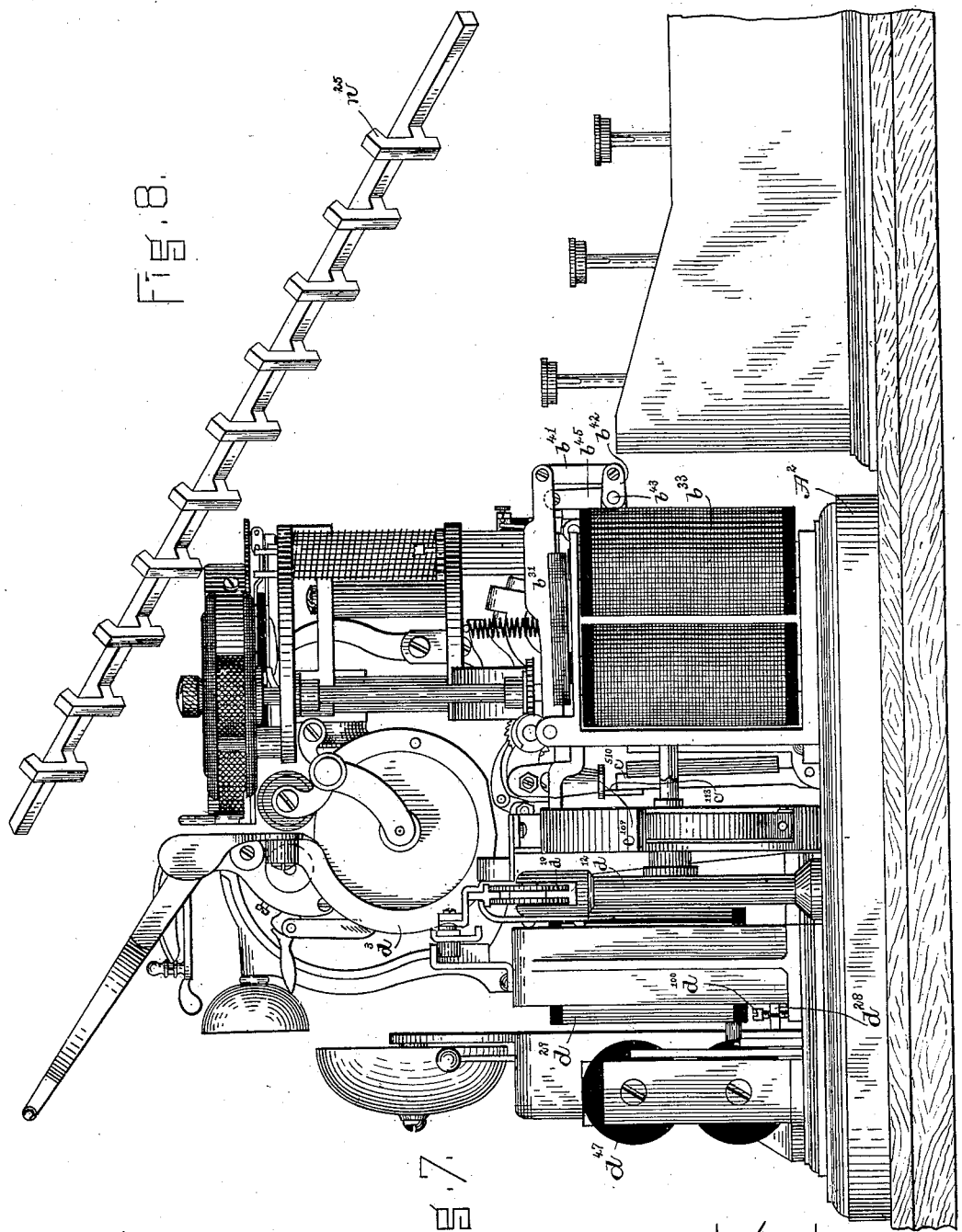

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 6.
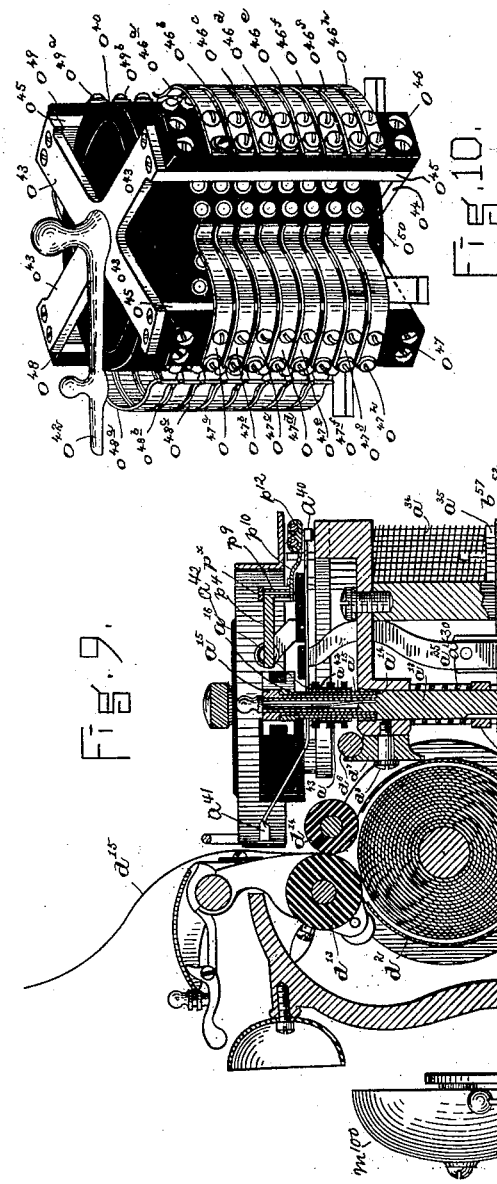
WITNESSES.
Henry Marsh.
J. P. Murphy.
INVENTORS
Albert D. Neal &
Howard F. Eaton.
By Jas. H. Churchill
Att'y.

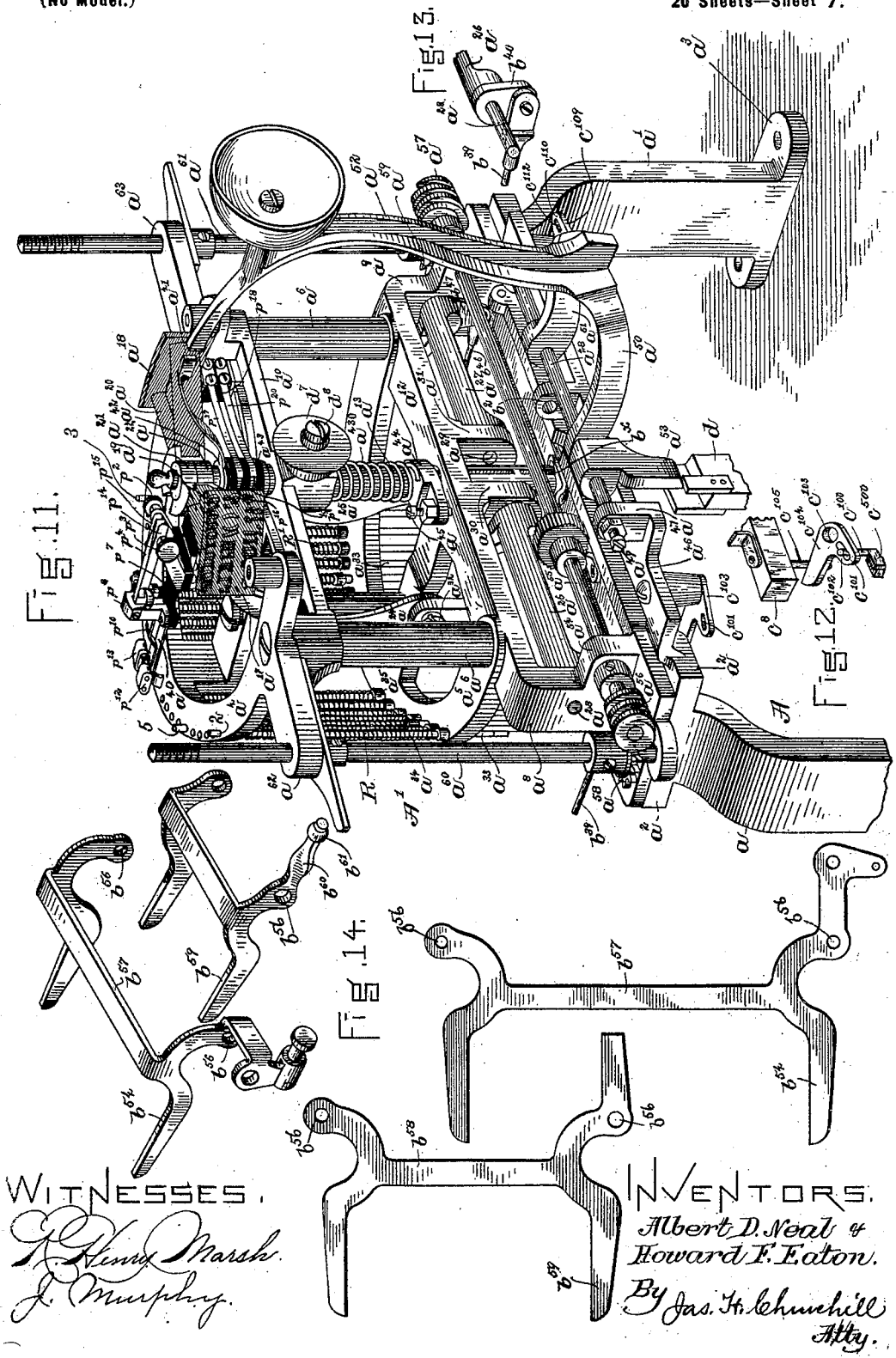

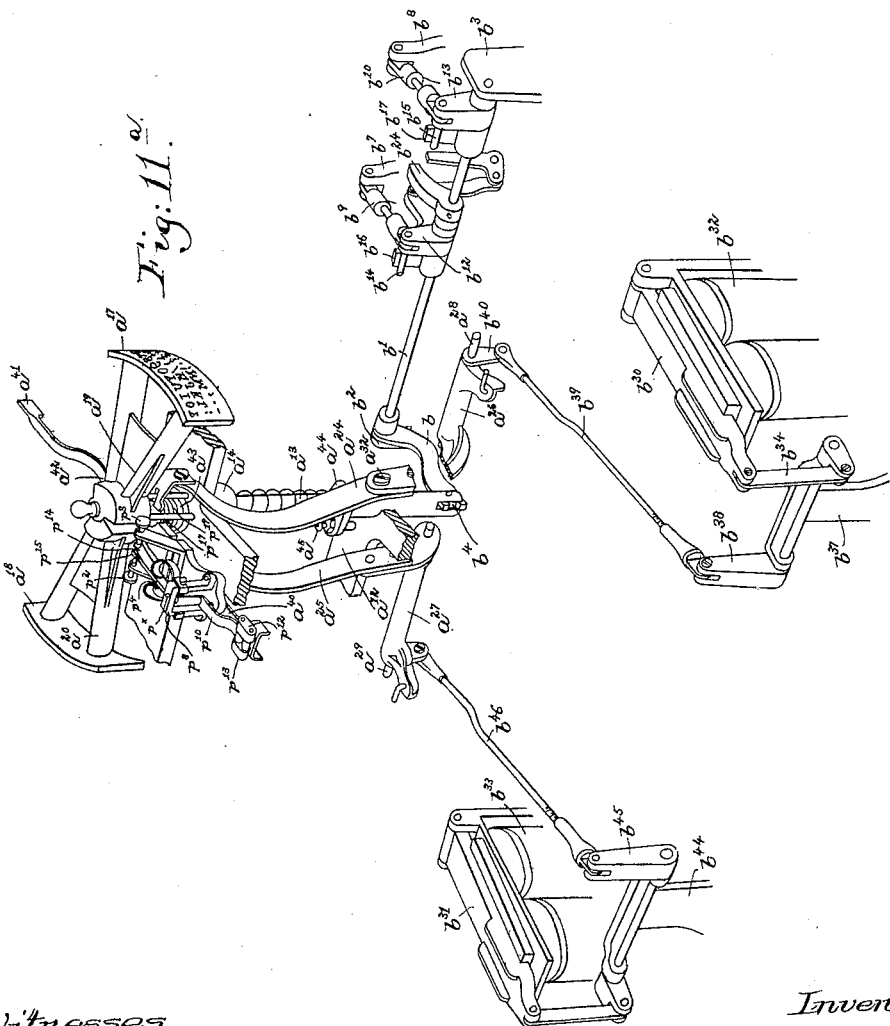

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 9.
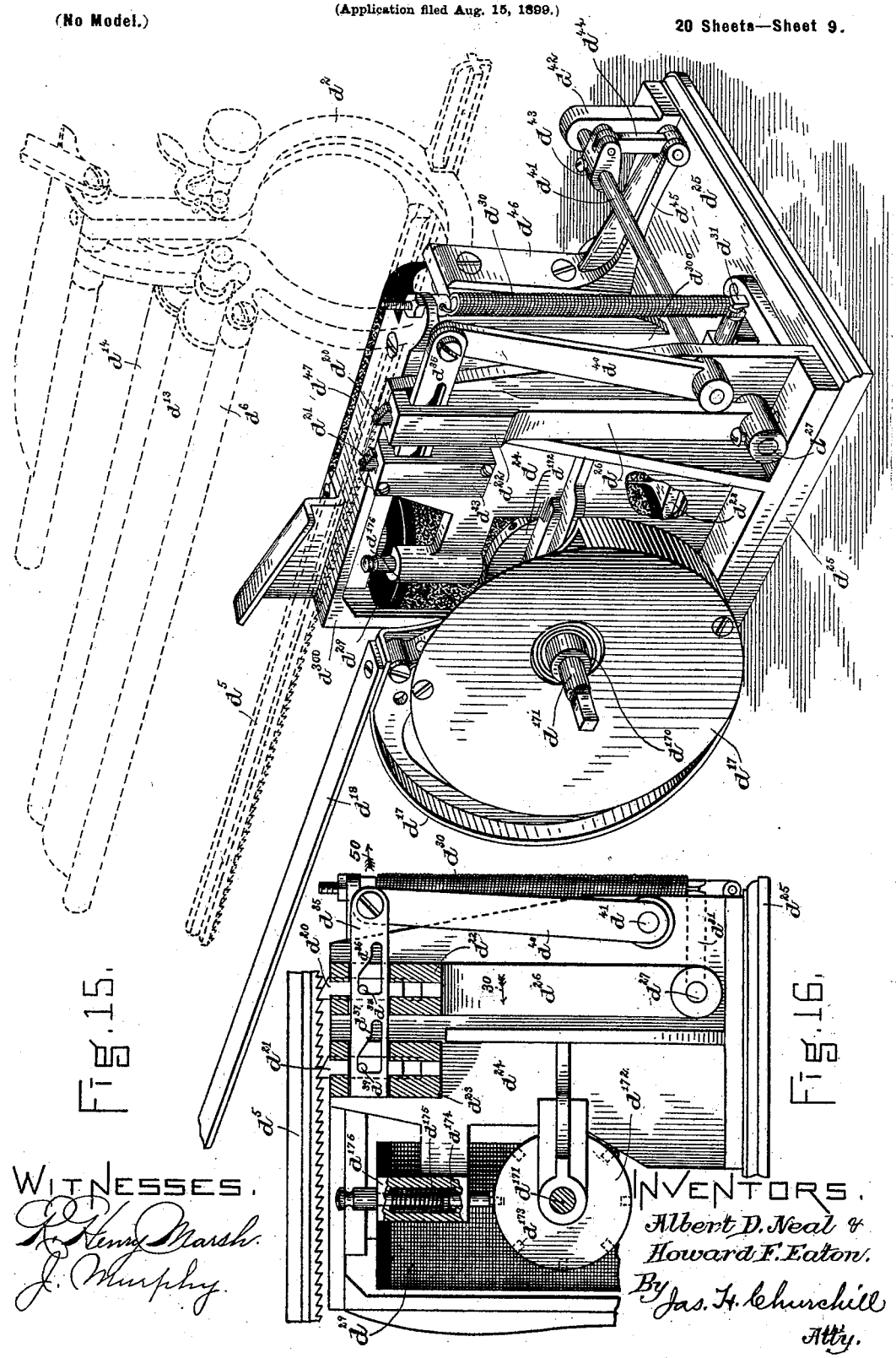

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 10.
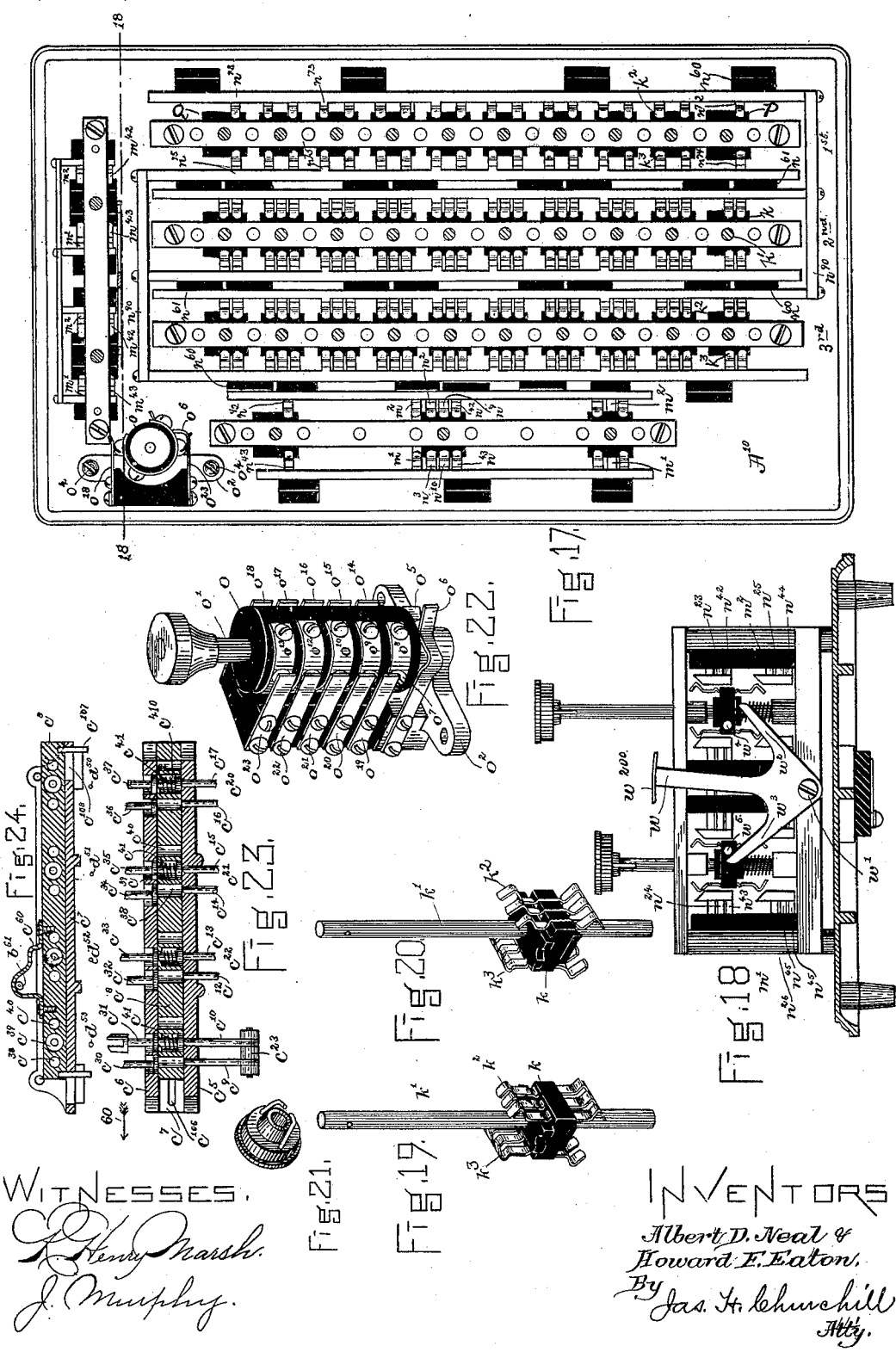
Witnesses.
Inventors.
Albert D. Neal &
Howard F. Eaton,
By Jas. H. Churchill
Atty.

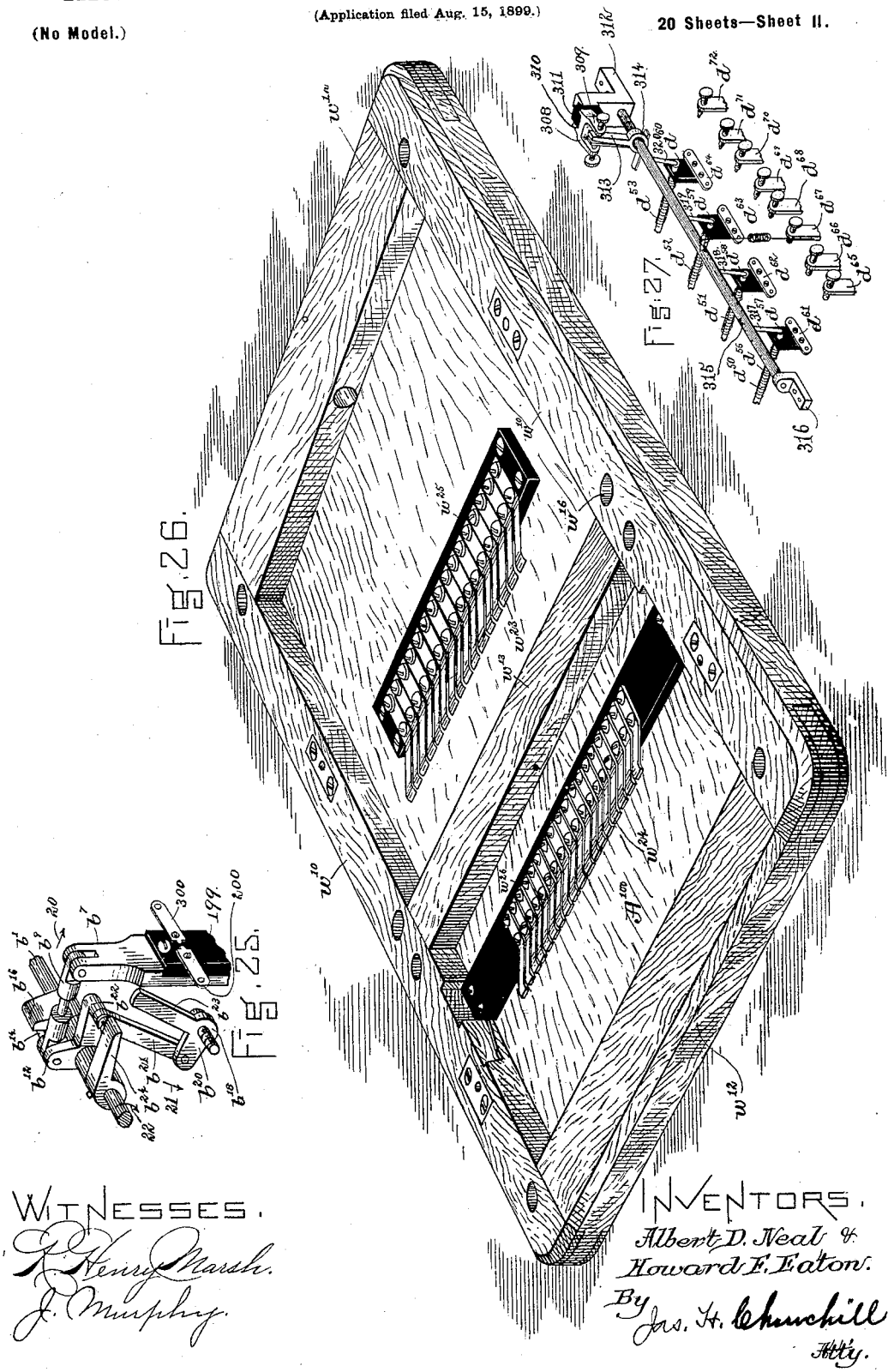

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 12.

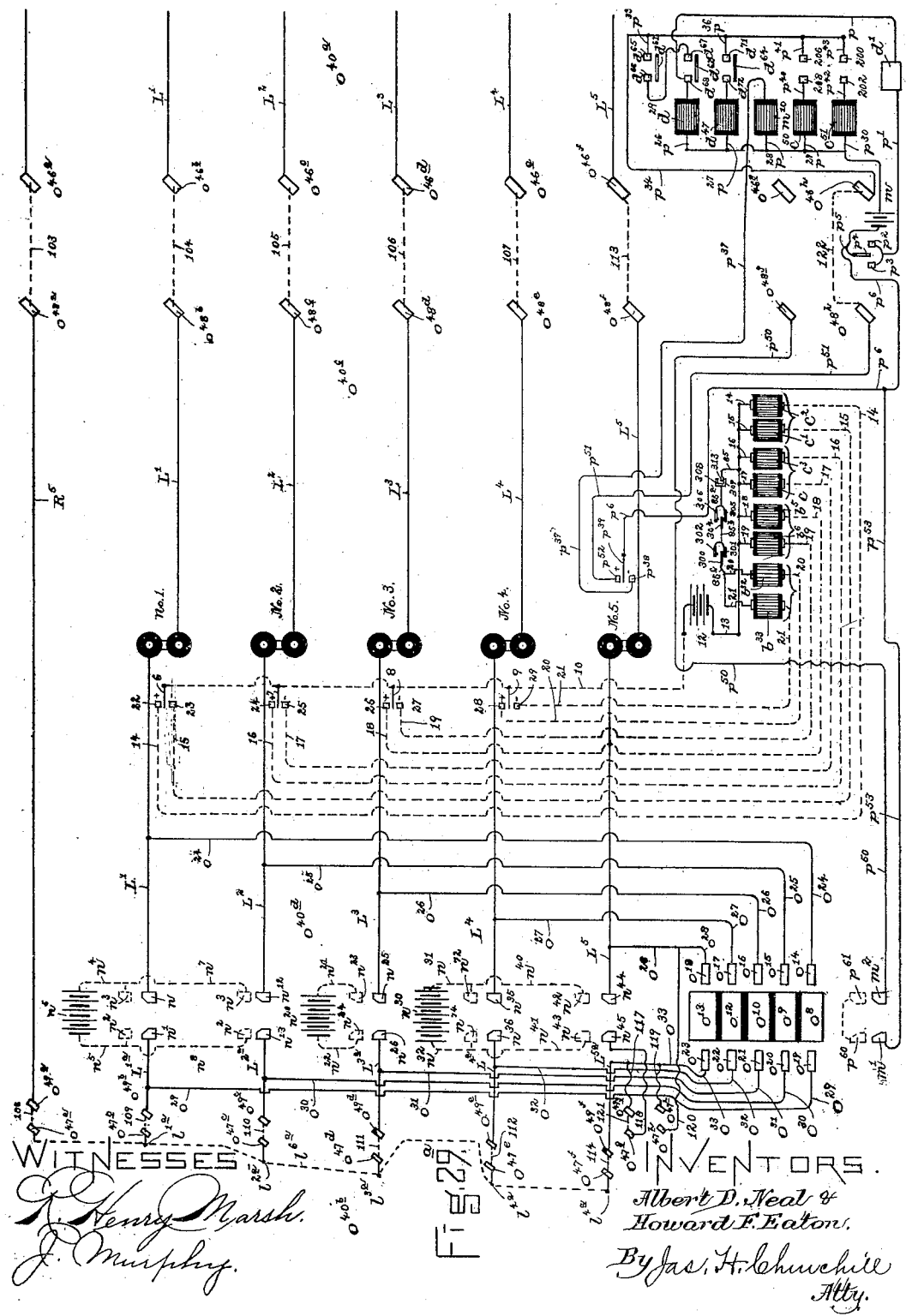

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 15.
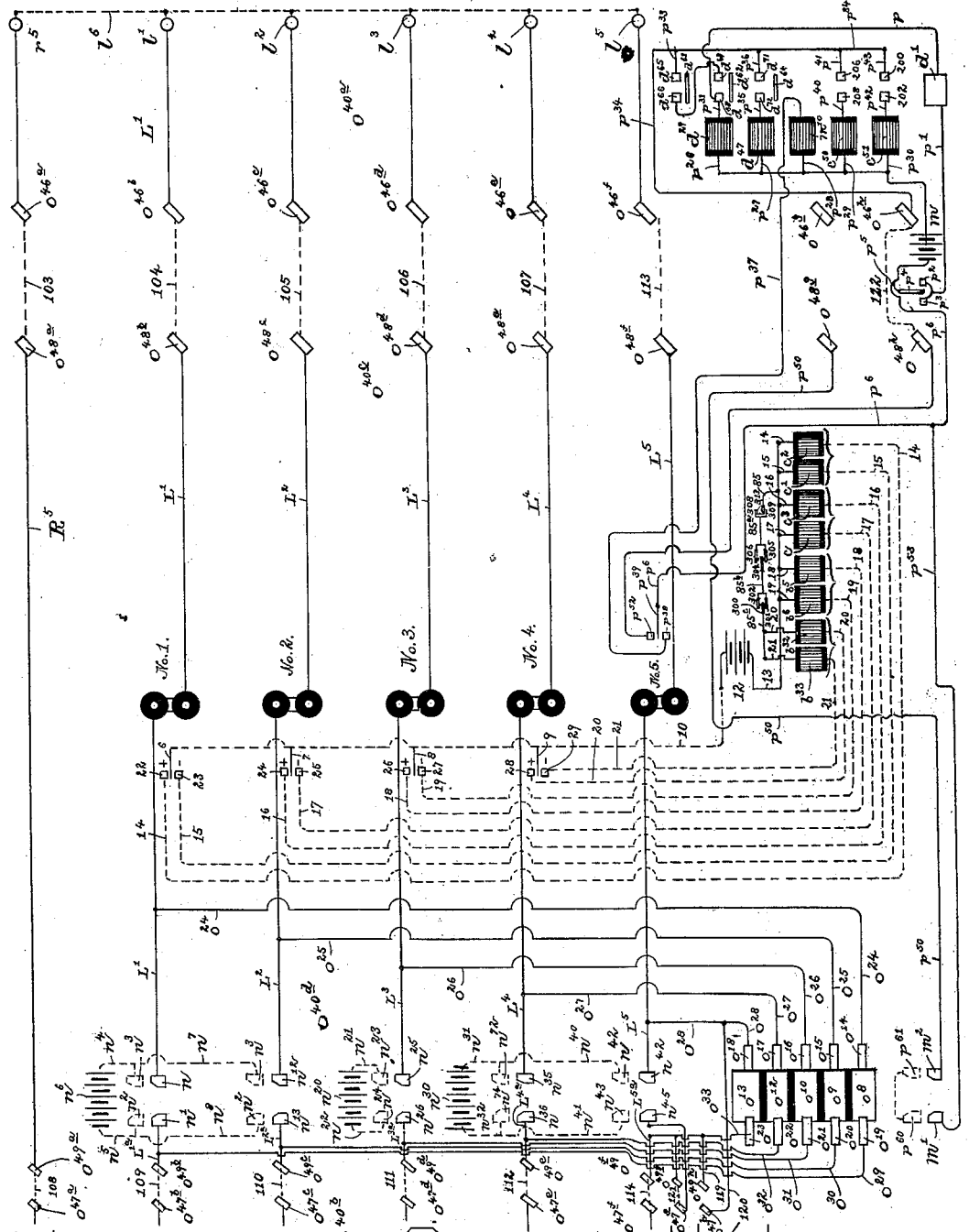

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 16.

WITNESSES.
Henry Marsh.
J. Murphy

INVENTORS
Albert D. Neal &
Howard F. Eaton.
By Jas. H. Churchill
Atty.

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 17.
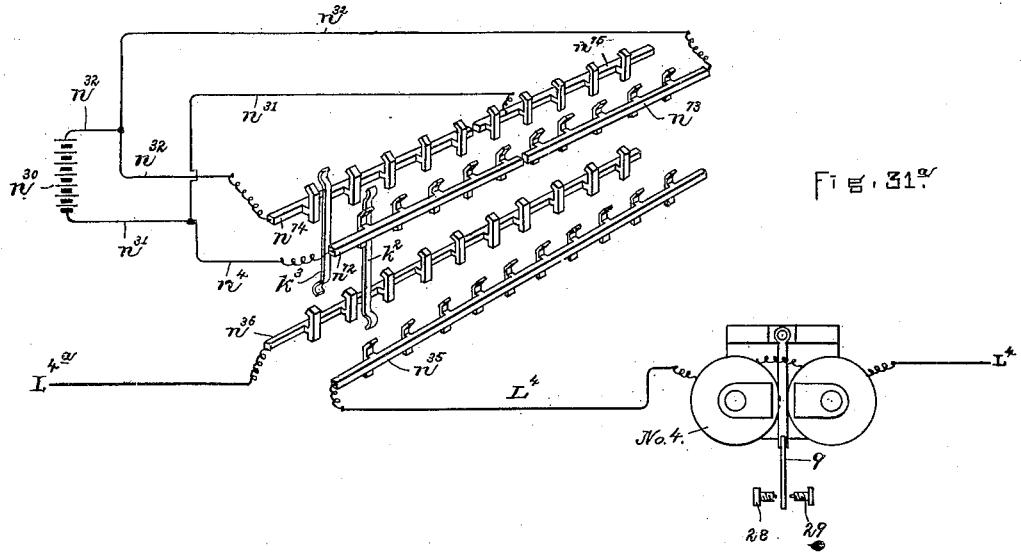
Fig. 31.ᵃ
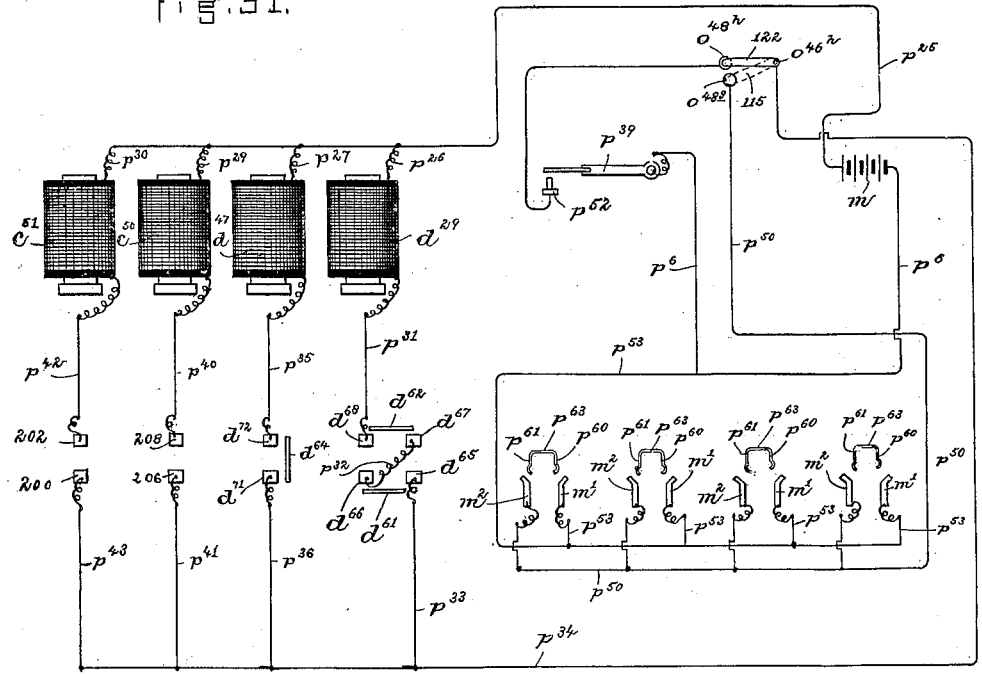
Fig. 31.ᵇ
Witnesses.
Thos. G. Bingay.
J. Murphy.
Inventors.
Albert D. Neal &
Howard F. Eaton,
By Jas. H. Churchill
Atty.

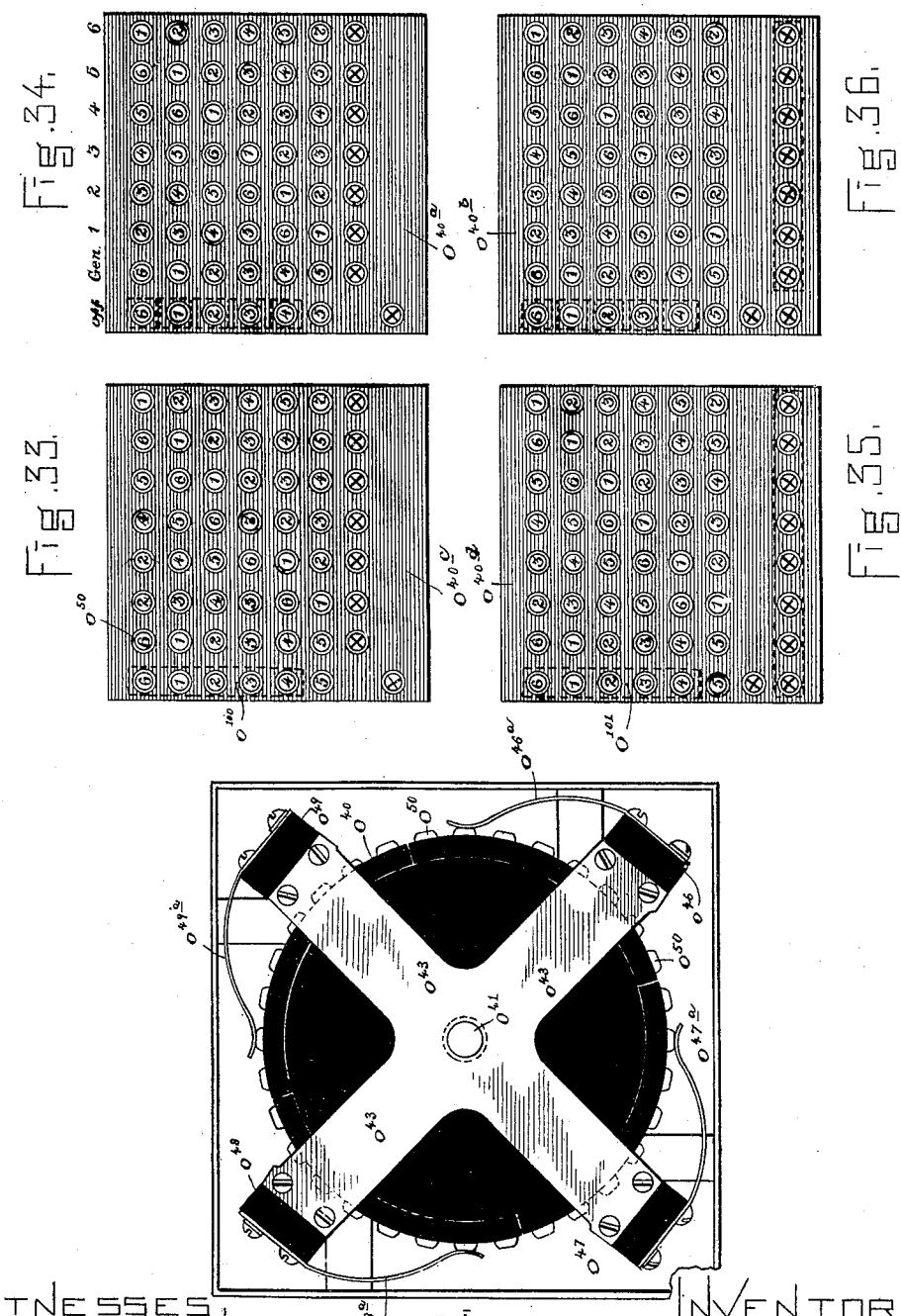

No. 649,138. Patented May 8, 1900.
A. D. NEAL & H. F. EATON.
ELECTROMECHANICAL TYPE WRITING SYSTEM OF INTERCOMMUNICATION.
(Application filed Aug. 15, 1899.)
(No Model.) 20 Sheets—Sheet 19.
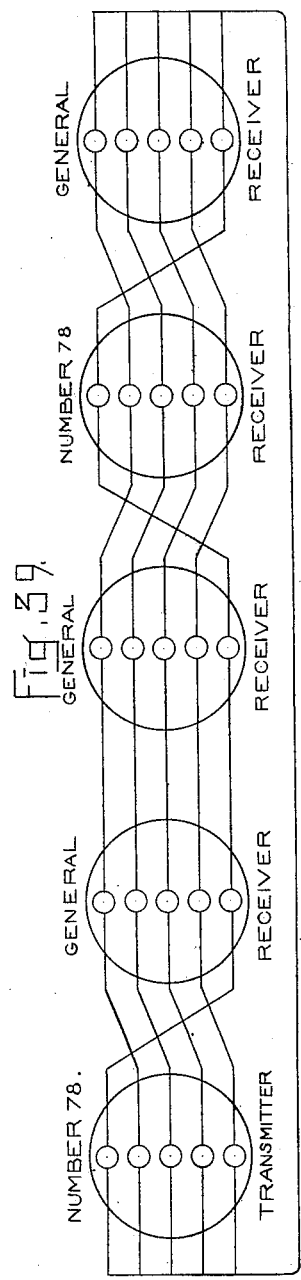
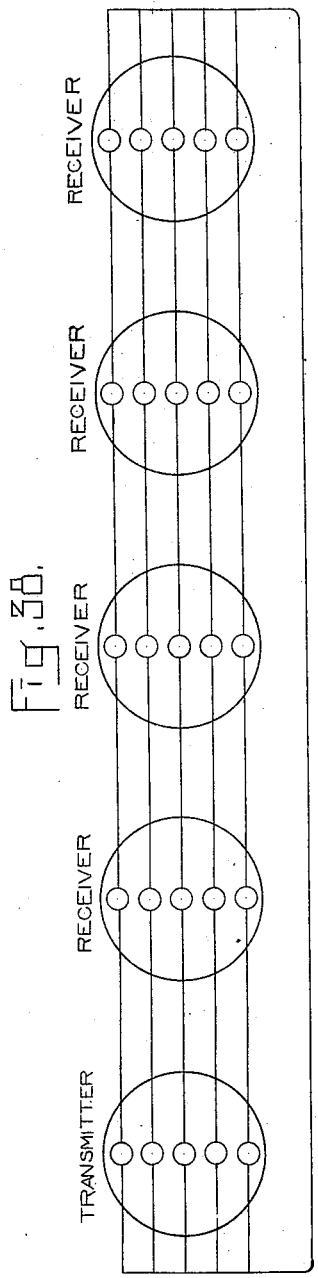
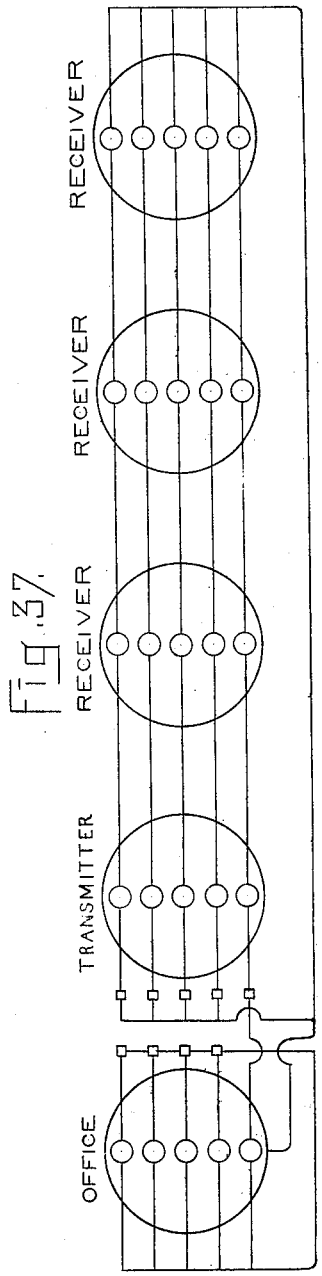

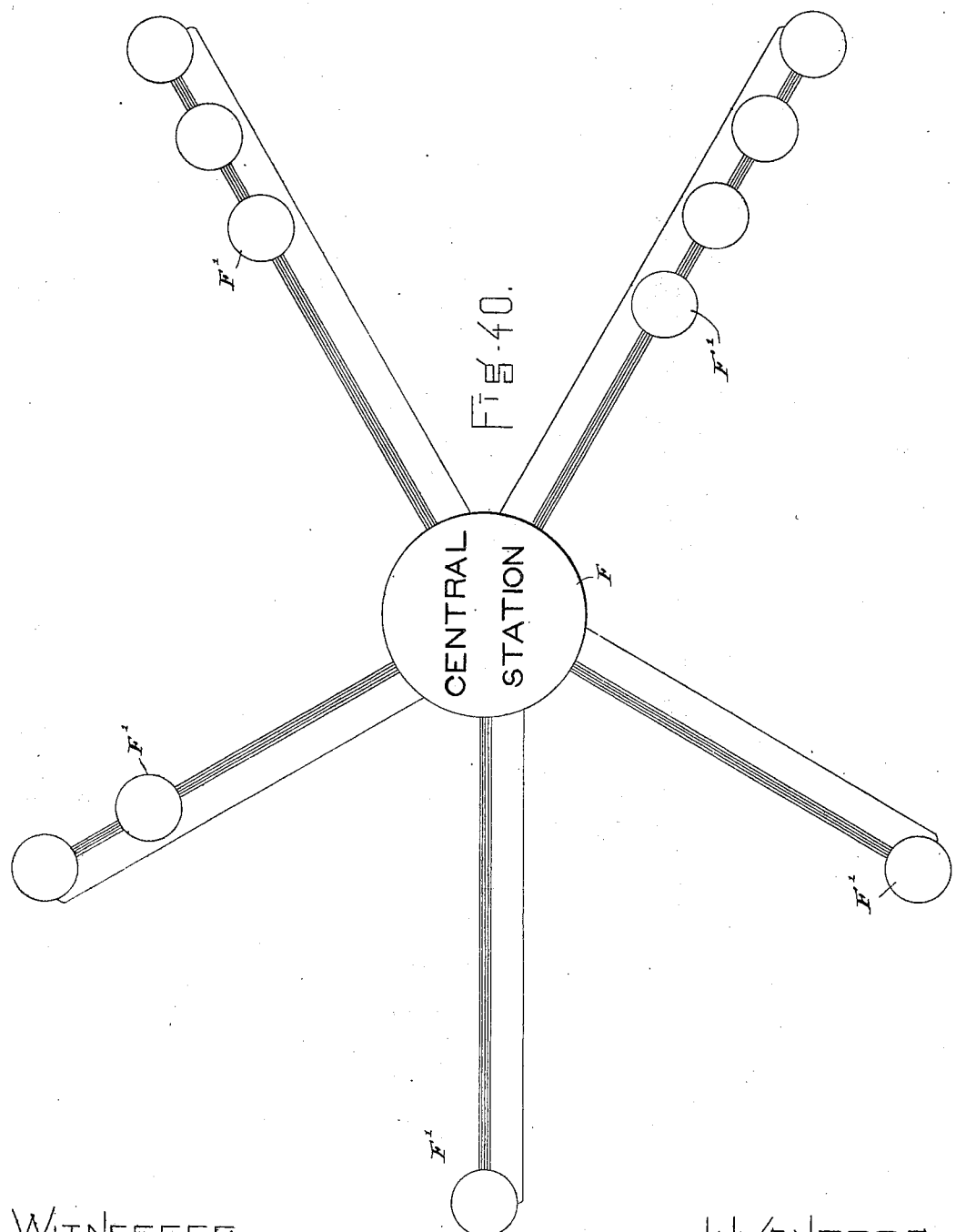

UNITED STATES PATENT OFFICE.

ALBERT D. NEAL, OF BOSTON, AND HOWARD F. EATON, OF QUINCY, MASSACHUSETTS; SAID EATON ASSIGNOR TO SAID NEAL.

ELECTROMECHANICAL TYPE-WRITING SYSTEM OF INTERCOMMUNICATION.

SPECIFICATION forming part of Letters Patent No. 649,138, dated May 8, 1900.

Application filed August 15, 1899. Serial No. 727,295. (No model.)

*To all whom it may concern:*

Be it known that we, ALBERT D. NEAL, residing in Boston, in the county of Suffolk, and HOWARD F. EATON, residing in Quincy, in the county of Norfolk, State of Massachusetts, citizens of the United States, have invented an Improvement in Electromechanical Type-Writing Systems of Intercommunication, of which the following description, in connection with the accompanying drawings, is a specification, like letters and figures on the drawings representing like parts.

This invention relates to a system of intercommunication by means of electromechanical type-writing or printing instruments, and has for one of its objects to provide a system in which type-writing communication between different points or stations may be effected with a minimum number of line-wires. The system embraces electromechanical type-writing instruments capable of being used as transmitters and receivers or for individual work after the manner of the ordinary typewriter. The electromechanical type-writing and printing instrument employed in this system may and preferably will be of substantially the class shown and described in United States Patent No. 486,889, granted to us November 29, 1892, and the mechanical portion of the instrument embodied in our present invention may be of substantially the same construction as the well-known Hammond typewriter and substantially such as shown and described in United States Patents Nos. 290,419 and 290,420, granted to J. B. Hammond December 18, 1893.

One feature of our present invention consists in a novel construction of parts whereby the mechanical portion of an instrument such as shown in the said Hammond patents may be operated by electricity.

Another feature consists in providing a stopping device to control the extent of longitudinal or vertical movement of the type-carrier to obtain perfect alinement of the characters, as will be described.

Our invention further consists in a selecting device for the upper and lower case characters, which device coöperates with the pin-operating magnets and in one position permits the said pin-magnets to effect the printing of the characters of one case—as, for instance, capitals or letters—and in another position permits the pin-magnets to effect the printing of the characters of another case—as, for instance, figures.

Another feature of our present invention consists in providing a governor to positively control the correct printing position of the type-carrier and thereby avoid errors in the working of the instrument.

Our present invention includes the combination, with an electromechanical type-writing instrument, of relays, preferably of a novel construction, as will be described, whereby the number of line-wires required to operatively connect two instruments or stations may be reduced to a minimum.

Our invention further consists in a novel construction of transmitting-keyboard, as will be described.

Another feature consists in a novel construction of feed and release for the carriage of the instrument.

Our invention further consists in a novel construction of combination-switch, as will be described, whereby the instruments may be connected together for general or private communication.

These and other features of this invention will be pointed out in the claims at the end of this specification.

Figure 28:
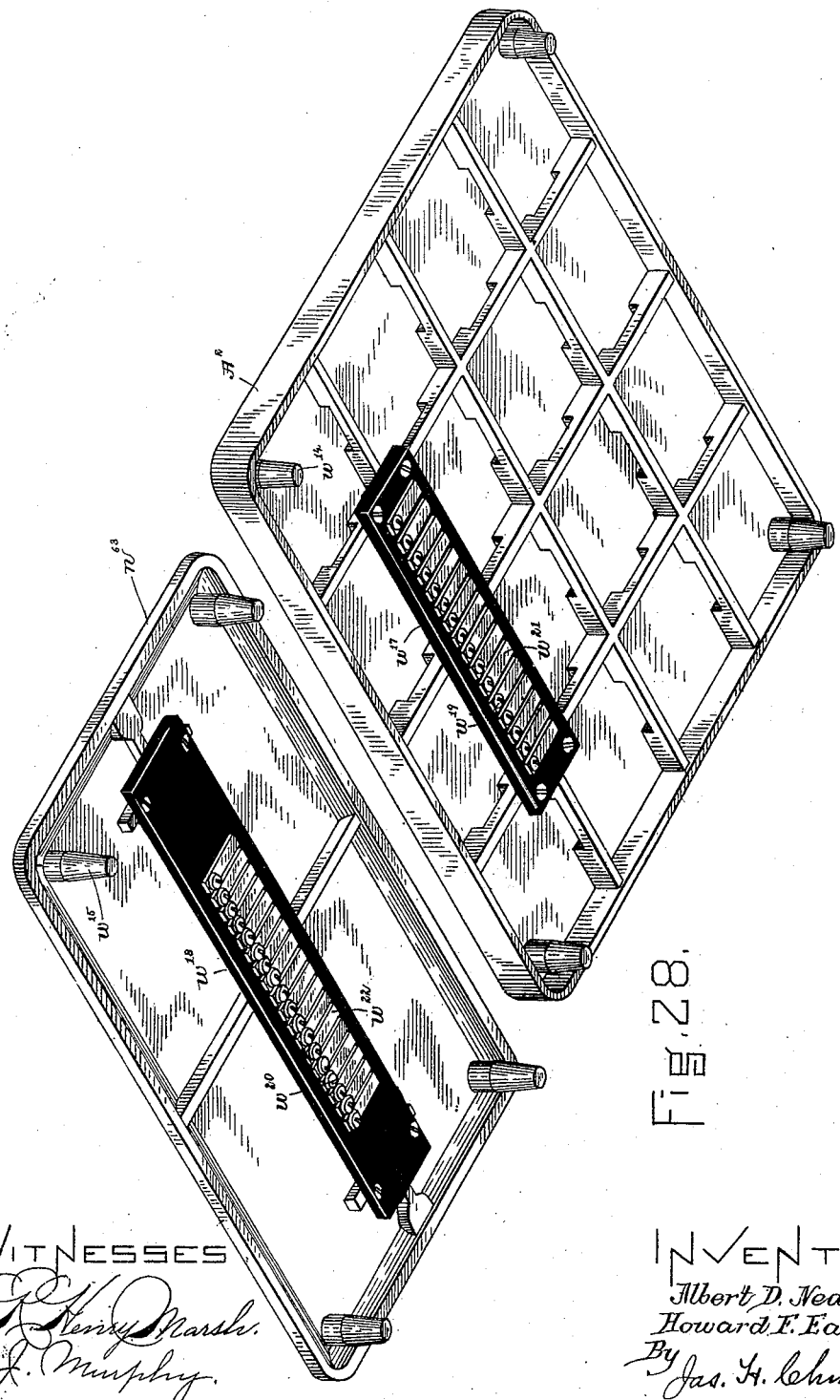
Figure 29:
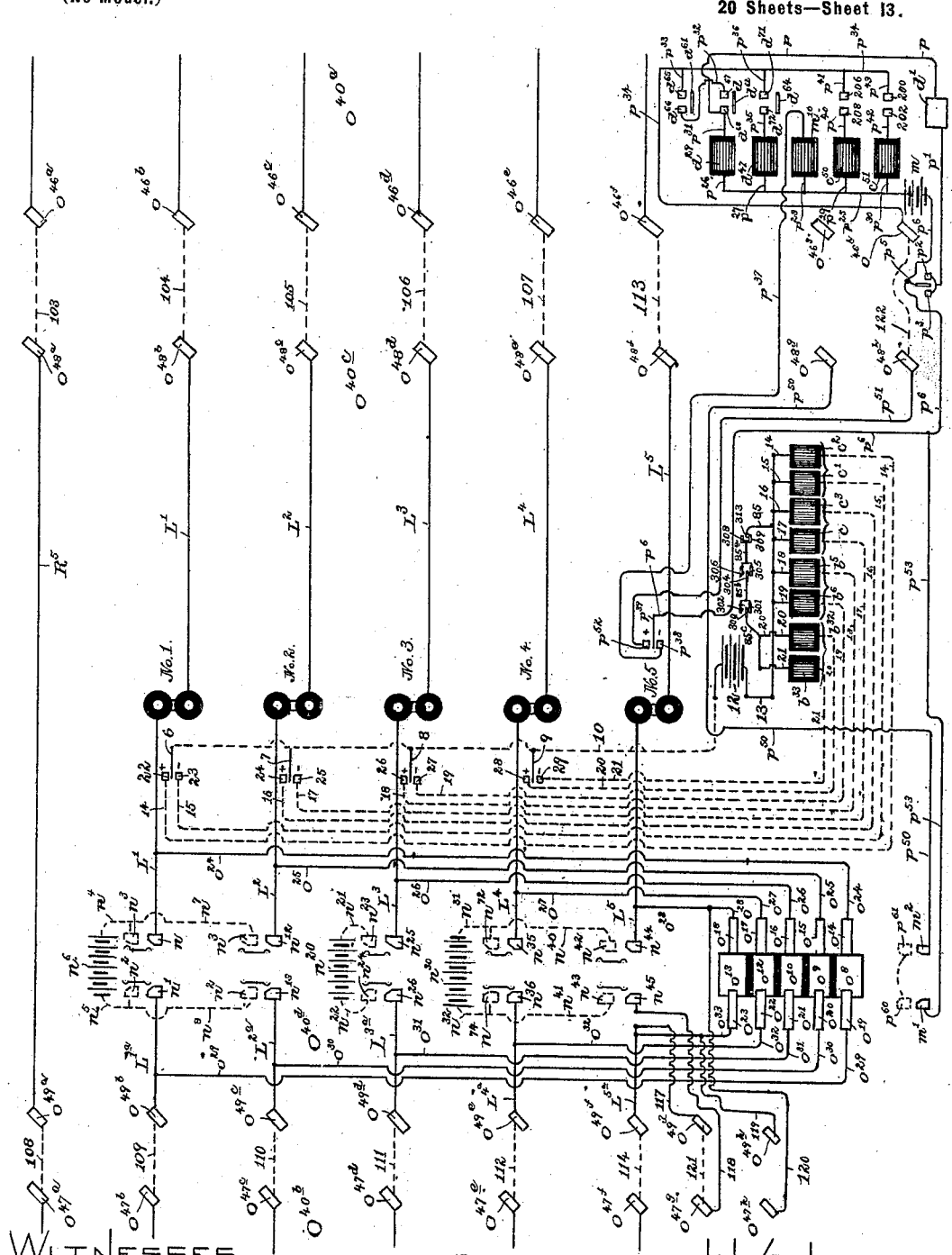
Figure 31:
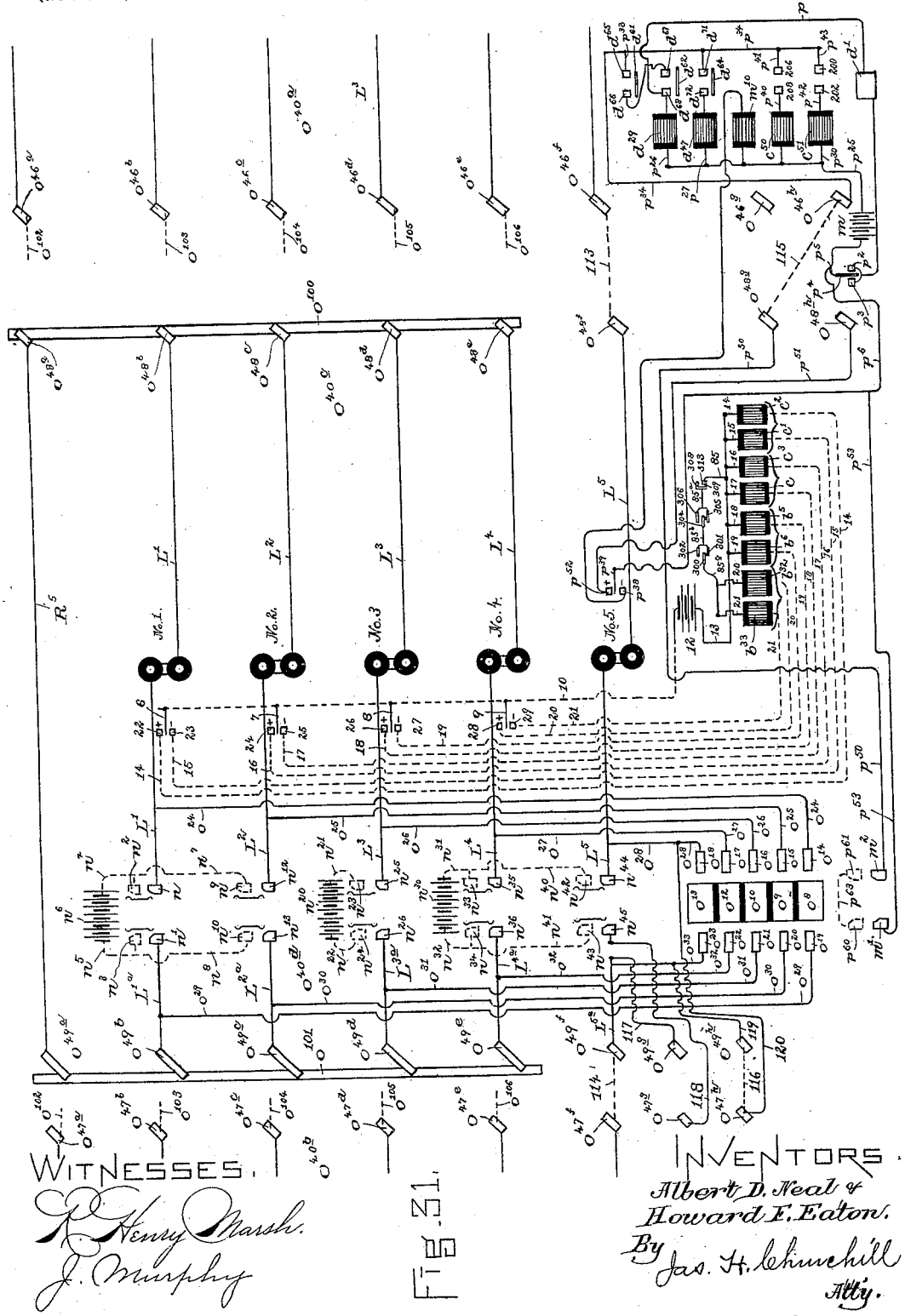

Figure 1 is a top or plan view, partially broken out, of an electromechanical apparatus embodying this invention, the carriage being shown as partially moved across the instrument to uncover some of the working parts; Fig. 2, a front elevation of the instrument shown in Fig. 1 with the keyboard removed; Fig. 3, a rear elevation of the machine shown in Fig. 1 with the call-bell removed, the carriage being in its central position; Fig. 4, a right-hand side elevation of the instrument shown in Fig. 1, the keyboard being partially broken out; Fig. 5, a detail in perspective of one form of relay to be referred to; Fig. 6, a plan view of a modified form of relay to be referred to; Fig. 7, a left-hand side elevation of the instrument shown in Fig. 1 with the keyboard partially broken out; Fig. 8, a detail to be referred to; Fig. 9, a partial section and elevation of the instrument shown in Fig. 1, the section being taken on the irregular line 9 9 and the rear portion of the base being broken out; Fig. 10, a detail of the combination-switch to be referred to; Fig. 11, a perspective of the main framework of the instrument shown in Fig. 1 with some of its parts removed; Fig. 11$^a$, a perspective of the type-carrier and its operating mechanism; Figs. 12 and 13, details to be referred to; Fig. 14, details of the pin-operating levers to be referred to; Fig. 15, a detail in perspective, on an enlarged scale, to more clearly show the carriage feed and release mechanism; Fig. 16, a detail, on an enlarged scale, in section and elevation of the carriage feed and release mechanism; Fig. 17, a top or plan view of the keyboard with the cover removed, the key-stems being shown in section; Fig. 18, a section on the line 18 18, Fig. 17; Fig. 19, a detail in perspective of the key-circuit closer; Fig. 20, a detail in perspective of a modified form of key-circuit controller; Fig. 21, a detail in perspective of the key-cap to be referred to; Fig. 22, a detail in perspective, on an enlarged scale, of one form of controlling-switch to be referred to; Fig. 23, a transverse sectional detail of the pin-selecting mechanism to be referred to; Fig. 24, a vertical longitudinal sectional detail of the pin-selecting mechanism to be referred to; Fig. 25, a detail in perspective, on an enlarged scale, of the mechanism for controlling the type alinement; Fig. 26, a detail in perspective of the supporting-base, showing the contacts thereon; Fig. 27, a detail in perspective, on an enlarged scale, showing the governing mechanism for the pin-magnets to be referred to; Fig. 28, an under side view in perspective of the bases for the keyboard and machine proper; Fig. 29, a diagram of circuits to more clearly enable the operation of the instrument to be understood, the diagram representing one instrument connected for line work as a receiver; Fig. 29$^a$, a diagram of circuits, representing the instrument connected for line work as a transmitter; Fig. 30, a diagram of circuits representing the instrument as at the end of a line or circuit and in condition to receive a message transmitted by another instrument; Fig. 31, a diagram of circuits showing the instrument connected for office-work; Figs. 31$^a$ and 31$^b$, diagrammatic details to be referred to; Fig. 32, a top or plan view of a preferred form of combination-switch to be referred to; Figs. 33 to 36, inclusive, developed views of quarter-sections of the cylinder or barrel shown in Fig. 32 to illustrate different combinations; Fig. 37, a diagram to illustrate one instrument as being used for office-work and another as transmitting to a series of receiving instruments; Fig. 38, a diagram representing the office instrument shown in Fig. 37 as transmitting to a series of receiving instruments; Fig. 39, a diagram representing one of the instruments connected in circuit with a series of instruments and with one of the series for private communication, and Fig. 40 a diagram representing a central station with a series of circuits connected therewith.

The mechanical portion of the apparatus herein shown as embodying this invention is substantially the same as that shown and described in the Hammond patents referred to, and consists, essentially, of a supporting-frame composed of a bottom portion A and a top portion A'. (See Fig. 11.) The bottom portion A is composed of two uprights or legs $a$ $a'$, joined by a cross plate or bar $a^2$, the legs $a$ $a'$ being provided with feet $a^3$, by which the supporting-frame may be secured to a base A$^2$. (See Fig. 2.) The upper portion A' is composed, essentially, of two substantially-semicircular plates $a^4$ $a^5$, separated from each other and secured together by posts $a^6$, the plate $a^5$ having legs or brackets $a^8$ $a^9$, which rest upon and are secured to the cross-bar $a^2$ of the lower portion A.

The semicircular plates $a^4$ $a^5$ are provided at their rear portions with cross or tie bars $a^{10}$ $a^{12}$, having holes through which a substantially-vertical type-carrier shaft $a^{13}$ is extended, (see Figs. 9 and 11,) the said shaft extending above the cross-bar $a^{10}$ and below the cross-bar $a^{12}$. The shaft $a^{13}$ is reduced in diameter at its upper end to form a shoulder $a^{14}$, (see Fig. 9,) upon which rest two sleeves $a^{15}$ $a^{16}$, encircling the reduced portion of the said shaft.

The type-carrier, as herein shown, is composed of two halves or parts consisting of segmental rims $a^{17}$ $a^{18}$, joined by arms or spokes $a^{19}$ $a^{20}$ to hubs $a^{21}$ $a^{22}$, the latter being secured to or forming part of the sleeves $a^{15}$ $a^{16}$, respectively. The segmental rims $a^{17}$ $a^{18}$ are provided with the letters, figures, or other characters to be printed, and the said characters are, for the best results, arranged in substantially horizontal and vertical rows, there being three horizontal rows on each segment, as herein shown, (see Fig. 11,) each row consisting of ten characters.

The type-carrying segments in the apparatus herein shown are adapted to be moved on the shaft $a^{13}$ as a pivot by means of driving arms or levers $a^{24}$ $a^{25}$, connected to sleeves $a^{26}$ $a^{27}$, mounted on rods or arbors $a^{28}$ $a^{29}$, supported in the legs $a^8$ $a^9$ and in lugs $a^{30}$ $a^{31}$, depending from the cross-bar $a^{12}$ near the center of the same, the said driving arms or levers being preferably made in two parts rigidly fastened together by bolts or screws $a^{32}$. The upper ends of the driving-arms $a^{24}$ $a^{25}$ are shaped to engage pins or lugs, (not shown,) but which depend from the hubs $a^{21}$ $a^{22}$ of the type-segments, substantially as shown and described in the patent, No. 290,420, referred to.

The type-carrying segments $a^{17}$ $a^{18}$ in the apparatus herein shown are arrested in their forward oscillating or pivotal movements by stop-pins $a^{33}$, which are arranged in two sets of ten each, one set (marked R in Fig. 2) coöperating with the type-segment $a^{17}$, and the other set (marked R′) coöperating with the type-segment $a^{18}$. Each set of pins is composed of nine movable pins and one stationary pin, the said stationary pins being extended above the top plate $a^4$, and for the sake of distinction the said stationary pins are marked 2 3 in Fig. 2. The remaining nine pins of each set are movable and are adapted to be lifted up through suitable holes in the top and bottom plates $a^4$ $a^5$, but are normally held down by spiral springs $a^{34}$ encircling them, the downward movement being limited by suitable collars $a^{35}$ on said pins.

The pins $a^{33}$ extend below the plate $a^5$, and corresponding movable pins of the sets R R′, on opposite sides of the central radial line of the plates $a^4$ $a^5$, are adapted to be simultaneously raised by pin-lifting devices, as will be described. Each set of pins consists, as herein shown, of ten pins to correspond to the number of characters in the horizontal rows on the type-carrier segments.

The type-carrier segments are limited in their forward movement, as herein shown, by a stop-arm $a^{40}$, (see Fig. 11,) mounted loosely on the shaft $a^{13}$ and adapted to be engaged by a pin of the sets R R′, the said arm having, as herein shown, an extension or arm $a^{41}$, which is struck by the type-segments $a^{17}$ $a^{18}$ when the latter are moved by their driving-arms. The arms $a^{40}$ $a^{41}$ are secured to or form part of a hub $a^{42}$, loosely mounted on the sleeve $a^{16}$, (see Figs. 9 and 11,) and the hub $a^{42}$ has mounted on it a second hub or sleeve $a^{43}$, of insulating material, for a purpose as will be described.

The shaft $a^{13}$ is provided, as shown, with a collar $a^{44}$, between which and a boss on the under side of the cross-bar $a^{10}$ is located a spring $a^{430}$, which serves to return the shaft $a^{13}$ to its lower or normal position. (Shown in Figs. 9 and 11.) The collar $a^{44}$ is provided, as shown, with an adjusting-screw $a^{45}$, normally resting on the cross-bar $a^{12}$. The cross-bar $a^2$ is provided with an extension $a^{46}$, (see Fig. 11,) having upright lugs $a^{47}$, supporting a rock-shaft $a^{48}$, having bearings on the points or screws $a^{49}$, only one of which is shown in said figure.

The rock-shaft $a^{48}$ has fast on it the forked arms $a^{50}$ $a^{51}$ of a hammer or anvil $a^{52}$, the said rock-shaft also having mounted on it a depending crank or arm $a^{53}$ for a purpose as will be described.

The cross-bar $a^{12}$ is provided with extensions or lugs $a^{54}$, in which is mounted a worm-shaft $a^{55}$, having at its opposite ends right and left worms $a^{56}$ $a^{57}$, which mesh with and rotate worm-gears $a^{58}$ $a^{59}$ on vertical shafts or spindles $a^{60}$ $a^{61}$, extended up through arms $a^{62}$ $a^{63}$, projecting from the plate $a^4$, the said spindles having fitted on them ribbon-holding reels or drums $a^{64}$ $a^{65}$. (See Fig. 2.)

The parts as thus far described are and may be substantially the same as shown and described in the Hammond patents referred to.

The type-carrier segments $a^{17}$ $a^{18}$ in the construction herein shown are movable independently of each other in a substantially horizontal plane with the shaft $a^{13}$ as a pivot to bring any desired character of one of the horizontal rows of type in proper position to effect the printing of the selected character, which printing in the apparatus herein shown is accomplished by the hammer $a^{52}$, and the said type-carrier segments and the shaft $a^{13}$ are movable longitudinally, which in the present instance would be in a vertical plane, to bring the characters in the second or third horizontal row into a horizontal plane with the hammer. The extent of movement of the type-carrier segments $a^{17}$ $a^{18}$ in the horizontal plane is limited by the pins $a^{33}$ in the sets R R′, respectively.

In accordance with this invention the parts referred to are operated by means of electromagnets, and in order that the invention may be clearly understood the various movements of the mechanism required to operate the said parts will be specifically described. The type-carrying shaft $a^{13}$ at its lower end is operatively connected to an arm $b$, (see Figs. 9 and 11ᵃ,) mounted on a rock-shaft $b′$, having bearings in a lug $b^2$ on the cross-bar $a^{46}$ and in an upright or casting $b^3$, secured to the base $A^2$, and shown in Fig. 4, the rocker-arm $b$, as shown in Fig. 9, being forked at its inner end to engage a stud or roller $b^4$, or it may be a pin extended across a vertical slot $b^×$ (see Figs. 11 and 11ᵃ) in the lower end of the type-carrier shaft $a^{13}$.

As represented in the drawings, the type-carrier segments $a^{17}$ $a^{18}$ are provided with three horizontal rows of characters, the uppermost horizontal row in the normal or lowered position of the shaft $a^{13}$ being in correct horizontal position to effect the printing of a selected character in said row. The second and third rows of characters on the type-carrier segments $a^{17}$ $a^{18}$ in the present instance are brought into correct horizontal position with relation to the hammer by moving the type-carrying shaft $a^{13}$ longitudinally different distances, which longitudinal movement in the instrument herein shown is an elevation of the said shaft, the third row of characters requiring a greater elevation than the second row of characters. The elevation of the type-carrier and its shaft different distances, as described, may be accomplished by two electromagnets $b^5$ $b^6$, (see Figs. 1 and 3,) hereinafter designated as the "elevating-electromagnets," and in order to more specifically identify the said electromagnets with the work effected by them we prefer to designate the electromagnet $b^5$ as the "first" elevating-electromagnet and the magnet $b^6$ as the "second" elevating-electromagnet. The electromagnets $b^5$ $b^6$ are mounted upon the base $A^2$, as herein shown, with their coils in a vertical plane, and have their armatures $b^7$ $b^8$ pivoted at their lower end and joined at their upper end by connecting-rods $b^9$ $b^{10}$ to cranks or arms $b^{12}$ $b^{13}$ on the shaft $b'$. (See Figs. 1, 4, and 11$^a$.) The cranks or arms $b^{12}$ $b^{13}$ are loosely mounted on the rock-shaft $b'$ and are adapted, when moved by the armatures $b^7$ $b^8$, to rock the said shaft, which is accomplished in the present instance by means of projecting pins or studs $b^{14}$ $b^{15}$, (see Figs. 1 and 25,) which engage, respectively, the upright arms $b^{16}$ $b^{17}$, fast on the rock-shaft $b'$.

In order that the type-carrier and its shaft $a^{13}$ may not be carried above or beyond the correct printing position by the first elevating-magnet $b^5$, a stopping device is provided to limit the movement of the rock-shaft $b'$ by the armature of the said electromagnet. The form of stopping device preferred by us is shown separately in Fig. 25, and consists, essentially, of an elbow-lever $b^{18}$, pivoted to a bracket $b^{19}$, secured to or forming part of the upright or standard $b^3$ and shown best in Fig. 1, the said elbow-lever having one arm, as $b^{20}$, (see Fig. 25,) joined by a link $b^{21}$ to an arm $b^{22}$, secured to or forming part of the crank-arm $b^{12}$, to which the armature $b^7$ is connected, the long arm $b^{23}$ of the lever $b^{18}$ being adapted to be moved into the path of movement of an arm or projection $b^{24}$, fast on the rock-shaft $b'$. Referring to Fig. 25, it will be seen that when the armature $b^7$ is attracted by its magnet and moved in the direction indicated by arrow 20 the arm $b^{22}$ and link $b^{21}$ are moved downward or in the direction of arrow 21 and the elbow-lever $b^{18}$ is turned on its pivot, so as to bring the long arm $b^{23}$ of the said elbow-lever under the arm or projection $b^{24}$, and the rock-shaft $b'$ will be moved in the direction indicated by arrow 22 until the projection or arm $b^{24}$ strikes the long arm $b^{23}$ of the lever $b^{18}$, and when the projection $b^{24}$ strikes the arm $b^{23}$ the rock-shaft $b'$ will be stopped in its movement in the direction of arrow 22, and at such time the type-carrier shaft and the type-carrier will have been elevated the desired or required distance to place the second row of characters in correct printing position. The movement of the arms $b^{23}$ $b^{24}$ is so timed that the arm $b^{23}$ is engaged by the arm $b^{24}$ before the rock-shaft $b'$ can be moved a sufficient distance to move the type-carrier beyond its correct printing position.

The rock-shaft $b'$ when operated by the armature $b^8$ of the second elevating-magnet $b^6$, is stopped in its rotation by a second stopping device, which in the present instance is the bracket $b^{19}$. In practice we prefer to employ an adjusting screw or stop $b^{25}$, (see Fig. 1,) which is extended through the bracket $b^{19}$ and is engaged by the crank or arm $b^{17}$ on the rock-shaft $b'$. When the magnet $b^6$ is energized, its armature $b^8$ moves the crank or arm $b^{13}$ and by means of the pin $b^{15}$ abutting against the crank or arm $b^{17}$ rocks the shaft $b'$. When the electromagnet $b^5$ is energized, the pin $b^{14}$ on the crank $b^{12}$, to which the armature $b^7$ is connected, abuts against the crank or arm $b^{16}$ and rocks the shaft $b'$, and when the electromagnet $b^6$ is energized the armature $b^7$ of the magnet $b^5$, its connecting-rod $b^9$, the crank-arm $b^{12}$, the link $b^{21}$, and the elbow-lever $b^{18}$ remain stationary owing to the fact that the crank-arm $b^{12}$ is loosely mounted on the rock-shaft $b'$, and when these parts are operating the armature $b^8$, its connecting-rod $b^{10}$, and crank-arm $b^{13}$ remain stationary. It will thus be seen that the shaft $b'$ may be rocked by energizing either of the elevating-magnets, and the type-carrier shaft and its type-carrier may be elevated different distances, according to which magnet is energized. Furthermore, it will be noticed that the extent of movement of the type-carrier and its shaft is positively limited, so that perfect alinement of the characters on the type-carrier with relation to the hammer is obtained. We may prefer the construction of stopping devices herein shown; but we do not desire to limit our invention in this respect, as any other stopping device operated by the movement of the armatures of the elevating-electromagnets we deem within the scope of our invention.

The type-carrier segments $a^{17}$ $a^{18}$ are moved in a horizontal plane by the driving-arms $a^{24}$ $a^{25}$, secured to or forming part of the sleeves $a^{26}$ $a^{27}$, as described, and the latter are operatively connected, as will be described, to the armatures $b^{30}$ $b^{31}$ of the electromagnets $b^{32}$ $b^{33}$. (See Fig. 11$^a$.) The armature $b^{30}$ is connected by a link $b^{34}$ (see Figs. 1, 2, and 4) to the crank-arm $b^{35}$ on a rock-shaft $b^{36}$, having bearings in arms of a bracket $b^{37}$ and provided with an upright crank or arm $b^{38}$, joined by a rearwardly-extended connecting-rod $b^{39}$ (see Fig. 11$^a$) to a depending arm or crank $b^{40}$ on the sleeve $a^{26}$ and shown only in Fig. 13. The armature $b^{31}$ of the electromagnet $b^{33}$ (see Figs. 1 and 7) is connected in a similar manner to the sleeve $a^{27}$, the said armature, as shown in Fig. 7, being connected by a link $b^{41}$ to a crank-arm $b^{42}$ on a rock-shaft $b^{43}$, having bearings in a bracket $b^{44}$, (see Fig. 1,) the said rock-shaft having an upwardly-extended crank or arm $b^{45}$, joined by a connecting-rod $b^{46}$ to a depending arm $b^{47}$ on the sleeve $a^{27}$ and shown only in Fig. 11. The electromagnets $b^{32}$ $b^{33}$ will be hereinafter designated as the "right" and "left" type-carrier-shifting magnets, by which the type-carrier segments $a^{17}$ $a^{18}$ are respectively moved in a horizontal plane toward the right and left, the type-carrier segment $a^{17}$ being moved toward the left, viewing Fig. 1, when the shifting-magnet $b^{32}$ is energized, and the type-carrier segment $a^{18}$ being moved toward the right, viewing Fig. 1, when the magnet $b^{33}$ is energized.

When the type-carrier segment $a^{17}$ is moved in a horizontal plane toward the left, viewing Fig. 1, it abuts against the arm $a^{41}$ and moves the stop-arm $a^{40}$, connected to or forming part of the arm $a^{41}$, in the direction indicated by arrow 40, Fig. 1, and when the type-carrier segment $a^{18}$ is moved in a horizontal plane toward the right it abuts against the arm $a^{41}$ and moves the stop-arm $a^{40}$ in the opposite direction, (indicated by the arrow 41.) The type-carrier segment $a^{17}$ in its movement toward the left is arrested by one of the stop-pins in the series R at the right of the central portion of the machine, viewing Fig. 2, and the type-carrier segment $a^{18}$ is arrested in its movement by one of the series R' of stop-pins at the left of the central portion of the machine, viewing said figure.

The type-carrier segments $a^{17} a^{18}$ are arrested in their extreme movement by the two outside permanently-elevated pins, (marked 2 3,) and when the stop-arm $a^{40}$ coöperates with either of the said pins a letter or character in the extreme outside vertical row of characters on the type-carrier which is in a horizontal plane with the hammer will have been brought into a vertical line with the hammer or striker and in position to be struck by the same to effect the printing of such character, as will be described.

The apparatus, as herein shown, (see Fig. 2,) is provided with ten pins in the right set or series of pins, and with ten pins in the left set or series of pins and the two extreme outside pins being permanently elevated the remaining nine pins of each set or series are adapted to be raised and lowered, the particular pin raised being selected by circuit-controllers, as will be described. In order to operate or elevate the stop-pins with the fewest number of magnets, corresponding pins of the right and left sets or series R R' are connected so as to be operated in pairs—that is, corresponding pins in the right and left sets R R' are simultaneously operated—which may be accomplished substantially as shown in United States Patent No. 486,889, granted to us November 29, 1892, but which may be accomplished by the construction herein shown and which will now be described. The cross-bar $a^2$ of the framework of the instrument is provided near the front end of the instrument with uprights $b^{50} b^{51}$, (see Fig. 2,) in which are secured rods $b^{52} b^{53}$, (shown best in Fig. 9,) and on each of which rods is pivoted a set of double-fingered lifting-levers $b^{54} b^{55}$. (Shown in Fig. 2 and separately in Fig. 14.) The set of double-fingered levers $b^{54}$ are mounted loosely on the rod $b^{52}$ they being provided with suitable holes or openings $b^{56}$, through which the rod $b^{52}$ is extended, and each double-fingered lever $b^{54}$ is preferably made or struck up from a single piece of sheet metal, the flat blank of which is shown in Fig. 14, the connecting-bar $b^{57}$ being bent upward or raised above the fingers, as represented in Fig. 14. The blank from which a double-fingered lever $b^{55}$ is made has its central portion or connecting-bar $b^{58}$ depressed or lowered below the fingers, as clearly shown in Fig. 2. The rod $b^{52}$ has also mounted on it a double-fingered lever $b^{59}$ of substantially the same shape as the finger-levers $b^{54}$, it having one of its fingers provided with a rearwardly-projecting arm $b^{60}$, (see Fig. 14,) preferably having mounted on it a loose roller $b^{61}$, for a purpose as will be described. The rod $b^{52}$ has mounted upon it, as herein shown, four double-fingered levers $b^{54}$, which coöperate with the four stop-pins adjacent to the outside permanently elevated or stationary pins 2 3 of the sets R R', and the rod $b^{53}$ has mounted upon it four of the double-fingered levers $b^{55}$, which coöperate with the four stop-pins of the sets R R' nearest the center of the instrument, viewing Fig. 2. The fifth stop-pins of the sets or series R R' and marked 5 in Fig. 2 are acted upon by the double-fingered lever $b^{59}$, which latter is preferably mounted on the rod $b^{52}$. It will thus be seen that each set or series R R' of stop-pins has four of its number operated by the double-fingered levers $b^{55}$ and four more operated by the double-fingered levers $b^{54}$ and that the intermediate stop-pin of each set or series is operated by the double-fingered lever $b^{59}$. The intermediate stop-pin when elevated by the double-fingered lever $b^{59}$, as shown in Fig. 2, forms an intermediate stationary pin which coöperates with the first four pins of each set or series and when elevated has the same relation to the first four pins of each set or series as the permanently-elevated outside pins 2 3 have to the next four pins of each set or series.

By means of an intermediate temporarily-stationary pin we are enabled to utilize the first four movable pins of each set for one kind of characters on the type-carrier—as, for instance, figures—and to utilize the next four movable pins for another kind or class of characters—as, for instance, letters—and to effect the operation of the eight movable pins of each series or sets of pins by four electromagnets $c$ $c'$ $c^2$ $c^3$, (see Fig. 2,) which latter will be hereinafter referred to as the "pin-magnets." To enable the first four movable pins to be elevated by the four pin-magnets and to enable the second four movable pins to be also elevated by the same pin-magnets, a selecting device is employed by which either set of the movable pins may be selected for operation to effect the printing of either class of characters.

The selecting device referred to may be made as herein shown, (see Figs. 9, 23, and 24,) it consisting of a guideway, shown as formed by two side bars $c^5$ $c^6$, erected from the base-plate $c^7$, and a sliding bar or shuttle $c^8$, movable in the said guideway, the base-plate $c^7$ being secured in any suitable manner to a stationary support fastened to or forming part of the framework of the machine, it being preferably supported on the cross-bar $a^2$. The side bar $c^5$ is provided, as represented in Fig. 23, with eight holes corresponding in number to the number of movable-pin-operating levers, the said holes being arranged in four pairs of two each, and into which are extended rods $c^9$ $c^{10}$ $c^{12}$ $c^{13}$ $c^{14}$ $c^{15}$ $c^{16}$ $c^{17}$, pivotally connected in pairs to the upper end of the armatures of the pin-electromagnets, the rods $c^9$ $c^{10}$ for the purpose of illustration being supposed to be connected to the armature $c^{23}$ of the pin-electromagnet $c^3$, (shown in Figs. 2 and 3,) the rods $c^{12} c^{13}$ to the armature $c^{22}$ of the pin-magnet $c^2$, (see Fig. 3,) the rods $c^{14} c^{15}$ to the armature $c^{21}$ of the pin-magnet $c'$, and the rods $c^{16} c^{17}$ to the armature (not herein shown) of the pin-magnet $c$. The opposite side bar $c^6$ of the guideway is provided with eight holes arranged in pairs and corresponding to and in line with the holes in the side bar $c^5$, as clearly shown in Fig. 23. The holes in the side bar $c^6$ have extended into them arms $c^{30} c^{31} c^{32} c^{33} c^{34} c^{35} c^{36} c^{37}$, which are secured to or form part of the double-fingered levers $b^{54} b^{55}$, as shown in Fig. 9. The sliding bar $c^8$ is provided with four sets of holes, each set comprising three openings or holes, marked $c^{38} c^{39} c^{40}$, (see Fig. 24,) the center hole $c^{39}$ of each set being preferably made larger than the remaining holes $c^{38} c^{40}$. The center hole $c^{39}$ of each set, as herein shown, has located in it a loose piston or bunter $c^{41}$, which is adapted to be engaged by one of the pins or rods of each pair connected to the armatures of the pin-magnets, and when actuated the particular piston or bunter operated upon engages with a coöperating arm or projection of one of the double-fingered levers and actuates the same. The holes or openings $c^{38} c^{40}$ are not provided with pistons or bunters, but are left vacant for the reception of one of the pins or arms of each pair connected to the armatures of the pin-magnets, as will be described. It will thus be seen from an inspection of Figs. 23 and 24 that there are four pistons or bunters carried by the sliding bar $c^8$, corresponding to the number of pin-magnets, and that when the sliding bar $c^8$ is in the position represented in Fig. 23 the pins or arms $c^{10} c^{13} c^{15} c^{17}$ coöperate with the four pistons or bunters and will force the said bunters or pistons against the arms $c^{31} c^{33} c^{35} c^{37}$ of the finger-levers $b^{54}$, and consequently with the slide-bar in the position shown in Fig. 25 the four movable double-fingered levers $b^{54}$ are selected for work and coöperate to effect the printing of the letters. Each piston or bunter $c^{41}$ may be returned to its normal position after being pushed forward, as just described, by a spiral spring $c^{410}$, encircling it within the hole $c^{39}$.

If the shuttle or sliding bar $c^8$ is moved toward the left or in the direction indicated by arrow 60, Fig. 23, the bunters or pistons will be brought into line with the projections or arms $c^{30} c^{32} c^{34} c^{36}$ of the double-fingered levers $b^{55}$, and when the four pin-magnets are operated the four inner movable stop-pins will be operated. The shuttle or sliding bar $c^8$ of the selecting device may be moved, as herein shown, by means of electromagnets $c^{50}$ $c^{51}$, (see Figs. 1 and 2,) located at opposite ends of the selecting device and having their armatures operatively connected to the sliding bar $c^8$, as will be described, so that when one magnet, as $c^{51}$, is operated the sliding bar is moved in one direction—as, for instance, in the direction indicated by arrow 60, Fig. 23—and when the other magnet, $c^{50}$, is energized the sliding bar is moved in the opposite direction from that indicated by arrow 60, or toward the right, viewing Fig. 23, which would be toward the left viewing Fig. 1.

The shuttle or slide-bar $c^8$ may be operatively connected to the armatures of the magnets after the manner represented in Fig. 12, only a portion of the armature, (marked $c^{500}$,) which may be that of the electromagnet, as $c^{50}$, being shown.

Referring to Fig. 12, the armature $c^{500}$ of the electromagnet $c^{50}$ has secured to or forming part of it an upright arm $c^{100}$, extended into a slot $c^{101}$ in one arm $c^{102}$ of a lever $c^{103}$, pivoted to a stationary part of the instrument, and having its other arm $c^{104}$ engaging a stud or arm $c^{105}$, depending from one end of the shuttle or slide-bar $c^8$ and extended through a slot $c^{106}$ in the bottom bar $c^7$ of the guideway for the said shuttle. The shuttle $c^8$ at its opposite end is provided with a like depending stud $c^{107}$, extended through a slot $c^{108}$ at that end of the bar $c^7$ and engaged by an arm of a lever of similar construction as the lever $c^{103}$, it having an arm provided with a slot into which is extended a rod or upright on the armature of the magnet $c^{51}$. When the magnet $c^{50}$ is energized, as will be described, its armature is attracted and the lever $c^{103}$ is turned so as to push the stud $c^{105}$ and the slide-bar or shuttle $c^8$ in the direction opposite to that indicated by the arrow 60.

The electromagnets $c^{50} c^{51}$ may be designated "right" and "left" pin-selecting magnets. The shuttle or bar $c^8$ has secured to its upper side, as shown in Fig. 24, a cam-shaped bar $c^{60}$, which coöperates with and acts on the loose roller $b^{61}$ of the arm $b^{60}$ of the intermediate double-fingered lever $b^{59}$. The arm $b^{60}$ is normally in engagement with the uppermost portion of the cam-shaped arm $c^{60}$ on the shuttle $c^8$, and when the said shuttle is moved—as, for instance, in the direction indicated by the arrow 60 in Fig. 23—the cam-shaped bar $c^{60}$ depresses the arm $b^{60}$ and rocks the double-fingered lever $b^{59}$ into its elevated position, (shown in Fig. 2,) thereby elevating the intermediate pin 5 of each set of pins, and as long as the cam-shaped bar $c^{60}$ remains in engagement with the arm $b^{60}$ of the double-fingered lever $b^{59}$ the intermediate stop-pin 5 will be elevated and form the temporarily-stationary pin for the first four pins. In this condition one set of characters—as, for instance, the upper case or figures—may be printed. When the shuttle $c^8$ is moved in a direction opposite to that indicated by arrow 60 in Fig. 23, the lower portion of the cam-bar $c^{60}$ is removed from engagement with the arm $b^{60}$ of the double-fingered lever $b^{59}$ and permits the said lever to descend into its normal or lowered position, the said lever being restored by the action of the springs $a^{34}$ on the intermediate stop-pins 5, which return them into their lower position.

The printing of a character or letter may be effected in the apparatus herein shown by the hammer $a^{52}$, which is operated, as herein shown, by means of the armature $d$ of an electromagnet $d'$, (see Figs. 1 and 3,) which will be hereinafter designated as the "printing-magnet." The armature $d$ when attracted by its magnet engages the arm or projection $a^{53}$, as herein shown, (see Fig. 11,) and rocks the shaft $a^{18}$, so as to move the hammer toward the type-carrier. The armature $d$ and arm $a^{53}$ coöperate in such manner, as will be described, as to permit of a slight backward movement of the said arm when the armature is in its attracted position, which permits the hammer $a^{52}$ to drop back away from the type-carrier after it has effected the printing of a selected character to avoid locking of the type-carrier, as will be described.

The instrument is also provided with a paper holder or carriage, which may and preferably will be of substantially the same construction as shown in the patents referred to, it consisting of two annular side frames or rings $d^2$ $d^3$, joined by a rack-bar $d^5$ at the back and by a front cross-bar $d^6$, (plainly shown in Fig. 15,) the front cross-bar normally resting upon a support, shown as a concaved wheel $d^7$, (see Figs. 9 and 11,) secured, as by a screw $d^8$, to the framework of the machine, the rack-bar $d^5$ being supported upon guide rolls or wheels $d^{10}$, (see Figs. 2 and 9,) having bearings in standards $d^{12}$, supported on opposite sides of the machine by the base $A^2$. The carriage is provided with the usual paper-feed rollers $d^{13}$ $d^{14}$, (represented by dotted lines in Fig. 15,) between which the paper $d^{15}$ is fed. The forward feed of the carriage across the face of the type-carrier is accomplished by an electromechanical feeding mechanism, preferably constructed as herein shown, it consisting, essentially, (see Figs. 15 and 16,) of a feeding-pawl $d^{20}$ and a holding-pawl $d^{21}$, which engage the rack-bar $d^5$ of the said carriage. The pawls $d^{20}$ $d^{21}$ are constructed, as herein shown, to slide vertically in suitable guideways $d^{22}$ $d^{23}$, the guideway $d^{23}$ for the pawl $d^{21}$ being made stationary, it being secured to an upright $d^{24}$, fastened to a base-plate $d^{25}$. The pawl-carrier $d^{22}$ for the pawl $d^{20}$ is secured to or forms part of a crank or arm $d^{26}$, fast on a shaft $d^{27}$, having secured to it the armature $d^{28}$ (shown in Fig. 7) of the carriage-feeding electromagnet $d^{29}$, the armature of the electromagnet $d^{29}$ being herein shown as located below the coils of the said electromagnet and as operated in a direction away from the pole-pieces of its magnet by a retracting-spring $d^{30}$, (see Fig. 15,) secured to an arm $d^{31}$, fastened to or forming part of the rock-shaft $d^{27}$. The armature of the electromagnet $d^{29}$ is limited on its backward movement, so as to correspond to the movement of the paper-carriage, the distance of one tooth of the rack-bar, which may be accomplished by an adjusting-screw $d^{100}$. (Shown in Fig. 7.) When the feed-magnet $d^{29}$ is energized, as will be described, the crank or arm $d^{26}$ is moved backward from the position shown in Fig. 16 or in the direction indicated by the arrow 50 to place the pawl $d^{20}$ in engagement with the next succeeding or adjacent tooth of the rack-bar $d^5$, and when the said magnet is demagnetized the armature is retracted by its spring $d^{30}$, thereby moving the crank or arm $d^{26}$ forward or in the direction indicated by arrow 30 in Fig. 16, and thus feeding the carriage forward the distance of one tooth of the rack-bar, the crank $d^{26}$ being limited in its forward movement by the stop $d^{100}$.

The pawl $d^{20}$ is designated the "feed-pawl," and the pawl $d^{21}$ the "holding-pawl," which holds the carriage stationary when the crank $d^{26}$ is moved in the direction of arrow 50 to bring the pawl $d^{20}$ into engagement with a new tooth of the rack-bar. At the end of a line or during the forward passage of the carriage from one side of the machine to the other the said carriage may be released by withdrawing the pawls $d^{20}$ $d^{21}$ from engagement with the rack-bar. This is accomplished, as herein shown, by means of a releasing device, shown as a bar $d^{35}$, provided with cam-slots $d^{36}$ $d^{37}$, acting upon pins or studs $d^{38}$ $d^{39}$ of the pawls $d^{20}$ $d^{21}$, the bar $d^{35}$ being connected to a crank or arm $d^{40}$, fast on a shaft $d^{41}$, having bearings in the brackets $d^{24}$ $d^{42}$, supported by the plate $d^{25}$ and provided with a second crank-arm $d^{43}$, joined by a link $d^{44}$ to an arm $d^{45}$, secured to or forming part of the armature $d^{46}$ of an electromagnet $d^{47}$, which will be hereinafter referred to as the "carriage-releasing" magnet. The carriage may be returned to its starting or normal position by means of a motor mechanism, which may be of any usual or suitable construction, and which is herein shown as a spring-actuated drum $d^{17}$, (see Fig. 15,) to which is connected one end of a flexible strap $d^{18}$, having its other end fastened to the carriage, as at 55. (See Fig. 3.) The spring $d^{30}$ is made stronger than the spring $d^{170}$ in the drum $d^{17}$, so that the forward feed of the carriage winds up the spring in the drum $d^{17}$.

The spring $d^{170}$ has one end fastened to the drum $d^{17}$ and its other end secured to the shaft $d^{171}$, and the tension of the said spring may be regulated by a suitable device, shown in Fig. 16 as a disk $d^{172}$, fast on the shaft $d^{171}$ and provided on its periphery with holes or sockets $d^{173}$, adapted to receive the end of a rod or bolt $d^{174}$, maintained inserted in a hole or socket by a spring $d^{175}$, encircling said bolt and located in a chambered bearing $d^{176}$, through which the said bolt is extended.

The pin-magnets $c$ $c'$ $c^2$ $c^3$ are adapted, as will be described, to control independent local circuits or independent branches of a single local circuit, and to effect this result the armatures $c^{20}$ $c^{21}$ $c^{22}$ $c^{23}$ of the said pin-magnets have pivotally connected to them rods or bars $d^{50}$ $d^{51}$ $d^{52}$ $d^{53}$, (shown in Fig. 27,) and only one of which is shown in Fig. 9. Each rod or bar referred to is extended through a suitable guide, shown as an upright $d^{54}$, (see Fig. 9,) secured to or forming part of the backstrap $d^{55}$ for the said pin-magnets, each of the said rods or bars being preferably encircled by a spiral spring $d^{56}$, which acts to restore the armature with which its rod is connected back into its normal position away from the poles of its coöperating pin-magnet. The sliding bars or rods $d^{50}$ $d^{51}$ $d^{52}$ $d^{53}$ actuate the circuit-controllers for the local circuits referred to, the said sliding rods having secured to them, as herein represented, (see Figs. 2 and 7,) insulating-blocks $d^{57}$ $d^{58}$ $d^{59}$ $d^{60}$, to which are secured circuit terminals or contacts, shown as bars $d^{61}$ $d^{62}$ $d^{63}$ $d^{64}$, which coöperate with corresponding circuit-terminals, shown as contact-screws carried by terminal plates or strips $d^{65}$ $d^{66}$ $d^{67}$ $d^{68}$ $d^{69}$ $d^{70}$ $d^{71}$ $d^{72}$, secured to insulating bodies or supports $d^{73}$, represented in Figs. 2 and 9 as fastened to the back-straps of the pin-magnets. The circuit-terminal or contact-bar operated by the armature of each pin-magnet may act as a bridge to connect two of the terminal-plates together to complete the local circuit; but in the present instance the terminal plates or strips $d^{66}$ $d^{67}$ are electrically connected together, (see Fig. 2,) and the contact bars or terminals $d^{61}$ $d^{62}$, operated by the armatures of two pin-magnets, (represented in the present instance as the magnets $c$ $c'$,) coöperate to close a single electric circuit or branch of said circuit to energize a single electromagnet, which may be supposed to be the feed-magnet $d^{29}$, and the circuit-controller or key governing the operation of the two pin-magnets $c$ $c'$ to effect the closing of the local circuit of the feed-magnet may be and is herein designated as the "spacer-key." (See Fig. 1.) The contact bar or terminal $d^{63}$, operated by the armature of the pin-magnet $c^2$, coöperates with the terminals $d^{69}$ $d^{70}$, which in the present arrangement of circuits are idle or electrically disconnected. The contact bar or terminal $d^{64}$, operated by the armature of the pin-magnet $c^3$, coöperates with the terminals $d^{71}$ $d^{72}$ of the local circuit containing the carriage-release magnet $d^{47}$. It will thus be seen that when two pin-magnets, as $c$ $c'$, are energized, as will be described, the contact-bars $d^{61}$ $d^{62}$ will be brought into engagement with the terminals $d^{65}$ $d^{66}$ $d^{67}$ $d^{68}$ to complete one local circuit, which includes the carriage-feed magnet $d^{29}$. Also when the pin-magnet $c^3$ is energized the contact-bar $d^{64}$ is brought in contact with the terminals $d^{71}$ $d^{72}$ and will complete another local circuit or a separate branch from the same local battery, which may include the carriage-release electromagnet $d^{47}$. The pin-selecting electromagnets $c^{50}$ $c^{51}$ are also in local circuits or in independent branches connected to the same local battery, as will be hereinafter specifically described, and in the present instance the local circuits of the said pin-selecting magnets are controlled by the elevating-electromagnets, as will be described. For sake of clearness let it be supposed that the first elevating-magnet $c^5$ controls the pin-selecting magnet $c^{51}$ and the second elevating-magnet $b^6$ controls the pin-selecting magnet $c^{50}$.

The armature $b^7$ of the first elevating-magnet $b^5$ has secured to its front side, (see Figs. 1 and 25)—that is, the side contiguous to the pole-pieces of the said magnet—a contact-arm or circuit-terminal 200, secured to an insulating-block 199, carried by the said armature and shown only in Fig. 25. The contact-arm or terminal 200 coöperates with a contact-plate or circuit-terminal 202, (see Fig. 1,) secured to the front side of an insulating-block 204, fastened to or suitably supported on top of the electromagnet $b^5$. The circuit-terminals 200 202 are brought in contact when the armature $b^7$ is attracted by the electromagnet $b^5$, and the local circuit containing the pin-selecting magnet $c^{51}$ is closed, one wire of the said circuit being connected with the contact-arm or terminal 200, and the other wire of the said circuit being connected to the terminal-plate 202, as will be described. The armature $b^8$ of the second elevating-magnet $b^6$ has also secured to it a circuit-terminal or contact-arm 206, electrically separated from the armature $b^8$ by a block of insulating material, (not shown,) but similar to the block 199, the said contact-arm coöperating with a circuit-terminal, shown as a contact-plate 208, which is secured to a block 209 of insulating material fastened to or supported by the electromagnet $b^6$. The contact-arm 206 and its coöperating terminal-plate 208 form the circuit-terminals for the local circuit containing the pin-selecting magnet $c^{50}$.

As has been described, the type-carrier segments $a^{17}$ $a^{18}$ are each provided in the present instance with three horizontal rows of ten characters to each row, and in order to bring either one of the said type-carrier segments into correct printing position, so as, in the present instance, to bring the desired or required letter or character in line with the hammer to be struck thereby, one or more electromagnets are operated substantially as described in our patent above referred to. If the character to be printed is in the first or top horizontal row of the type-carrier segment $a^{17}$ and is the extreme outside letter in said row, then only the shifting-magnet $b^{32}$ will be energized, which, by the intermediate connection heretofore described between its armature $b^{30}$ and the driving-arm $a^{24}$, will move the said type-carrier segment $a^{17}$ in the direction of arrow 51, Fig. 1, and will move the said type-carrier segment through its full range of movement until the stop-arm $a^{40}$ strikes against the permanent stationary pin 2 in the right set R of pins, viewing Fig. 2. If the character to be printed is any other character than the extreme outside character in the normal horizontal row, the shifting-magnet $b^{32}$ will be energized to move the type-carrier $a^{17}$, and also a pin-magnet will be energized to elevate one of the movable pins in the right-hand set of pins to limit the extent or duration of the movement of the said type-carrier, it being supposed in the normal condition of the apparatus that the sliding bar or shuttle $c^8$ is in the position shown in Figs. 23 and 24, so that the pin-magnets will operate on the double-fingered levers $b^{54}$, in which case it will be evident that a pin-selecting magnet does not need to be energized. If the character to be printed is in the normal or top horizontal row of the type-carrier segment $a^{18}$, the shifting-magnet $b^{33}$ is energized to move the type-carrier segment $a^{18}$ in the direction of arrow 50, Fig. 1, through the armature $b^{31}$, and the intermediate connection heretofore described joining said armature with the driving-arm $a^{32}$. If the character to be printed is the extreme outside character in the normal horizontal row of the type-carrier segment $a^{18}$, a pin-magnet is not energized, as the printing of the said character is effected through the stationary pin 3 of the left set R' of pins, as will be described. If the character to be printed is in the second horizontal row, the elevating-magnet $b^5$ is energized in addition to the other magnets required for the first horizontal row, and if the character is in the third horizontal row the elevating-magnet $b^6$ is energized in addition to the magnets required for the first horizontal row.

In order that a series of electromechanical type-writing or printing instruments may be connected together by a minimum number of line-wires, the type-carrier-operating electromagnets of each instrument, which magnets in the present instance are the four pin-magnets, the two elevating-electromagnets and the two type-carrier-shifting magnets are in accordance with our present invention controlled in their operation by polarized relays, herein shown in Fig. 29 as four in number and designated "No. 1," "No. 2," "No. 3," and "No. 4." The No. 1 relay is included in one line-wire L', the No. 2 relay in a line-wire $L^2$, the No. 3 relay in a line-wire $L^3$, and the No. 4 relay in a line-wire $L^4$. Each polarized relay is provided with one or more armatures and for the best results is constructed so that it is responsive to quick reversals of polarity without danger of performing a false work—that is, without danger of closing the wrong circuit, as will be described.

Each polarized relay may be provided with two armatures $m\ m'$, (shown in Fig. 5,) or it may be provided with a single armature $m^2$, as shown in Fig. 6. When the relay is provided with two armatures, as shown in Fig. 5, the armature $m$ is normally held in its central or neutral position between the pole-pieces of the relay and is adapted to be moved by a current of one polarity—as, for instance, the negative current—in a direction to make contact with a circuit-terminal, shown as a set-screw $m^3$, and is prevented from moving beyond the central position in a backward direction when moved by its retractile spring 98 by a back-stop $m^4$.

The armature $m'$ may be moved into engagement with a circuit-terminal or set-screw $m^5$ by a current of opposite polarity—as, for instance, a positive current—and is prevented from moving backward by its spring 99 beyond its central or neutral position by a back-stop $m^6$. With the construction of relay shown in Fig. 5 each armature responds to its own polarity and is not affected by a current of opposite polarity, and, furthermore, it cannot be carried beyond its central or neutral position on its backward movement, thereby obviating the danger of false connections being made with the opposite circuit-terminal.

When the polarized relay is provided with a single armature $m^2$, as shown in Fig. 6, it is held normally in its central position by springs $m^7\ m^8$. The armature $m^2$ when attracted by a current of positive polarity is brought into engagement with a circuit terminal or screw $m^9$, and when attracted by a current of negative polarity it will be brought into contact with the screw $m^{10}$. When the armature $m^2$ is attracted by a current of positive polarity, it is prevented from returning beyond its neutral position on its backward movement by a stop or arm $m^{12}$, pivoted, as at $m^{13}$, and connected by a rod or bar $m^{14}$ to one end of an auxiliary armature $m^{10}$, the latter being attracted by a positive current, so as to bring the back-stop $m^{12}$ out of line with a slot or opening $m^{16}$ in the armature and with which the back-stop normally registers. When the armature $m^2$ is attracted by a current of negative polarity, it is prevented from passing beyond its central or neutral position on its return movement by a back-stop $m^{17}$, pivoted, as at $m^{18}$, and joined by a bar $m^{19}$ to the other end of the auxiliary armature $m^{15}$, the latter being pivoted as at $m^{20}$. The relays shown in Figs. 5 and 6 are not herein specifically claimed.

For purpose of illustration we have represented in Fig. 29 the armatures of the relays as a single heavy line, and to distinguish we have numbered the said armatures 6 7 8 9.

The armatures referred to are represented in Fig. 29 as connected by a single wire 10 of a local circuit containing a local battery 12, to one pole of which the wire 10 is connected, the other pole of the said battery having connected to it a wire 13, provided with branch wires 14 15 16 17 18 19 and a branch wire 85, containing circuit-terminals, as will be described, and itself having branches 20 21, the branches 14 to 21, inclusive, being respectively joined to circuit-terminals 22 23 24 25 26 27 28 29, with which the armatures of the relays Nos. 1 to 4 coöperate, as will be described. The branch wires 14 to 21, inclusive, include in them the four pin-magnets $c\ c'\ c^2\ c^3$, the two elevating-magnets $b^5\ b^6$, and the two shifting-magnets $b^{32}\ b^{33}$, and in the diagrams represented in Figs. 29, 30, and 31 the pin-magnets may be supposed to be included in the branch wires 14 to 17, inclusive, the two elevating-magnets in the branch wires 18 to 19, and the two shifting-magnets in the branch wires 20 and 21. By the disposition shown in Fig. 29 it will be noticed that each relay controls the operation of two magnets—that is, relay No. 1 controls the operation of the two pin-magnets $c^3$ $c'$; No. 2, the operation of the pin-magnets $c^3$ $c$; No. 3, the operation of the elevating-magnets $b^5$ $b^6$, and No. 4 the operation of the two shifting-magnets $b^{32}$ $b^{33}$. The relays Nos. 1 to 4 in practice may be connected, as will be described, to a common return-wire $R^5$.

Each row of the type-carrier segments $a^{17}$ $a^{18}$ is provided, as herein shown, with ten characters, five of which are letters, or what may be supposed to be characters of one case, and five of which are figures and other characters and which may be supposed to be characters of another case, which cases may be referred to hereinafter as "figures" and "letters." The characters on the type-carrier $a^{18}$ may be supposed to be the characters of the keyboard shown in Fig. 1 on the left of the dotted line $y$ $y$, and the characters on the type-carrier $a^{17}$ may be those of the keyboard on the right of the line $y$ $y$.

In the printing of the different characters it has already been described how some characters require the energizing of only a shifting-magnet, others a shifting and pin magnet, others an elevating and shifting magnet, and still others an elevating, shifting, and pin magnet. These magnets being controlled by different relays, as above described, require the energizing of one or more of said relays when a character or letter is to be printed. This being the case, it follows that some characters require the relays to be operated by currents of different polarity in order to move their armatures in the proper direction to close the circuit of the proper or desired electromagnet required to effect the printing of the desired or required character. To illustrate, a character on the normal or top horizontal row of the type-carrier $a^{18}$ requires the energizing of the shifting-magnet $b^{33}$, and therefore relay No. 4 is energized by a current of proper polarity to move its armature in contact with the circuit-terminal 29 to close the circuit of the said shifting-magnet. Let it be supposed that the circuit of the shifting-magnet $b^{33}$ is closed by a current of negative polarity passing through the relay No. 4. If the character to be printed is in the second horizontal row of the type-carrier $a^{18}$, the first elevating-magnet $b^5$ and the shifting-magnet $b^{33}$ are energized, and consequently the relays Nos. 3 and 4 are energized by currents of proper polarity. The relay No. 3 may be supposed to be energized by a current of positive polarity to move its armature into engagement with the circuit-terminal 26, and the relay No. 4 is energized by a current of negative polarity to energize the shifting-magnet $b^{33}$, as above described. If the character is in the third horizontal row of the type-carrier $a^{18}$, the second elevating-magnet $b^6$ is energized and also the shifting-magnet $b^{33}$. The elevating-magnet $b^6$ may be supposed to be energized by a negative current passed through the relay No. 3, which moves the armature 8 of said relay into engagement with the circuit-terminal 27, and the relay No. 4 is also energized by a current of negative polarity. With the pin-selecting device or shuttle $c^8$ in its normal position in Fig. 23 the characters in the three horizontal rows of the type-carrier $a^{18}$, which would be printed by energizing the relays Nos. 3 and 4, as just described, are the extreme outside characters in the said horizontal rows, which, as represented in Fig. 1, are the letters "Q," "A," and "Z." The printing of these characters or letters after being brought into correct position with relation to the hammer $a^{52}$ is effected by the stationary pin 3 of the left series R' of pins, viewing Fig. 2, as will be described. To print any other character in either of the three horizontal rows on the type-carrier segment $a^{18}$ requires the energizing of a pin-magnet, and in this case one of the relays Nos. 1 and 2 is energized by a current of proper polarity to move the armature of the energized relay, so as to close the circuit of the pin-magnet corresponding to the character or letter selected. To illustrate, let it be supposed that the character to be printed is the second letter from the innermost end of the type-carrier—that is, the end nearest the arm $a^{41}$ in the first or normal horizontal row—which letter, as shown in Fig. 1, is the letter "R." In this case the relay No. 4 is energized by a negative current to operate the shifting-magnet $b^{33}$ and the relay No. 1 is energized by a current of proper polarity to bring the armature of said relay into engagement with the circuit-terminal 23, and thereby close the circuit of the pin-magnet $c'$, which would energize the said magnet and elevate the second pin of the lower-case pins of the left-hand series R', viewing Fig. 2, which would be the seventh pin of the said left-hand series. The current by which the relay No. 1 is energized may be supposed to be a negative current. If the character to be printed is the second letter in the second horizontal row on the type-carrier $a^{18}$, and which character is shown in Fig. 1 as the letter "F," the first elevating-magnet $b^5$ and the pin-magnet $c'$ are energized, the relay No. 3 controlling the magnet $b^5$ being energized, as herein represented by a positive current and the relay No. 1 by a negative current. If the character is in the third horizontal row and the second letter in said row, which is shown in Fig. 1 as the letter "V," the second elevating-magnet $b^6$ and the pin-magnet $c'$ are energized. In this case the relay No. 3 is energized by a negative current and the relay No. 1 also by a negative current to bring their armatures into engagement with the circuit-terminals 27 and 23. If the character to be printed is the fourth letter in the different horizontal rows, and which in the first horizontal row is the letter "W," in the second "S," and in the third "X," the pin-magnet $c$ is energized by energizing the relay No. 2 with a negative current to bring the armature of said relay into engagement with the circuit-terminal 25. If the character to be printed is on the type-carrier $a^{17}$ and in the first horizontal row, the shifting-magnet $b^{32}$ is energized by passing a current of positive polarity through the relay No. 4. If the character is the extreme outside character shown in Fig. 1, as the letter "P," the printing-magnet is energized by the stationary pin 2 in the right-hand series R, viewing Fig. 2. If the character is the second or fourth in the first horizontal row, the pin-magnets $c'$ $c$ are energized by passing a negative current through their governing-relays Nos. 1 and 2. If the character is the first in the first horizontal row, (shown as the letter "Y" in Fig. 1,) the pin-magnet $c^2$ is energized by passing a positive current through the relay No. 1, and if it is the third (shown as the letter "I") the pin-magnet $c^3$ is energized by passing a positive current through the relay No. 2.

The first five characters in the various horizontal rows of the type-carrier segments $a^{17}$ $a^{18}$ nearest the arm $a^{41}$, viewing Figs. 2 and 11, are the upper-case characters and are positioned in the horizontal movements of the type-carriers by the first five pins of the right and left sets or series R R', Fig. 2, and the second five characters in the said horizontal rows are the lower-case or letters and are positioned by the second five pins of the right and left sets R R'. It will thus be seen that to effect the printing of the various characters on the type-carriers one or more relays are required to be energized and that the said relays are and may be operated, some by a current of one polarity and some by a current of the other or opposite polarity. To illustrate: The letter "D" (shown in Fig. 1) is located in the second horizontal row and is the third letter from the inner end of the type-carrier $a^{18}$. To position the type-carrier $a^{18}$ correctly to print the letter "D," the pin-magnet $c^3$, the first elevating-magnet $b^5$, and the shifting-magnet $b^{33}$ are energized. The pin-magnet $c^3$ is energized by passing a positive current through the relay No. 2, the elevating-magnet $b^5$ by passing a positive current through the relay No. 3, and the shifting-magnet $b^{33}$ by passing a negative current through the relay No. 4—that is, two positive currents and one negative current through the said relays are required to effect the printing of the letter "D."

It will be noticed that the first four characters of the lower case and the first four characters of the upper case on the opposite sides of the line $y$ $y$, Fig. 1, are coupled together by the double-fingered levers, making four couples or pairs for each case, which corresponds to the number of pin-magnets.

By energizing the relays Nos. 1 to 4 with currents of proper polarity the type-carriers $a^{17}$ $a^{18}$ may be positioned to bring any other desired character or letter into correct working position with relation to the hammer. The relays required to effect the positioning of the type-carriers are operated by means of a keyboard $A^{10}$, consisting of a series of circuit-controllers and character-keys to operate the said circuit-controllers. The circuit-controllers governed by each character-key correspond to the number of relays required to be operated to effect the correct printing positioning of the type-carrier, and, furthermore, the circuit-controllers are connected to their actuating-batteries in such manner as to send a current of proper polarity through the relays when the circuit-controllers are operated.

The keyboard $A^{10}$, as shown in Fig. 1, is provided with three rows of ten keys each, corresponding in number to the number of characters in each horizontal row of each type-carrier, and the said keyboard is also provided with a fourth row provided with four keys and a side row of two keys. The purpose of the two latter rows will be hereinafter explained. The first row of keys corresponds to the normal horizontal row of characters on the type-carriers $a^{17}$ $a^{18}$, the second to the second row of characters, and the third to the third row of characters.

As has already been explained, the characters in the normal horizontal row on the type-carriers, with the exception of the two extreme outside characters, require the operation of a pin-magnet and a shifting-magnet, while the extreme outside characters require only the shifting-magnet. The characters "Q" and "P" occupy the extreme outside position in the normal horizontal row, and the No. 4 relay is operated to effect the positioning of the type-carriers, the relay No. 4 being operated by a positive current to operate the shifting-magnet $b^{32}$ and position the type-carrier $a^{17}$ and by a negative current to operate the shifting-magnet $b^{33}$ and position the type-carrier $a^{18}$. The remaining characters of the first row require the use of the pin-magnets, and therefore the relays Nos. 1 and 2 are operated by positive and negative currents. The characters in the second and third rows require the operation of the relay No. 3 in addition to those employed in the first row. The circuit-controller for each key may be made as shown in Fig. 19, it consisting, as shown, of a movable member composed of an insulating carrier or support $k$, mounted on the stem or rod $k'$ of the character-key and having secured to it in the present instance two sets of contact members or terminals $k^2$ $k^3$, the number of contact members in each set depending upon the number of relays required to be operated to position the type-carrier so as to bring the letter or character corresponding to the particular key into printing position, which in the present machine is opposite the movable hammer $a^{52}$.

As shown in Fig. 19, the contacts $k^2$ $k^3$ are represented as metallic strips inserted through suitable holes in the insulating carrier or support $k$ and provided with inwardly-bent ends to insure a more perfect contact with their coöperating terminals to be hereinafter described. In Fig. 20 the contacts $k^2$ $k^3$ are shown with twisted body portions, which are inserted in slits in the outside of the insulating-support $k$.

In the first row of the keyboard only one contact member in each set is required for the outside or endmost keys and two contact members in each set for the other keys of the first row. In the second and third rows one additional set of contact members is required for each key—that is, two for the outside keys and three for the intermediate keys.

In the first row of circuit-controllers the outside or extreme circuit-controllers govern the operation of the relay No. 4, as will be described; one of the said circuit-controllers energizing the said relay with a positive current and the other with a negative current. The remaining circuit-controllers of the first row govern the operation of the relays No. 4 and Nos. 1 and 2, according to which pin-magnet is required to be energized, the said circuit-controllers energizing the said relays with positive and negative currents, according to which polarity is required to effect the proper positioning of the type-carrier.

The outside circuit-controllers of the second and third rows govern the operation of the relays Nos. 3 and 4 and the intermediate controllers of the second and third rows govern the operation of the relays Nos. 3 and 4 and also the relays Nos. 1 and 2, as will be described.

The contact members $k^2$ $k^3$ of the circuit-controllers coöperate, as herein shown, with two independent sets of circuit-terminals, one set, for sake of clearness, being designated as the "relay" circuit-terminals and the other set as the "battery" circuit-terminals.

The relay circuit-terminals and the battery circuit-terminals are represented in the present construction of the keyboard as secured to insulating supports or uprights $n^{60}$ $n^{61}$, shown in Fig. 9, as erected upon a baseplate or bottom $n^{63}$ of the keyboard and extended substantially across the same, there being two lines of such supports for each row of character-keys.

As represented in Fig. 29, the relay circuit-terminals coöperating with the contact members $k^2$ on one side of the insulating carrier or support $k$ (shown in Fig. 9) are lettered $n$ $n^{12}$ $n^{25}$ $n^{35}$ in Fig. 29 and are joined to the relays Nos. 1 to 4, inclusive, by the line-wires L′ L² L³ L⁴, and the relay circuit-terminals coöperating with the contact members $k^3$ on the insulating carrier or support $k$ are lettered $n'$ $n^{13}$ $n^{26}$ $n^{36}$ and are joined to the line-wires L′ᵃ L²ᵃ L³ᵃ L⁴ᵃ, leading away from the relays, preferably through a combination-switch, to be hereinafter described.

The circuit-terminals $n$ $n'$ $n^{12}$ $n^{13}$ may be further distinguished as the "pin-magnet" relay-terminals, the terminals $n^{25}$ $n^{26}$ as the "elevating-magnet" relay-terminals, and the terminals $n^{35}$ $n^{36}$ as the "shifting-magnet" relay-terminals. These terminals may be made as separate pieces; but for simplicity the relay-terminals of like polarity of all the circuit-controllers in each row of the keyboard are preferably connected together and made from or secured to a single bar, as represented in Fig. 8 and in the diagram Fig. 31. In practice the terminals on one bar are arranged or made on its bar with relation to the terminals on the other bars, so that when the said terminal-carrying bars are secured to their uprights or supports $n^{60}$ $n^{61}$ the terminals coöperating with the contact members $k^2$ $k^3$ of one circuit-controller will be grouped or arranged side by side and separated from the terminals coöperating with the contact members of the next adjacent circuit-controller, as clearly shown in Fig. 17.

The circuit-terminals for the relays Nos. 1 to 4 have coöperating with them battery circuit-terminals of similar construction, which are secured to the uprights or supports $n^{60}$ $n^{61}$ above the relay circuit-terminals, as shown in Fig. 9 and represented in diagram Figs. 29, 30, 31, and 31ᵃ.

The number of battery circuit-terminals in each row of circuit-controllers varies according to the number of different magnets required to effect the printing of the letters or characters in the said rows. For instance, only the pin-magnets and shifting-magnets are required for the characters in the first row of the keyboard shown in Fig. 1, and inasmuch as the characters in the normal row on one type-carrier, as $a^{17}$, require a positive current for the relays Nos. 1 and 2, controlling the pin-magnets, a positive circuit-terminal-carrying bar $n^3$ is secured to one upright or support, shown in Fig. 9 as the upright $n^{60}$, and a negative terminal-bar $n^2$ is secured to the upright $n^{61}$, the said terminal-bars being respectively connected to the positive and negative poles of a battery $n^6$, (see Fig. 29,) so that when a character-key in the first row at the right of the line $y$ $y$, Fig. 1, is operated a positive current will pass through the relays Nos. 1 and 2.

In the diagram Fig. 29 the battery-terminals $n^3$ $n^2$, coöperating with the No. 1 relay-terminals $n$ $n'$, are joined by wires $n^4$ $n^5$ to the positive and negative poles of the battery $n^6$, and the same battery-terminals coöperating with the No. 2 relay-terminals $n^{12}$ $n^{13}$ are represented in the said diagram as connected by wires $n^7$ $n^8$ to the wires $n^4$ $n^5$. It will be understood that the battery-terminals $n^3$ $n^2$ coöperate with the relay-terminals $n^{12}$ $n^{13}$ and are secured to the same bar as the terminals $n^3$ $n^2$, which coöperate with the relay-terminals $n$ $n'$, and these bars are marked $n^3 n^2$ in Fig. 9.

The characters in the first horizontal row on the type-carrier $a^{18}$ require the relays to be operated by a current of negative polarity, and therefore a negative circuit-terminalcarrying bar $n^{70}$ (see Fig. 9) is secured to the upright $n^{60}$ in the first row of the keyboard and a positive-current terminal-bar $n^{71}$ is connected to the upright $n^{61}$, and these battery terminal-bars coöperate with the relay-terminals $n$ $n'$ $n^{12}$ $n^{13}$, so that when a character-key in the first row at the left of the line $y$ $y$, Fig. 1, is operated a negative current will pass through the relays Nos. 1 and 2. In this manner a negative terminal-carrying bar $n^{72}$ and a positive terminal-bar $n^{73}$, controlling the shifting-magnet relays No. 4, are secured to the upright $n^{60}$ and a coöperating positive terminal-bar $n^{74}$ and negative terminal-bar $n^{75}$ are secured to the upright $n^{61}$.

The battery-terminals $n^{72}$ $n^{74}$ are represented in Fig. 29 as connected to the negative and positive poles of the battery $n^{30}$ by wires $n^{31}$ $n^{32}$, and the battery terminal-bars $n^{73}$ $n^{75}$ are in practice also connected to the positive and negative poles of the same battery, but this connection is not shown in the diagram Fig. 29, but is shown in Fig. 31$^{a}$.

Referring to Fig. 17, it will be seen that the contact-carrier $k$ of the letter "Q" is provided with one set of contacts $k^2$ $k^3$, which coöperate with the negative and positive battery-terminals $n^{72}$ $n^{74}$ and connect them with the shifting-magnet-relay terminals $n^{35}$ $n^{36}$, respectively, so as to send a negative current from the shifting-magnet battery $n^{30}$ through the relay No. 4. The contact-carrier of the letter "P" also has one set of contacts $k^2$ $k^3$, which coöperates with the positive and negative battery-terminals $n^{73}$ $n^{75}$ and connects them with the shifting-magnet-relay terminal-bars $n^{35}$ $n^{36}$, as shown in the diagram Fig. 29, so as to send a positive current from the shifting-magnet battery $n^{30}$ through the relay No. 4. The contact-carriers of the four remaining character-keys on the left of the dotted lines $y$ $y$, Fig. 1, are provided with two sets of contacts, one set coöperating with the battery-terminal bars $n^{72}$ $n^{74}$ and with the shifting-magnet-relay terminal-bars $n^{35}$ $n^{36}$ to send a negative current through the shifting-relay No. 4 and the other set coöperating with the battery-terminal bars $n^3$ $n^2$ $n^{70}$ $n^{71}$ and with the pin-magnet terminal-bars $n$ $n'$ $n^{12}$ $n^{13}$ to send either a positive or negative current through either the relay No. 1 or relay No. 2, according to which pin-magnet is required, the pin-magnets $c^2$ $c^3$ requiring a positive current through the relays Nos. 1 and 2 and the pin-magnets $c$ $c'$ requiring a negative current through the said relays. The four remaining contact-carriers of the keys on the right of the dotted line $y$ $y$, Fig. 1, also requires two sets of contacts, one coöperating with the battery-terminal bars $n^{73}$ $n^{75}$ and with the shifting-magnet-relay terminal-bars $n^{35}$ $n^{36}$ to send a positive current through the relay No. 4 and the other set coöperating with the battery-terminal bars $n^3$ $n^2$ $n^{70}$ $n^{71}$ and with the pin-magnet-relay terminal-bars $n$ $n'$ $n^{12}$ $n^{13}$ to operate the relays Nos. 1 and 2 with a positive or negative current, according to the pin-magnet to be energized, which is governed by the position of the character on the type-carrier.

The manner of connecting the battery-terminal bars secured to the uprights $n^{60}$ $n^{61}$ of the keyboard is best shown shown by the diagrammatic Fig. 31$^{a}$, wherein the battery-terminal bars $n^{72}$ $n^{73}$, secured to the upright $n^{60}$, are shown as connected to the negative and positive poles of the battery $n^{30}$ by the wires $n^{31}$ $n^{32}$ and the terminal-bars $n^{74}$ $n^{75}$, secured to the upright $n^{61}$, are joined by the wires $n^{32}$ $n^{31}$ to the positive and negative poles of the battery $n^{30}$. The battery-terminals in the second and third rows are the same as in the first row, with the addition of another set of battery-terminal-carrying bars $n^{23}$ $n^{24}$, governing the operation of the elevating-magnet relay No. 3.

By referring to Fig. 29 it will be seen that, as shown in said figure, the first elevating-magnet $b^5$ is governed by a positive current through the relay No. 3, and consequently the elevating-magnet-relay terminal-bars in the second row of the keyboard are connected to the battery $n^{20}$ direct or so as to send a positive current through the relay No. 3. The second elevating-magnet $b^6$ is operated by a negative current through the relay No. 3, and consequently the elevating-magnet-relay terminal-bars in the third row of the keyboard are reversely connected to the battery $n^{20}$ or so as to send a negative current through the relay No 3. In practice the terminal-bars of one polarity and character in the three rows may and preferably will be electrically joined together by end bars $n^{90}$. (Shown in Fig. 4.) To illustrate, the pin-magnet terminal-bars of one polarity in one row are connected to pin-magnet terminal-bars of like polarity in the other rows, &c., after the manner represented in Fig. 31$^{a}$. The portion of the keyboard as thus far described constitutes the main portion of the same, which governs the printing of the characters on the type-carrier; but in the present instance the keyboard is provided with three auxiliary circuit-controlling keys at the front of the keyboard and designated the "call-bell," "spacer," and "carriage-release," and with two keys at the side of the said board controlling the operation of the upper and lower case selecting magnets $c^{50}$ $c^{51}$. For purpose of illustration the pin-selecting magnet $c^{50}$ may be supposed to select the pins for the lower case, (herein indicated in Fig. 1 by large characters,) and the pin-selecting magnet $c^{51}$ may be supposed to select the pins for the upper case, (represented by small characters.) The pin-selecting magnet $c^{50}$ may be governed by one elevating-magnet—as, for instance, the magnet $b^6$—which is energized, as herein represented (see Fig. 29) by a negative current passed through the relay No. 3, and consequently the character-key marked "Letters" in Fig. 1 has the contact-carrier $k$ secured to its stem, provided with one set of contacts, which cooperates with the relay terminal-bars $n^{25}$ $n^{26}$, and with the terminal-bars $n^{23}$ $n^{24}$ of the battery $n^{20}$. The contact-carrier of the key referred to is also provided with two additional sets of contacts, one of which coöperates with the terminals $m'$ $m^2$ of one side or line of a local circuit (see Figs. 29 and 31$^b$) containing a battery $m$, for a purpose as will be described, and the other set of contacts coöperates with battery-terminals $n^{42}$ $n^{43}$ and with relay-terminals $n^{44}$ $n^{45}$, controlling the operation of the relay No. 5, as will be described, the terminal-bars $n^{42}$ $n^{43}$ being shown in Fig. 29 as connected by wires $n^{40}$ $n^{41}$ to the battery $n^{30}$.

The contacts for the No. 3 relay and the contacts for the local circuit, containing the battery $m$, which are operated by the key marked "Letters," control and operate the circuit of the pin or case selecting magnet $c^{50}$ when the instrument is being used for office-work, and when the instrument is being used as a transmitter or receiver the local circuit of the pin-selecting magnet $c^{50}$ is controlled by the relays Nos. 3 and 5, as will be described, and therefore the contact-carrier $k$ on the stem of the key marked "Letters" is provided with the third set of contacts referred to, which coöperate with the terminal-bars $n^{42}$ $n^{43}$ of the battery $n^{30}$ and with the terminal-bars $n^{44}$ $n^{45}$ of the relay No. 5, and which third set of contacts is idle when the instrument is being used for linework, but which is active when the instrument is being used for office-work, as will be described.

When the instrument is being used as a transmitter, the pin or case selecting magnet $c^{50}$ of the said instrument, controlled by the elevating-magnet $b^6$, is operated by closing the circuit of the relays Nos. 3 and 5 with a negative and positive current, respectively, and the terminals $m'$ $m^2$ of one side or line of the local circuit containing the battery $m$ are closed at the same time; but the said side or line of the circuit, including the terminals $m'$ $m^2$, is opened at a different point, as will be described, and therefore the closing of the terminals $m'$ $m^2$ does not produce any effect, but leaves the local circuit of the battery $m$ under control of the relays Nos. 3 and 5, as will be specifically pointed out hereinafter.

The pin or case selecting magnet $c^{51}$ is controlled by the elevating-magnet $b^5$, which is operated by a positive current passed through the relay No. 3 and by the closure of the local circuit containing the battery $m$ by a positive current through the relay No. 5, the elevating-magnet $b^5$ bringing the contact 200 on its armature into engagement with the terminal 202.

The circuit of the relay No. 3 to operate the pin or case selecting magnet $c^{51}$ is controlled by the figure-key of the transmitting-keyboard, the contact-carrier $k$ on the stem of said key having three sets of contacts, which operate in the same manner as those described in connection with the letter-key, with the exception to send a current of opposite polarity through the relay No. 3.

The spacer-key controls the operation of the carriage-feed magnet $d^{29}$ through two pin-magnets, which, as specified, may be the pin-magnets $c$ $c'$. The magnet $c$ is energized by a negative current passed through the relay No. 2 and the magnet $c'$ by a negative current passed through the relay No. 1. Consequently the spacer-key has the contact-carrier $k$ on its stem provided with four sets of contacts, two sets to connect positive and negative terminal-bars $n^3$ $n^2$ of the battery $n^6$ to the terminal-bars $n$ $n'$ of relay No. 1 and $n^{12}$ $n^{13}$ of relay No. 2, a third set to close the terminals $m'$ $m^2$, connected to the local battery $m$, and a fourth set to connect the terminals $n^{42}$ $n^{43}$ of the battery $n^{30}$ with the terminals $n^{44}$ $n^{45}$ of the relay No. 5.

The key controlling the carriage-release magnet $d^{17}$ is provided with three sets of contacts on its stem, one of which coöperates with the terminals $n^2$ $n^3$ of the battery $n^6$ and with the terminals $n^{12}$ $n^{13}$ of the relay No. 2. The second set closes the terminals $m'$ $m^2$, and the third set connects the terminals $n^{42}$ $n^{43}$ with the terminals $n^{44}$ $n^{45}$ of the relay No. 5.

The key controlling the magnet $m^{10}$ of the call-bell $m^{100}$, mounted on the base $A^2$ at the rear of the instrument, as shown in Figs. 1 and 4, is provided with a single set of contacts, which connect the terminals $n^{42}$ $n^{43}$ of the battery $n^{30}$ with the terminals $n^{44}$ $n^{45}$ of the relay No. 5, so as to send a negative current through the said relay.

The call-bell magnet $m^{10}$ is included in circuit with the battery $m$ and is operated and controlled by the relay No. 5, as will be described.

The printing-magnet $d'$ is included in a branch of the local circuit containing the battery $m$, (see Fig. 29,) one end of the magnet-coil being connected by wire $p$ to the circuit-terminal $d^{68}$, and the other end of the said magnet-coil being connected by wire $p'$ to two terminals $p^2$ $p^3$, with which coöperates a movable contact-arm or terminal $p^4$, connected to one pole of the battery $m$, it being shown in Fig. 29 as joined by wire $p^5$ to the wire $p^6$, connected to the negative pole of the battery $m$. The movable terminal or contact-arm $p^4$ is brought into engagement with one of the terminals $p^2$ $p^3$ when the type-carriers $a^{17}$ $a^{18}$ are limited or stopped in their movement by a pin, and in practice the said contact-arm and terminals may be made as shown in Figs. 1 and 11, wherein the terminals $p^2$ $p^3$ are shown as contact-screws extended through arms of a yoke-shaped piece secured to an insulating block or piece $p^7$, fastened to the arm $a^{40}$. The insulating-block $p^7$ has erected upon it an arc-shaped piece $p^8$, within which is pivotally mounted a rock-shaft $p^9$, (see Fig. 9,) to which is attached the contact-arm or terminal $p^4$, the latter, as shown in Fig. 11, having secured to its opposite sides spring-pieces $p^{14}$ $p^{15}$, by which a yielding contact may be made with the stationary terminals $p^2\ p^3$. The rock-shaft $p^9$ is shown in Fig. 9 as a sleeve mounted on a vertical pin $p^\times$, and the said sleeve has attached to it an arm $p^{10}$, provided at its free end, as shown in Fig. 11, with blocks or pieces $p^{12}\ p^{13}$ of insulating material coöperating with the pins in the sets R R', respectively, the pins in the set R acting to turn the rock-shaft $p^9$, so as to bring the spring $p^{14}$ on the terminal or arm $p^4$ into contact with the terminal $p^3$ and the pins in the set R' to bring the spring $p^{15}$ on the terminal or arm $p^4$ into contact with the terminal $p^2$. The stationary terminals $p^2\ p^3$ are connected by a suitable wire (not shown) to a copper or other conducting ring $p^{16}$ on the insulating-hub $a^{43}$, (see Fig. 11,) with which engages a conducting brush or pen $p^{17}$, fastened to an insulating block or support $p^{18}$, secured to the framework of the machine. The arc-shaped piece $p^8$ is electrically con-nected by a wire (not shown) to the conducting-ring $p^{19}$ on the hub $a^{43}$, which ring $p^{19}$ is engaged by a conducting pen or brush $p^{20}$, fastened to the insulating-support $p^{18}$. The metallic ring $p^{16}$ and brush $p^{18}$ are represented in the diagram Fig. 29 by the wire $p'$, and the ring $p^{19}$ and brush $p^{20}$ are represented by the wire $p^5$ in said figure. As above set forth, the carriage-feed magnet $d^{29}$, the carriage-release magnet $d^{47}$, the call-bell magnet $m^{10}$, and the pin or case selecting magnets $c^{50}\ c^{51}$ are included in circuit with a local battery, which is shown in the diagram Fig. 29 as the battery $m$. As represented in Fig. 29, the battery $m$ has its positive wire $p^{25}$ respectively connected by branch wires $p^{26}\ p^{27}\ p^{28}\ p^{29}\ p^{30}$ to one end of the coil of the magnets $d^{29}\ d^{47}\ m^{10}\ c^{50}\ c^{51}$, the other end of the magnet-coils being connected to circuit-terminals, as will be described. The carriage-feed magnet $d^{29}$ is connected by wire $p^{31}$ to the terminal or contact $d^{68}$, to which the wire $p$ of the printing-magnet $d'$ is also connected. The terminal $d^{67}$, coöperating with the terminal $d^{68}$, is joined by wire $p^{32}$ (shown also in Fig. 2) to the terminal $d^{66}$, with which coöperates the terminal $d^{65}$, the latter being represented in Fig. 29 as joined by wire $p^{33}$ to a wire $p^{34}$, the circuit connections of which will be fully traced hereinafter. The circuit of the carriage-feed magnet $d^{29}$ is completed between the terminals $d^{65}\ d^{66}\ d^{67}\ d^{68}$ by the movable contacts or bridges $d^{61}\ d^{62}$, (see also Fig. 27,) which, as above explained, are brought into engagement with their respective terminals by energizing the two pin-magnets $c\ c'$. The carriage-release magnet $d^{47}$ is connected by wire $p^{35}$ to the terminal $d^{72}$, its coöperating terminal $d^{71}$ being joined by wire $p^{36}$ to the wire $p^{34}$. The circuit of the carriage-release magnet $d^{47}$ is closed between its terminals $d^{71}\ d^{72}$, as above set forth, by the movable contact or bridge $d^{64}$, which is operated by the energizing of the pin-magnet $c^3$. The call-bell magnet $m^{10}$ is connected by wire $p^{37}$ to one stop or terminal $p^{38}$ for the armature $p^{39}$ of the fifth relay, (marked No. 5,) the said stop being shown in Fig. 29 as the negative stop—that is, the stop with which the armature $p^{39}$ is brought into engagement by a negative current passed through the said relay.

The pin-selecting magnet $c^{50}$ is connected by wire $p^{40}$ to the terminal 208, carried by the second elevating-magnet $b^6$, and its coöperating terminal 206, which is represented in Fig. 29 as similar to the stationary terminals $d^{65}\ d^{67}\ d^{71}$, but which, as shown in Fig. 1, is movable by reason of its being carried by the armature $b^8$ of the elevating-magnet $b^6$, is connected by wire $p^{41}$ to the wire $p^{34}$. The pin-selecting magnet $c^{51}$ is connected by wire $p^{42}$ to the terminal 202, carried by the first elevating-magnet $b^5$, and its coöperating movable terminal 200, carried by the armature $b^7$ of the said magnet, is joined by wire $p^{43}$ to the wire $p^{34}$. The wire $p^6$, leading from the negative pole of the battery $m$, is connected to the armature $p^{39}$ of the relay No. 5. The circuits of these various magnets will be hereinafter more specifically described.

The keyboard is provided with a switch or circuit-controller, by which the instrument may be changed from a transmitter to a receiver or placed in condition to be used for office-work.

The switch or circuit-controller referred to and which may be designated as the "keyboard-switch" is preferably made as shown in Fig. 22, and consists of a drum $o$, of insulating material, mounted upon a spindle $o'$, extended through the top of the case $n^{20}$ for the transmitting mechanism and stepped in a plate $o^2$, secured to the base $n^{63}$, as by screws $o^4$, (see Fig. 17,) the said spindle being provided, as herein shown, with a star-wheel $o^5$, engaged by a spring-retaining pawl $o^6$. The drum or cylinder $o$ has secured to it, as by screws $o^7$, contact-plates (herein shown as five in number) to correspond to the number of relay-containing lines or wires and herein marked $o^8\ o^9\ o^{10}\ o^{12}\ o^{13}$, (see Figs. 22 and 29,) with which coöperate two sets of contact pens or brushes $o^{14}\ o^{15}\ o^{16}\ o^{17}\ o^{18}$, comprising one set, and $o^{19}\ o^{20}\ o^{21}\ o^{22}\ o^{23}$, comprising the other set. The contact-pens $o^{14}$ to $o^{18}$, inclusive, are connected, respectively, by wires $o^{24}\ o^{25}\ o^{26}\ o^{27}\ o^{28}$ (see Fig. 29) with the line-wires L' L² L³ L⁴ L⁵ on one side of the relay-circuit terminals, and the contact-pens $o^{19}$ to $o^{23}$, inclusive, are respectively connected by wires $o^{29}\ o^{30}\ o^{31}\ o^{32}\ o^{33}$ to the relay-containing wires $L'^a\ L^{2a}\ L^{3a}\ L^{4a}\ L^{5a}$ on the other side of the relay-circuit terminals.

When the instrument is used as a transmitter or for office-work, the keyboard-circuit controller is in the condition represented in Fig. 29ª—that is, with the line-circuits interrupted between one set of contact-pens and the contact-plates $o^8$ to $o^{13}$, inclusive. In this case it will be seen that the line-wires, if otherwise intact, are under the control of the transmitting-keyboard. When the instrument is used as a receiver, the drum $o$ of the switch is turned so as to bring the contacts $o^8$ to $o^{13}$, inclusive, into engagement with both sets of contact-pens $o^{14}$ to $o^{18}$ and $o^{19}$ to $o^{23}$, inclusive, in which case it will readily be seen by inspection of Figs. 29 and 30 that a closed shunt or branch around the relay-terminals of each line is established, which maintains the continuity of the main lines through the receiving instrument.

The instrument may and preferably will be provided with a circuit-controller or switch, which we prefer to call the "combination-switch" and which may be substantially such as shown and described in United States Patent No. 487,229, granted to us November 29, 1892, but which is represented in Figs. 10 and 32 as a hollow drum or cylinder $o^{40}$, of insulating material, herein represented as closed at its upper end and fast on a shaft $o^{41}$, provided with a handle or index $o^{42}$, the said shaft having bearings in a supporting-frame consisting, as shown in Fig. 10, of top and bottom cross-arms $o^{43} o^{44}$, connected together by vertical bars $o^{45}$. In the present instance four connecting-bars $o^{45}$ are shown, to which are secured insulating pieces or supports $o^{46} o^{47} o^{48} o^{49}$, to each of which are secured eight terminal brushes, springs, or pens, which, for sake of clearness, may be marked $o^{46a} o^{46b} o^{46c} o^{46d} o^{46e} o^{46f} o^{46g} o^{46h} o^{47}$, &c. These terminal brushes or pens coöperate with contact studs or terminals $o^{50}$, secured to the shell of the drum or cylinder and preferably arranged in longitudinal and circumferential rows, each longitudinal row comprising eight contacts. As represented in Fig. 32, the shell of the drum or cylinder $o^{40}$ is provided with thirty-two vertical or longitudinal rows of contacts or terminals which are arranged in four sections of eight contacts each to correspond to the four sets of terminal pens or brushes.

The sections of the cylinder or drum $o^{40}$ are best represented in the developed views shown in Figs. 33 to 36, inclusive, and to facilitate description the said sections are marked $o^{40a} o^{40b} o^{40c} o^{40d}$. The outermost row of contacts $o^{50}$ at the left of the sections $o^{40a} o^{40b} o^{40c} o^{40d}$ (shown in Figs. 33 to 36, inclusive) are and may be engaged by the coöperating terminal pens or brushes $o^{46a} o^{47a} o^{48a} o^{49a}$, &c., and when thus engaged the instrument controlled by this particular combination-switch may be used for office-work, and therefore this first row of contacts may be termed "office-contacts." The second vertical row of contacts are and may be employed when the instrument is connected in circuit with the other instruments, either as a transmitter or as a receiver, and may be termed "general" contacts. The remaining vertical rows of contacts may be termed the "private" contacts, to be used when private communication is to take place between two of a series of instruments connected in the same circuit, as illustrated in Fig. 39. The contacts or terminals on the various sections of the combination-switch are electrically connected in such manner as to complete the circuits which are active or required in the particular work performed. To illustrate, when the instrument is to be used for office-work the relays 1 to 4, inclusive, are cut off from the same relays or any other instruments normally in circuit with the first-mentioned instrument, and a portion of the common return-wire $R^5$ between the contact brushes, pens, or terminals $o^{48a} o^{49a}$ (see Fig. 31) is cut out of the said return-wire, and the relays 1 to 4 are electrically connected to this cut-out portion of the return-wire. This may be effected by connecting the contacts $o^{48b} o^{48c} o^{48d} o^{48e}$ of the "office-row" of contacts of one section—as, for instance, the section $o^{40c}$—to the contact $o^{48a}$ and by connecting the contacts $o^{49b} o^{49c} o^{49d} o^{49e}$ of the office-row of contacts on the section $o^{40d}$ to the contact $o^{49a}$. The connection of the contacts referred to on the section $o^{40c}$ is represented in Fig. 31 by the bar $o^{100}$ and on the section $o^{40d}$ by the bar $o^{101}$. The bars $o^{100} o^{101}$ are represented in Figs. 33 and 35 by dotted lines. While the instrument is being used for office-work the return-wire and the relay-wires for the remaining instruments in the circuit may be completed at the instrument being used for office-work by connecting the contact $o^{46a}$ to $o^{46e}$, inclusive, on the section $o^{40a}$ with the contacts $o^{47a}$ to $o^{47e}$ on the section $o^{40b}$, and these connections are represented in Fig. 31 by the dotted lines $o^{102} o^{103} o^{104} o^{105} o^{106}$. When the instrument is used as a transmitter or receiver, either for general work or for private communication, the terminal pens or brushes $o^{48a}$ to $o^{48e}$, inclusive, are connected to the contact pens or brushes $o^{46a}$ to $o^{46e}$, inclusive, which connection may be effected by joining together the contacts $o^{50}$ of the second vertical row on the sections $o^{40c}$ to $o^{40a}$ with which the said terminal pens or brushes engage when the cylinder or drum $o^{40}$ is turned to bring the second vertical row of contacts $o^{50}$ into engagement with the said pens or brushes. The connecting together of the terminals $O^{50}$ referred to may be effected by suitable wires within the cylinder or drum $o^{40}$ and which are represented in Fig. 29 by the dotted lines 103 104 105 106 107. The terminal pens or brushes $o^{49a}$ to $o^{49e}$, inclusive, are connected to the terminal pens or brushes $o^{47a}$ to $o^{47e}$, inclusive, which may be effected by joining together the contact-studs $o^{50}$ in the second vertical row on the sections $o^{40d} o^{40b}$, with which the contact-pens $o^{49a}$ to $o^{49e}$ and $o^{47a}$ to $o^{47e}$ coöperate. These connections are represented in Fig. 29 by the dotted lines 108 109 110 111 112. The contacts $o^{50}$ of all the vertical rows on the sections $o^{40a} o^{40c}$, with which coöperate the terminal pens or brushes $o^{46f} o^{48f}$, are joined together, as represented by the dotted line 113 in Figs. 29 and 31, and the contacts $o^{50}$ of all the vertical rows on the sections $o^{40b} o^{40d}$, with which coöperate the terminal pens or brushes $o^{47f} o^{49f}$, are joined together, as represented by the dotted line 114 in Figs. 29 and 31. When the instrument is being used for office-work, as represented in Fig. 31, the contact on the section $o^{40a}$, with which coöperates the terminal pen or brush $o^{46h}$, is joined to the contact on the section $o^{40c}$, with which coöperates the terminal pen $o^{48g}$, for a purpose as will be described, and this connection is represented in Fig. 31 by the dotted line 115. So, also, when the instrument is being used for office-work the contacts $o^{50}$ on the sections $o^{40d}\ o^{40b}$, with which coöperate the contact pens or brushes $o^{49g}\ o^{47g}$, are disconnected from each other, as shown in Fig. 31, while the contacts $o^{50}$ on the said sections with which coöperate the terminal pens or brushes $o^{49h}\ o^{47h}$ are joined together, as represented by the dotted line 116. The terminal pens or brushes $o^{49g}\ o^{47g}$ are connected by wires 117 118 (see Figs. 29 and 31) to the line-wire $L^{5a}$ between the relay-terminal $n^{45}$ and the terminal pen or brush $o^{49f}$, the said line-wire being interrupted between the junctions of the wires 117 118, so that the latter wires practically form part of the said line-wire $L^{5a}$, for a purpose as will be hereinafter explained.

The terminal brushes or pens $o^{49h}\ o^{47h}$ are respectively joined by wires 119 120 to the branch wires $o^{33}\ o^{28}$, for a purpose as will be described.

In this present instance the terminal brush or pen $o^{46g}$ is not connected in any circuit, as shown in Figs. 29 and 31, while the contact-pen $o^{46h}$ has connected to it the wire $p^{34}$. The terminal-pen $o^{48g}$ is connected by wire $p^{50}$ to the terminal $m^2$, and the terminal-pen $o^{48h}$ is connected by wire $p^{51}$ to the positive stop $p^{52}$ for the armature $p^{39}$ of the No. 5 relay. The wire $p^6$, leading to the negative pole of the battery $m$, is joined by branch wire $p^{53}$ to the terminal $m'$. When the instrument is being used as a transmitter or receiver, the terminals or contacts $o^{50}$ in the vertical rows of the sections $o^{40d}\ o^{40b}$, with which coöperate the terminal pens or brushes $o^{49g}\ o^{47g}$, are joined together, as represented in Fig. 29 by the dotted line 121, while the contacts $o^{50}$ on the sections $o^{40a}\ o^{40c}$, with which coöperate the terminal pens or brushes $o^{46h}\ o^{48h}$, are electrically joined together, as represented by the dotted line 122.

The No. 5 relay in the present instance performs two distinct offices—viz., it controls the operation of the call-bell magnet $m^{10}$ and also the operation of the carriage-feed magnet $d^{29}$, the carrier-release magnet $d^{47}$, and the pin-selecting magnets $c^{50}\ c^{51}$. The call-bell magnet $m^{10}$ is energized by a negative current passed through the No. 5 relay, whereas a positive current passed through the relay No. 5 closes the circuit of the battery $m$ between the armature $p^{39}$ and the positive stop $p^{52}$, and thereby energizes the particular one of the magnets $d^{29}\ d^{47}\ c^{50}\ c^{51}$, whose circuit is closed by the particular key depressed, the circuit of the feed-magnet $d^{29}$ being under the control of the key marked "Spacer" in Fig. 1, that of the release-magnet $d^{47}$ being controlled by the key marked "Carriage-release," and the pin or case selecting magnets $c^{50}\ c^{51}$ being under the control of the keys marked "Letters" and "Figures." The call-bell magnet $m^{10}$ is directly controlled by the relay No. 5 and the key marked "Call-bell" in Fig. 1 is adapted to connect the battery $n^{30}$ in circuit with the No. 5 relay, so as to send a negative current through said relay.

In order that the call-bell magnet $m^{10}$ may be energized at all times—that is, when the instrument is being used as a transmitter or receiver and also when being used for office-work—it is necessary in the present construction and arrangement of the apparatus that the relay No. 5 should be kept in circuit with the other instruments, so that it may be energized by a negative current to close the circuit of the call-bell magnet $m^{10}$, which circuit will be hereinafter explained.

The No. 5 relay has just been described as operating the magnets $d^{29}\ d^{47}\ c^{50}\ c^{51}$ when the spacer-key, the carriage-release key, and the letters and figures keys are operated.

When the instrument is being used for office-work, it is evident from the above description that the No. 5 relay cannot be used to operate the magnets $d^{29}\ d^{47}\ c^{50}\ c^{51}$, for the reason that the said relay must be left in the main line $L^5$, which remains intact and in circuit with the other instruments, so as to enable the instrument being used for office-work to be called up from the other instruments by the ringing of its call-bell $m^{100}$, effected, as above described, by passing a negative current through the relay No. 5 of the instrument being used for office-work. It follows, therefore, that the magnets $d^{29}\ d^{47}\ c^{50}\ c^{51}$ of the instrument being used for office-work must be energized by other means than the relay No. 5. This is effected in the present instance by closing the circuit of the battery $m$ at another point—namely, at the terminals $m'\ m^2$ of the branch wires $p^{50}\ p^{53}$. In practice there are four branches $p^{50}\ p^{53}$ from the battery $m$, corresponding to the number of magnets to be operated, (see Fig. 31$^b$,) and the terminals $m'\ m^2$ of each branch are connected to the terminals $p^{60}\ p^{61}$ by contacts on the carriers $k$ of each of the following keys of the keyboard—namely, the spacer-key, the carriage-release, and the letters and figures keys, the terminals $p^{60}\ p^{61}$ being electrically joined together, as represented in Figs. 29 and 31 by the dotted line $p^{63}$ and in Fig. 31$^b$ by the metal web, also marked $p^{63}$.

To effect the feed of the paper-carriage when the instrument is being used for office-work, as represented in Fig. 31, the relays Nos. 1 and 2 are energized with negative currents from the battery $n^6$ to energize the pin-magnets $c'\ c$, which attract their armatures and close the local circuit of the feed-magnet $d^{29}$ by bringing the contacts $d^{61}\ d^{62}$ into engagement with the terminals $d^{65}\ d^{66}\ d^{67}\ d^{68}$, respectively, and at the same time the branches $p^{50}\ p^{53}$ are closed by the terminals $p^{60}\ p^{61}$ of the spacer-key. The circuit of the battery $m$ in this instance may be traced as follows in Figs. 31 and 31$^b$, viz: from the positive pole by wires $p^{25}$ $p^{26}$, magnet $d^{29}$, wire $p^{31}$, terminal $d^{63}$, contact $d^{62}$, terminal $d^{67}$, wire $p^{32}$, terminal $d^{66}$, contact $d^{61}$, terminal $d^{65}$, wires $p^{33}$ $p^{34}$ to terminal-pen $o^{46h}$, thence through the combination-switch by wire 115 to terminal-pen $o^{18}$, thence by wire $p^{50}$, terminals $m^2$ $p^{61}$, wire or connection $p^{63}$, terminals $p^{60}$ $m'$, wires $p^{53}$ $p^6$ to the negative pole of the battery. It will thus be seen that the contact-carrier $k$ of the spacer-key is provided with three sets of contacts, which are active when the instrument is being used for office-work, and the said carrier is also provided with an additional set of contacts, which connect with the terminals $n^{42}$ $n^{43}$ of the battery $n^{30}$ with the relay-terminals $n^{44}$ $n^{45}$ of the line-wire $L^5$. This additional set of contacts on the spacer-key would energize the relay No. 5 when the spacer-key is depressed in office-work if provision was not made to interrupt the circuit of the battery $n^{30}$, which is accomplished, as represented in Fig. 31, by not connecting the contact $o^{50}$ on the section $o^{40d}$, with which coöperates the terminal-pen $o^{49g}$ of the combination-switch, with the contact $o^{50}$ on the section $o^{40b}$, with which coöperates the terminal-pen $o^{47g}$. By an inspection of Fig. 31 it will be seen that the circuit or connection of the battery $n^{30}$ to the line $L^5$ is closed between the battery-terminals $n^{42}$ $n^{43}$ and the relay-terminals $n^{44}$ $n^{45}$ by the contacts on the carrier $k$ of the spacer-key when the latter is operated in office-work, but that the circuit of the battery $n^{30}$ from the relay-terminals $n^{45}$ to the terminal-pen $o^{49f}$ is broken between the terminal-pens $o^{49g}$ $o^{47g}$. While this is as described the continuity of the line $L^5$ from any other instrument on the circuit is maintained by the wire 120, connected to the branch wire $o^{29}$, the terminal $o^{47h}$, wire 116, terminal-pen $o^{49h}$, and wire 119 joined to the branch wire $o^{33}$. The connection just described forms a shunt or branch circuit around the relay-terminals $n^{44}$ $n^{45}$, which is open when the instrument is being used for linework as a transmitter or as a receiver, the open condition of the said shunt or branch being shown in Figs. 29 and 30, the said shunt or branch being open between the terminal-pens $o^{47h}$ and $o^{49h}$. When the instrument is used for linework as a transmitter or as a receiver, the continuity of the line $L^5$ is maintained between the terminal-pens $o^{47g}$ and $o^{49g}$ by the wire or connection 121, the circuit from the relay-terminal $n^{45}$ being traced through the wire 118, terminal-pen $o^{47g}$, wire 121, terminal-pen $o^{49g}$, and wire 117 to the line $L^{5a}$, as as clearly shown in Fig. 29.

As above described, the first two left-hand vertical rows of contacts $o^{50}$ on the sections of the combination-switch are employed for office-work and for general communication, and the remaining vertical rows of contacts (marked 1, 2, 3, 4, 5, and 6, in Fig 34) have their contacts $o^{50}$ arranged irregularly or in a different order, so as to obtain private communication between two or more instruments which have the contacts of their combination-switches arranged in like order, the said arrangement of contacts being substantially such as described in United States Patent No. 487,229 above referred to.

In Figs. 37, 38, and 39 we have shown the general order or plan a plurality of instruments have to each other, when, first, one instrument is used for office-work; second, when one instrument is used as a transmitter and the remaining instruments are receiving, and, third, when the instruments of a series are coupled together for private communication by means of their combination-switches. Fig. 37 represents one instrument as being used for office-work, a second instrument as a transmitter, and the three remaining instruments as receivers. Fig. 38 represents the instrument used for office-work in Fig. 37 as transmitting to all the other instruments, and Fig. 39 represents the transmitting instrument of Fig. 38 as connected to a receiving instrument for private communication and as also connected to the other receiving instruments, so that an indistinguishable mess or lot of print will be received by the instruments marked "General," signifying that these latter instruments have their combination-switches on the vertical row of contacts $o^{50}$ marked "General," whereas the transmitter and receiver marked "No. 78" in Fig. 39 have their combination-switches on one of the vertical rows of contacts employed for private communication and marked from 1 to 6 in Fig. 34.

The application of the instruments to a central-office system is represented in Fig. 40, wherein F represents the central station, from which extend five circuits containing electromechanical instruments embodying this invention and represented by the circles F'.

As above set forth, the positioning of the type-carriers $a^{17}$ $a^{18}$, so as to bring a selected character into correct printing position, is effected by passing currents of proper polarity through one or more of the relays Nos. 1 to 4, inclusive, the number of relays employed to position the said carriers varying according to the position or location of the selected character on the said type-carriers. The printing of the selected character after it has been positioned is effected by the circuit-closing device carried by the arm $a^{40}$ and which is represented in Figs. 29 and 31 by the arm $p^4$, coöperating with the terminals $p^2$ $p^3$ of the local circuit containing the battery $m$ and printing-magnet $d'$. The movable arm or terminal $p^4$ is engaged with the terminal $p^2$ by the insulating-block $p^{12}$ on the arm $p^{10}$, (shown in Fig. 11,) being brought against the pins of the set R, which is effected by the movement of the type-carrier segment $a^{17}$ in a horizontal path, and the movable terminal $p^4$ is engaged with the terminal $p^3$ by the insulating-block $p^{13}$ being brought against the pins of the set R', which is effected by the movement of the type-carrier segment $a^{18}$ in a horizontal path. When the movable arm or terminal $p^4$ is brought into engagement with the terminal $p^2$, the circuit of the battery $m$ is closed through the printing-magnet $d'$ and through the feed-magnet $d^{29}$, which circuit may be traced as follows, viz: from the positive pole of the battery $m$ by wires $p^{25}\,p^{26}$, through the feed-magnet $d^{29}$, wires $p^{31}\,p$, printing-magnet $d'$, wire $p'$, terminal $p^2$, arm or terminal $p^4$, wires $p^5\,p^6$ to the negative pole of the battery. When the arm or terminal $p^4$ is brought into engagement with the terminal $p^3$, the same circuit of the magnets $d^{29}\,d'$ is closed. The closing of the printing-magnet circuit, as described, energizes the printing-magnet $d'$ and also the carriage-feed magnet $d^{29}$, which attract their armatures $d$ and $d^{28}$. The armature $d$ on its movement toward the poles of the printing-magnet engages the arm $a^{53}$ on the rock-shaft $a^{48}$ (see Fig. 11) and moves the hammer $a^{52}$ forward against the type in line with it. Inasmuch as the circuit of the printing-magnet $d'$ is controlled by the arm $p^4$, movable with the type-carrier, it will be seen that the hammer $a^{52}$ when it has struck the paper against the type-carrier would mechanically lock the type-carrier and prevent its return horizontal movement to its normal position as long as the local circuit of the printing-magnet remained closed by the contact of the arm $a^{40}$ with one of the pins of the sets R R', which would electrically lock the hammer against the type-carrier, and thereby render the instrument non-operative for further work. To avoid this, the type-carrier is automatically released as soon as the hammer has effected the printing of the selected character, which may and preferably will be accomplished, as herein shown, by leaving the arm $a^{53}$ free to continue on in its path of movement when the armature $d$ is in its attracted position against the poles of the magnet $d'$ and making the hammer of such length that when the arm $a^{53}$ bears against the armature $d$ in its attracted position the hammer $a^{52}$ will not be in engagement with the type-carrier, but will be removed therefrom a sufficient distance to leave the type-carrier free to move horizontally. The hammer $a^{52}$ is carried forward into contact with the type-carrier by the force of the blow occasioned by the armature $d$ bringing up against its pole-pieces. The feed-magnet $d^{29}$ when energized as above described brings the feed-pawl $d^{20}$ into engagement with a new tooth of the rack-bar on the paper-carriage, and when the said feed-magnet is demagnetized the paper-carriage is moved forward to present a new surface to be printed upon by the retractile spring $d^{30}$ of the feed-magnet armature.

In the present instance the positioning of the type-carriers to place a selected character in correct printing position is effected in one instance by the shifting and pin magnets and in other instances by elevating, shifting, and pin magnets, and in order to render the positioning of the type-carrier absolutely correct, so that all danger of printing a wrong character may be avoided, we prefer to employ one or more electrical governors controlling the circuits in which the positioning-magnets are located. The present apparatus is shown as provided with three governors, one under the control of the first elevating-magnet $b^5$, a second under the control of the second elevating-magnet $b^6$, and a third under the control of the pin-magnets $c\,c'\,c^2\,c^3$. The governor controlled by the first elevating-magnet $b^5$ is shown in Fig. 1 as composed of a movable member or terminal 300, coöperating with two stationary members or terminals 301 302, electrically connected together, as represented in Fig. 29, and between which the member 300 is moved, the latter being carried by the armature $b^7$ of the elevating-magnet $b^5$, but insulated therefrom. The members 301 302 may be joined together in any suitable manner and be secured to a bracket 400 and to an insulating-block 303, carried by the magnet $b^5$. (See Fig. 1.) The governor controlled by the second elevating-magnet $b^6$, as herein shown, is composed of a movable member or terminal 304, carried by the armature $b^8$ of the magnet $b^6$, but insulated therefrom, the said member being movable between two coöperating stationary members 305 306, electrically joined together, as represented in Fig. 29, and supported by insulating-blocks 307 401, the latter being shown in Fig. 1 as carried by the magnet $b^6$. The governor controlled by the pin-magnets may be made as shown in Figs. 1, 2, 9, and 27, it consisting of a movable member and coöperating stationary members. The stationary members are shown as two contact-screws extended through the metal arms 308 and 309 of a U-shaped piece 310, fastened to an insulating support or block 311, which is secured to an upright or standard 312, fastened to the bracket or upright $b^{37}$. The movable member of the governor controlled by the pin-magnets is represented as a metallic arm 313, secured to an insulating collar or arm 314, fast on a rock-shaft 315, having bearings, as herein described, (see Fig. 2,) in the standard 312 and in a second standard 316, erected upon the upright $b^{44}$. The rock-shaft 315 is provided, as herein shown, with four depending arms 317 318 319 320, extended into the path of movement of the sliding bars $d^{50}\,d^{51}\,d^{52}\,d^{53}$, operated by the armatures of the pin-magnets $c\,c'\,c^2\,c^3$, respectively.

The electrical governors referred to are included in circuit with the battery 12, which may be designated as the "type-carrier" battery to distinguish it from the printing-battery $m$.

Referring to Figs. 29, 30, and 31, the members of the three governors are included in the branch 85, leading from the battery-wire 13, the wire 85 being shown as joined to the movable arm or member 313 of the pin-magnet governor, the stationary members 308 309 of which are connected by wire $85^a$ to the stationary members 306 305 of the governor controlled by the second elevating-magnet $b^6$, the movable member 304 of which is joined by wire $85^b$ to the stationary members 302 301 of the governor controlled by the first elevating-magnet $b^5$, the movable member 300 of which is connected by wire $85^c$ and branches 21 20 to the shifting-magnets $b^{33}$ $b^{32}$.

The movable members of the three governors referred to are normally in contact with one of their coöperating stationary members when the instrument is at rest or not in use. As herein shown, the movable member 313 of the pin-governor is in contact with the stationary member 309, the movable member 304 of the second elevating-magnet governor in contact with the stationary member 305, and the movable member 300 of the first elevating-magnet governor in contact with the stationary member 301.

By reference to Figs. 29 and 31 it will be seen that the local circuit of the battery 12 through the pin-magnets $c\ c'\ c^2\ c^3$ and elevating-magnets $b^5\ b^6$ is only open at the armatures of the relays Nos. 1, 2, and 3, and consequently as soon as the relays Nos. 1, 2, and 3 are energized the magnets governed by them will be energized, whereas the shifting-magnets $b^{32}\ b^{33}$ are in a separate circuit from the same battery 12, but which is controlled by the closing of the first circuit. This separate circuit contains the shifting-magnets and the circuit-controllers operated by the pin-magnets and the elevating-magnets, and it will readily be understood that the shifting of the type carrier or carriers cannot take place until the controlling-circuit is completed. To illustrate: Let it be supposed that the character to be printed is in the first horizontal row and is any character requiring the use of a pin—namely, any except the outside character, the printing of which latter is effected by the stationary pins. It follows that a pin-magnet must be energized to elevate a pin and also a shifting-magnet to move the type-carrier into correct position. It might happen without the electrical governor that the shifting-magnet would be operated before the pin-magnet and that the latter would not operate until after the shifting-magnet had carried the arm $a^{40}$ beyond the pin lifted by the said pin-magnet. In this case it will readily be seen that the type-carrier would be carried beyond its proper position, and a wrong character would be printed by the end pins closing the circuit of the printing-battery $m$. By means of the electrical governor operated by the pin-magnets and controlling the circuit of the shifting-magnet such an error could not be made in the instrument herein shown, for the reason that as soon as the circuit of a pin-magnet is completed at the armature of either the relay No. 1 or No. 2 the armature of the said pin-magnet is attracted and the rod operated thereby strikes one of the depending arms on the rock-shaft 315 and moves the contact-arm 313 from engagement with the terminal 309 and carries it over into engagement with the terminal 308. During the time in which the contact-arm travels from the terminal 309 to the terminal 308 the circuit containing the shifting-magnets 532 $b^{33}$ is broken or open, thereby preventing the said shifting-magnets being energized until the contact-arm 313 engages the terminal 308, whereas during the time the shifting-magnet circuit is momentarily open the circuit of the pin-magnet is closed, and sufficient time has elapsed to insure the pin being lifted into its elevated position before the type-carrier is moved by the shifting-magnet. In the same manner the movable contact 300 of the first elevating-governor momentarily opens the circuit of the shifting-magnets, when it is moved from engagement with the terminal 301 to the terminal 302, and so, also, the contact 304 of the second elevating-magnet momentarily opens the shifting-magnet circuit when it is moved from the terminal 305 to the terminal 306. It will thus be seen that the shifting-magnets are controlled by each elevating-magnet alone or in conjunction with a pin-magnet or by the pin-magnets alone, and therefore while we may prefer to employ all three governors we do not desire to limit ourselves in this respect, as the pin-governors may be dispensed with, as the liability of error is not so great on the first horizontal row and is much greater on the second and third horizontal rows.

The keyboard may be provided with an indicator for the upper and lower case keys to enable the operator to tell what case character was last printed, which would be especially advantageous in case of an interruption.

The indicator referred to is best shown in Fig. 18 and consists of an arm $w$, pivoted at its lower end, as at $w'$, and provided with two fingers $w^2\ w^3$, which coöperate with two studs or projections $w^4\ w^5$ on the side of the contact-carriers of the "letters" and "figures" keys, respectively, and by which the indicator is turned on its pivot so as to bring the upper end of the arm $w$ nearer the key last depressed. As represented in Fig. 18, the indicator points toward the letters-key, which signifies to the operator that a lower-case character was last printed. By an inspection of Fig. 18 it will be seen that the arm $w^2$ is moved away from the stud $w^4$ on the lower-case key and that the finger $w^3$ is substantially in contact with the stud $w^5$ and is in position to be acted upon by said stud when the upper-case key is depressed, which would turn the arm $w$ on its pivot and move it toward the upper-case key. The arm $w$ is provided, as shown, with a top plate $w^{200}$, having inscribed or otherwise affixed on it the words "Letters, Figures," the said top plate being movable beneath a slot or opening $w^{210}$ in the cover of the keyboard, as represented in Fig. 1.

To facilitate construction and connection of an instrument in circuit with other instruments, the base $A^2$ of the machine portion of the instrument and the base $n^{63}$ of the keyboard are removably secured to or supported on a foundation plate, board, or table $A^{100}$, provided, as represented in Figs. 9 and 26, with raised sides $w^{10}$, ends $w^{12}$, and cross-piece $w^{13}$. The base $A^2$ of the machine portion of the instrument and the base $n^{63}$ of the keyboard may be removably secured to the table $A^{100}$, as herein represented, (see Fig. 28,) by posts or legs $w^{14}$ on the base $A^2$ and $w^{15}$ on the base $n^{63}$, which enter suitable sockets or holes $w^{16}$ in the sides $w^{10}$ of the table or plate $A^{100}$. The bases $A^2$ $n^{63}$ are preferably made of metal and have secured to their under side insulated supports $w^{17}$ $w^{18}$, to which are secured, as by screws $w^{19}$ $w^{20}$, contacts $w^{21}$ $w^{22}$, which coöperate, respectively, with contacts $w^{23}$ $w^{24}$ on the plate or table $A^{100}$. (See Figs. 9 and 26.) The contacts $w^{23}$ $w^{24}$ are shown in Figs. 9 and 26 as contact springs or brushes secured to insulating-supports $w^{25}$ $w^{26}$, respectively, the latter being firmly secured to the plate or table $A^{100}$, which is preferably made of metal. The contacts $w^{21}$ $w^{23}$ may be termed the "machine-contacts" and the contacts $w^{22}$ $w^{24}$ the "keyboard-contacts."

In the instrument herein shown the machine-contacts are fourteen in number, eight of which are employed for the eight operating-magnets controlled by the relays Nos. 1 to 4, one for the common return-wire $R^5$, two for the local of the printing-magnet $d'$, one for the wire $p^6$ of the armature of the No. 5 relay, and one for the wire $p^{34}$. The keyboard-contacts are eighteen in number, ten of which are employed in the line-wires $L'$ to $L^5$ and $L'^a$ to $L^{5a}$, inclusive, six for the terminals of the batteries $n^6$ $n^{20}$ $n^{30}$, and two for the terminals of the branch wires $p^{50}$ $p^{53}$.

The operation of the instruments when connected together for line transmission may be readily be understood by tracing the circuits of the relays and magnets employed in the printing of a single character. Let it be supposed that the instrument shown in Fig. 29$^a$ (which may be supposed to be the same instrument as shown in Fig. 31) is transmitting a message to the instruments shown in Figs. 29 and 30, the instrument shown in Fig. 29 being connected in circuit between the transmitting instrument shown in Fig. 29$^a$ and the receiving instrument shown in Fig. 30. In this case the instrument shown in Fig. 30 is the endmost instrument in the supposed line-circuit, and its line-wires $L'$ to $L^5$, inclusive, are connected to the common return-wire $R^5$, which may be effected, as represented in Fig. 30, by joining the line-wires $L'$ to $L^5$, inclusive, to binding-posts $l'$ to $l^5$, inclusive, the latter being connected by wire $l^6$ to a binding-post $r^5$, to which the return-wire $R^5$ is joined. The keyboard-switches of the receiving instruments shown in Figs. 29 and 30 are turned into the position indicated in said figures—that is, to complete the circuit of the line-wires around the keyboard—and the combination-switch of the instruments shown in Figs. 29 and 30 are turned so as to place the terminal brushes in engagement with the row of contacts marked "General," in which condition the line-wires $L'$ to $L^5$ from the instrument shown in Fig. 30 to the transmitting instrument shown in Fig. 29$^a$ are complete and under control of the keyboard of the instrument shown in Fig. 29$^a$, the keyboard-switch of the latter instrument being open.

The circuits of the instrument shown in Fig. 31 when changed for office-work to transmitter, so as to transmit to the instruments shown in Figs. 29 and 30, are as shown in Fig. 29, the short circuits of the relays Nos. 1 and 4 being destroyed, the line $L'^a$ being closed by the line 121, the shunt or branch for the relay-terminals $n^{44}$ $n^{45}$ being opened, the connection between the terminal $o^{46h}$ $o^{48g}$ being destroyed, and $o^{46h}$ connected to $o^{48h}$ by wire 122. These changes take place when the terminal-brushes of the combination-switch of the instrument shown in Fig. 31 are placed in engagement with the row of contacts marked "General." Furthermore, with the combination-switches of the receiving instruments turned so as to place their terminal-brushes in engagement with the row of contacts marked "General" the two receiving instruments shown in Figs. 29 and 30 have the terminals $o^{46h}$ connected to the terminals $o^{48h}$, as represented by the dotted line 122 in Figs. 29 and 30, which connection is also represented by the full-line lever $l^{22}$ in the diagram Fig. 31$^b$. In this condition the local circuit of the battery $m$ of each instrument is placed under the control of the relay No. 5 of its instrument.

In both the transmitting and receiving instruments the call-bell magnet $m^{10}$ is under the control of the No. 5 relay and is actuated when the No. 5 relay is energized with a negative current, as will be described. It will thus be seen that when a message is to be transmitted from the instrument shown in Fig. 29$^a$ to the instruments shown in Figs. 29 and 30 the call-bell of the transmitting and receiving instruments are free to be actuated by the transmission of a current of negative polarity from the transmitter to the receiving instruments through the No. 5 relays of the said instruments.

To illustrate the working of a type-writer system of intercommunication embodying this invention, let it be supposed that it is desired to transmit the figure "4" from the instrument shown in Fig. 29$^a$ to the instruments shown in Figs. 29 and 30. As above described, the upper case or figures in the present instrument employ the first five pins and the lower case or letters the second five pins of each set R R', and in this present construction of instrument it may be required to energize one of the pin or case selecting magnets $c^{50}$ $c^{51}$ to either elevate the temporarily stationary pins (marked 5 in Fig. 2) effected by energizing the magnet $c^{51}$, and thereby bring the first five pins into operative condition, or to lower the pins 5, which is effected by energizing the magnet $c^{50}$, so as to bring the second five pins of each set R R' into operation when a pin-magnet is energized. When, therefore, it is desired to print the upper-case character "4," the operator first strikes the upper-case key marked "Figures" of the transmitting instrument to place all the instruments in the condition shown in Fig. 29 and with the intermediate pin 5 of each set elevated. When the figure-key is depressed, it energizes the relay No. 3 of all the instruments with a positive current from the battery $n^{20}$ of the transmitting instrument, thereby moving the armature 8 of each relay No. 3 into contact with the terminal 26, (see Fig. 29ª,) which closes the circuit of the battery 12 of each instrument through the elevating-magnet $b^5$ of the said instrument. This circuit may be traced as follows, viz: from the positive pole of the battery $n^{20}$ of the instrument shown in Fig. 29ª by wire $n^{21}$ to battery-terminal $n^{23}$, thence by a contact-key $k^3$ on the carrier $k$ of the figures-key to the relay-terminal $n^{25}$, thence by the line-wire $L^3$ through the relay No. 3 of the transmitting instrument to the combination-switch represented in Fig. 29, by the terminal $o^{48d}$, wire 106, terminal $o^{46d}$, and continuation of line-wire $L^3$ to the terminal $o^{47d}$ of the combination-switch of the next instrument in the line, which in the present instance is supposed to be the instrument shown in Fig. 29. The circuit passes from the terminal $o^{47d}$ of the instrument shown in Fig. 29 to the terminal $o^{49d}$ by wire 111, thence by wires $L^{3a}$, branch wire $o^{31}$, brush $o^{21}$, contact $o^{10}$ of the keyboard-switch to brush $o^{16}$, thence by branch wire $o^{26}$ to line-wire $L^3$ through relay No. 3 of this first receiving instrument, thence by line $L^3$ through the combination-switch from terminal $o^{48d}$ to terminal $o^{46d}$ by wire 106, thence continuing by wire $L^3$ to terminal $o^{47d}$ of the combination-switch of the receiving instrument shown in Fig. 30, thence by wire 111, terminal $o^{49d}$, wire $L^3$, branch wire $o^{31}$, through keyboard-switch by brush $o^{21}$, contact $o^{10}$, brush $o^{16}$, branch wire $o^{26}$ to line $L^3$, thence through relay No. 3 of the second receiving instrument shown in Fig. 30 to terminal $o^{48d}$ of its combination-switch, thence by wire 106, terminal $o^{46d}$, thence by wire $L^3$ to terminal binding-post $l^3$, thence by wire $l^6$ to terminal or binding-post $r^5$, thence by the common return-wire $R^5$ and the wires 103 108 of the combination-switches of the various instruments to the wire $l^{6a}$, which connects the line $L^{3a}$ of the transmitting instrument shown in Fig. 29ª to the return-wire $R^5$, and from the wire $l^{6a}$, terminal $l^{3a}$, terminal $o^{47d}$, wire 111, terminal $o^{49d}$, and wire $L^{3a}$ to the relay-terminal $n^{26}$ of the transmitting-keyboard, thence by contact $k^3$ to battery-terminal $n^{24}$, and thence by wire $n^{22}$ to the negative pole of the battery $n^{20}$ of the transmitting instrument. The relay No. 3 of each instrument is thus energized by a positive current which moves the armature of the said relay into contact with the stop or terminal 26, thereby closing the circuit of the battery 12 through the elevating-magnet $b^5$ of each instrument, and as the work performed by this elevating-magnet is the same in each instrument a description of the work performed by the magnet $b^5$ of the transmitting instrument will suffice for all the instruments. When the elevating-magnet $b^5$ is energized by the armature of the relay No. 3, as just described, it attracts its armature $b^7$ and brings the terminal 200 into contact with the terminal 202, thereby closing the circuit of the battery $m$ at one point through the pin or case selecting magnet $c^{51}$ and leaving the circuit of the battery $m$ of the instrument under the control of the contacts governing the operation of the relay No. 5 with the positive current. The contacts $p^{60} p^{61}$ of the transmitting instrument are brought into engagement with the terminals $m' m^2$ of the branch of the circuit including the battery $m$ at substantially the same time another set of contacts on the said carrier are brought into engagement with the battery-terminals $n^{23} n^{21}$ and with the relay No. 5 terminals $n^{25} n^{26}$; but the contacts $p^{60} p^{61}$ in the transmitter do not perform any work, for the reason that the circuit of the battery $m$ from the terminals $m' m^2$ is open between the terminals $o^{48s} o^{46h}$, as shown in Fig. 29ª. The third set of contacts on the carrier $k$ of the figures-key of the transmitting instrument are also brought into engagement with the terminals $n^{42} n^{43}$ of the battery $n^{30}$ and with the terminals $n^{44} n^{45}$ of the relay No. 5, which energizes this latter relay of both the transmitting and receiving instruments with a positive current, which moves the armature $p^{39}$ of the No. 5 relay into engagement with the positive stop $p^{52}$, thereby closing the local circuit of the battery $m$ in each instrument between the armature $p^{39}$ and the stop $p^{52}$. This effects the energizing of the magnet $c^{51}$ in each instrument by reason of the fact that the circuit of the battery $m$ through this particular magnet—namely, $c^{51}$—is closed between the terminal $o^{48h}$ and the terminal $o^{46h}$, as represented by the dotted line 122 in Figs. 29ª, 29, and 30 and by the full-line lever 122 in the diagram Fig. 31ᵇ, and by reason of the movable terminal 200 being brought into engagement with the terminal 202 by the energizing of the first elevating-magnet $b^5$ of all the instruments, as above described, it will be seen that the circuit of the battery $m$ through the pin-selecting magnet $c^{51}$ is closed in both the transmitting and receiving instruments, and these circuits being identical in Figs. 29ª, 29, and 30 we will describe in detail but one—namely, that shown in Fig. 29ª—in which the circuit may be traced as follows: from the positive pole of the battery $m$ by wires $p^{25} p^{30}$, magnet $c^{51}$, wire $p^{42}$, terminals 202 200, wire $p^{43}$, and wire $p^{34}$ to terminal $o^{46h}$ of the combination-switch, thence by wire 122, terminal $o^{48h}$, and wire $p^{51}$ to the positive stop $p^{52}$ for the armature of the No. 5 relay, thence by the armature $p^{39}$ and wire $p^6$ to the negative pole of the battery $m$. This circuit may also be followed in the diagram Fig. $31^b$. In this manner the pin-selecting magnet $c^{51}$ of the transmitting and receiving instruments is energized and attracts its armature, which moves the shuttle $c^8$ in the direction indicated by arrow 60, Fig. 24, so as to raise the intermediate temporarily-stationary pin of the sets R R' and marked 5 in Fig. 2, and thereby bring into operation the first five pins of each set. Both the transmitting and receiving instruments are now in condition to print upper-case characters, and the particular character with which we have chosen to illustrate the working of the system is the figure "4." The figure "4" being in the first row only requires that the type-carrier in the construction of instrument herein shown be shifted or moved in a horizontal plane and be stopped or arrested in its movement by a movable pin. Let it be supposed that the operator at the transmitting instrument presses the key marked 4 of the keyboard of the said transmitting instrument. In this case the circuits of the two relays are closed—namely, the circuit of the No. 4 relay, controlling the shifting-magnet, required to move the type-carrier into proper position, and the circuit of the No. 1 relay, required to energize the proper pin-magnet to position the type-carrier. In the present construction and arrangement of the instruments the shifting-magnet $b^{33}$ is employed to move the type-carrier $a^{18}$, on which the type or figure "4" is secured or forms part thereof, and the No. 4 relay is energized by a negative current to close the circuit of the type-carrier battery 12 of each instrument, which circuit for the three instruments is precisely the same, and therefore we will trace in detail only the circuit of the transmitting instrument, which is as follows: from the positive pole of the battery 12 by wire 10 to the armature 9 of the No. 4 relay, thence by the negative contact or stop 29 and wire 21 to the shifting-magnet $b^{33}$, thence by the branch wire 21, wire $85^c$, through the electrical governors to branch wire 85, thence by wire 13 to the negative pole of the battery 12. The energizing of the shifting-magnet $b^{33}$ attracts its armature $b^{31}$, and by means of the intermediate connection between the said armature and the driving-arm $a^{25}$ for the type-carrier segment $a^{18}$ moves the said type-carrier in the direction indicated by arrow 50 to place the figure "4" into correct working position, and this position is determined by the second pin of the upper-case pins of the left-hand series R', viewing Fig. 2—namely, the second pin of the said left-hand series. This pin is moved into position to engage the arm $a^{40}$, movable with the type-carrier, by energizing the magnet $c'$, which is effected by passing a negative current through the No. 1 relay of the instrument. The No. 1 relay when energized by a negative current brings its armature 6 into engagement with the stop 23 and closes the circuit of the battery 12 through the pin-magnet $c'$, which circuit may be traced as follows: from the positive pole of the battery 12 by wire 10 and armature 6 of the No. 1 relay to stop 23, thence by wire 15 to the pin-magnet $c'$, thence by the wire 13 to the negative pole of the battery 12. As soon as the pin-magnet $c'$ is energized it attracts its armature and moves the rod $d^{51}$, (shown in Fig. 27,) so as to act on the pin 318 of the pin-magnet controlling the governor and rock the shaft 315, so as to move the arm or terminal 313 from engagement with the contact 309 into engagement with the terminal or contact 308, which, as above described, momentarily opens the circuit of the shifting-magnet $b^{33}$, so that the said shifting-magnet is not operated until the pin-magnet has had sufficient time to attract its armature and move its pin into position to arrest or limit the movement of the arm $a^{40}$ of the type-carrier. When the contact-arm 313 of the pin-magnet governor is brought into engagement with the terminal or contact 308, the circuit of the shifting-magnet, which is normally closed at the governor between the arm 313 and the arm 309, is again closed between the arm 313 and the terminal 308. As soon as the arm $a^{40}$ meets the pin elevated by the magnet $c'$, as above described, the circuit of the printing-magnet $d'$ is closed by the circuit-controller, movable with the arm $a^{40}$ and which is represented in the diagram Figs. 29 to 31, inclusive, by the arm $p^4$. As soon as the arm $a^{40}$ is brought against the pin elevated by the magnet $c'$ the arm $p^4$ is brought into engagement with the terminal $p^3$ and the circuit of the printing-magnet $d'$ and the carriage-feed magnet $d^{29}$ is closed, which circuit may be traced in the diagram figures as follows: from the positive pole of the battery $m$ by wires $p^{25}$ $p^{26}$, through the feed-magnet $d^{29}$, wires $p^{31}$ and $p$ to the printing-magnet $d'$, thence by the wire $p'$ to terminal $p^3$, thence by the arm $p^4$, wires $p^5$ $p^6$ to the negative pole of the battery $m$. The printing-magnet being energized attracts its armature $d$ and in the present construction of the instrument, as above described, operates against the arm $a^{53}$ on the rock-shaft $a^{42}$ and moves the hammer $a^{52}$ against the type or character "4" on the type-carrier 18, thereby effecting a printing of the same upon the paper carried by the paper-carriage. The closing of the circuit of the feed-magnet $d^{29}$, as above described, energizes the said feed-magnet, which attracts its armature $d^{28}$ (shown best in Fig. 15) and rocks the shaft $d^{27}$, so as to move the crank or arm $d^{26}$ in a direction opposite to that indicated by arrow 30, Fig. 16, to place the pawl $d^{20}$ in engagement with a new tooth on the rack-bar $d^5$, so that as soon as the circuit of the feed-magnet is broken the spring $d^{30}$ in restoring the armature $d^{28}$ to its normal position will effect the feed of the carriage the distance of one tooth on the rack-bar $d^5$ to place a new surface of the paper to be printed upon.

The circuits of the line-wires through the No. 1 to the No. 4 relays, inclusive, are substantially similar to that already traced through the No. 3 relay, and for sake of brevity these circuits are not herein traced specifically. If the character to be printed is in the second and third rows of the upper-case characters, the No. 3 relay, as above described, will be energized in addition to the No. 4 and Nos. 1 and 2 relays; but as the operation of these various relays is substantially the same as above described a detailed tracing of the various circuits for effecting the printing of an upper-case character in the second and third rows is not herein deemed necessary, with perhaps the exception of the tracing of the local circuit of the elevating-magnets $b^5$ $b^6$. The local circuit of the elevating-magnet $b^5$ may be traced in the diagram Figs. 29 to 31, inclusive, as follows: from the positive pole of the battery 12 by wire 10 to the armature 8 of the No. 3 relay, thence by the positive stop 26 and wire 18 to the magnet $b^5$, thence by the return-wire 13 to the negative pole of the battery 12. The circuit of the magnet $b^6$ may be traced as follows: from the positive pole of the battery 12 by wire 10, armature 8 of the No. 3 relay, negative stop 27, wire 19, magnet $b^6$, and wire 13 to the negative pole of the battery. As above described, these magnets when energized operate electrical governors controlling the circuit of the shifting-magnets $b^{32}$ $b^{33}$, whereby when the character printed is in the second row, requiring the use of the first elevating-magnet $b^5$, the shifting-magnet circuit is momentarily interrupted until the elevating-magnet has performed its work, and so, also, in case the character to be printed is in the third row the second elevating-magnet operates its electrical governor and momentarily interrupts the circuit of the shifting-magnets until the type-carrier has been elevated into correct working position and until the proper pins have been moved into position to limit the movement of the type-carriers, and thereby effect the positioning of the character to be printed.

When the instrument is being used for office-work, as represented in Fig. 31, the carriage-release magnet $d^{47}$ is controlled by the pin-magnet $c^3$ and the contacts $p^{60}$ $p^{61}$ on the release-key, the pin-magnet $c^3$ when energized bringing the contact $d^{64}$ into engagement with the terminals $d^{71}$ $d^{72}$. The circuit of the carriage-release magnet $d^{47}$ of the instrument when used for office-work may be traced in Figs. 31 and 31$^b$ as follows: from the positive pole of the battery $m$ by wires $p^{35}$ $p^{27}$, magnet $d^{47}$, wire $p^{35}$, terminal $d^{72}$, contact $d^{64}$, terminal $d^{71}$, wires $p^{36}$ $p^{34}$ to the terminal $o^{16h}$, thence by the wire or connection 115 to terminal $o^{48g}$, thence by wire $p^{50}$, terminal $m^2$, contact $p^{61}$, wire or connection $p^{63}$, contact $p^{60}$, terminal $m'$, and wires $p^{53}$ $p^6$ to the negative pole of the battery.

The relay No. 5 of the office instrument is not energized by the additional sets of contacts on the carriage-release key of the said instrument, because the circuit from the battery $n^{30}$ to the line $L^5$, containing said relay, is opened by the combination-switch when on office between the terminals $o^{47g}$ $c^{49g}$, whereas the relay No. 5 of the instrument when used as a transmitter, as shown in Fig. 29$^a$, closes a branch of the local circuit containing the battery $m$ between the armature $p^{39}$ and its positive stop $p^{52}$. The circuit of the feed-magnet $d^{47}$ of the transmitting and receiving instruments may be traced as follows: from the positive pole of the battery $m$ by wires $p^{25}$ $p^{27}$, magnet $d^{47}$, wire $p^{35}$, terminal $d^{72}$, contact $d^{64}$, terminal $d^{71}$, wires $p^{36}$ $p^{34}$ to terminal $o^{16h}$, thence by wire or connection 122 to the terminal $o^{48h}$, thence by wire $p^{51}$, positive stop $p^{52}$, armature $p^{39}$, and wire $p^6$ to the negative pole of the battery.

It will be noticed that in the present arrangement of apparatus the magnets in circuit with the battery $m$ are governed in part by the operation of the line-relays Nos. 1 to 4 and are also governed by the relay No. 5 and the terminals $p^{60}$ $p^{61}$, coöperating with the terminals $m'$ $m^2$.

We claim—

1. An electromechanically-operated typewriting or printing instrument provided with a plurality of characters of the same type or case, a plurality of electromagnets to effect the printing of the said characters and less in number than the number of different characters, a plurality of relays directly controlling the circuits of the said electromagnets, circuit-terminals to which said relays are connected, battery-terminals coöperating with said relay-terminals, and character-keys provided with a plurality of contacts to connect the said battery and relay terminals to operate a plurality of the said relays simultaneously and with the same or different polarities of current, substantially as described.

2. The combination with an electromechanically-operated type-writing or printing instrument provided with a movable type-carrier having a plurality of characters, a plurality of movable stops or pins coöperating with said type-carrier to arrest its movement in predetermined positions, a plurality of electromagnets for operating said stops or pins and less in number than said stops or pins, and a pin or case selecting device to select which stops or pins the said electromagnets shall operate, substantially as described.

3. The combination with an electromechanically-operated type-writing or printing instrument provided with a movable type-carrier having a plurality of characters, a plurality of movable stops or pins coöperating with said type-carrier to arrest its movement in predetermined positions, a plurality of electromagnets for operating said stops or pins and less in number than said stops or pins, and a pin or case selecting device to select which stops or pins the said electromagnets shall operate, and electromagnets to operate said pin or case selecting device in opposite directions, substantially as described.

4. The combination with an electromechanically-operated type-writing or printing instrument provided with a plurality of movable stops or pins, of a plurality of electromagnets for operating said stops or pins and less in number than said stops or pins, and a pin or case selecting device operating on one of said stops or pins and placing a predetermined number of the remaining stops or pins under the control of the pin-operating electromagnets, substantially as described.

5. In an electromechanical type-writing or printing instrument, the combination of the following instrumentalities, viz: a movable type-carrier provided with a plurality of characters, an electromagnet to move said carrier in one direction, an electromagnet to move the said carrier a different distance in the same direction, and means operated by an electromagnet to positively stop or limit the movement of said type-carrier, substantially as described.

6. In an electromechanical type-writing or printing instrument, the combination of the following instrumentalities, viz: a type-carrier, electromagnets to move said type-carrier different distances in the same direction, and a stopping device operated by the energizing of one of said electromagnets to limit the movement of the type-carrier, substantially as described.

7. In an electromechanical type-writing or printing instrument, the combination of the following instrumentalities, viz: a type-carrier, an electromagnet to move it in one direction, stops or pins to limit the extent or duration of the movement of the said type-carrier, electromagnets to operate said stops or pins, and a governor controlling the circuit of the type-carrier-operating electromagnet and operated by the stop or pin operating magnet, substantially as described.

8. In an electromechanically-operated type-writing or printing instrument, the combination of the following instrumentalities, viz: a plurality of type-carriers each provided with a plurality of characters, and movable in different directions, of mechanism to move each type-carrier in one direction independent of the other, an electromagnet operatively connected to each of said mechanisms, and circuit-controllers to govern the operation of the said electromagnets, substantially as described.

9. In an electromechanically-operated type-writing or printing instrument, the combination of the following instrumentalities, viz: a plurality of type-carriers each provided with a plurality of characters, and movable in different directions, of mechanism to move each type-carrier in one direction independent of the other, an electromagnet operatively connected to each of said mechanisms, an arm or device movable with each of said type-carriers, movable stops or pins coöperating with said arm or device, mechanism to operate said pins, a case or pin selecting device, and electromagnets to operate said case or pin selecting device, substantially as described.

10. In an electromechanically-operated type-writing or printing instrument, the combination with a plurality of movable stops or pins, of devices to operate said stops or pins in pairs, a selecting device to operate one of said pin-operating devices, electromagnets to operate other of said pin-operating devices, and electromagnets to operate said case-selecting device, substantially as described.

11. In an electromechanically-operated type-writing or printing system of intercommunication, the combination of the following instrumentalities, viz: an electromechanically-operated type-writing or printing instrument provided with a plurality of type-operating electromagnets, polarized relays governing the action of said electromagnets, and a combination-switch having circuit-terminals connected in circuit on opposite sides of the said relays, substantially as described.

12. In an electromechanically-operated type-writing or printing system of intercommunication, the combination of the following instrumentalities, viz: an electromechanically-operated type-writing or printing instrument provided with a plurality of type-operating electromagnets, polarized relays governing the action of said electromagnets, relay-terminals included in circuit with the said relays, battery-terminals coöperating with said relay-terminals, a combination-switch having circuit-terminals included in circuit on opposite sides of the relays, and a switch to establish a shunt around the relay-terminals, substantially as described.

13. In an electromechanically-operated type-writing system of intercommunication, the combination of the following instrumentalities, viz: an electromechanically-operated type-writing or printing instrument provided with a plurality of type-operating electromagnets, polarized relays governing the action of said electromagnets, a local circuit controlled in part by said type-operating electromagnets, a relay to further control said local circuit, and a combination-switch also controlling said local circuit, substantially as described.

In testimony whereof we have signed our names to this specification in the presence of two subscribing witnesses.

ALBERT D. NEAL.
    HOWARD F. EATON.

Witnesses:
 JAS. H. CHURCHILL,
 J. MURPHY.